US012719334B2

(12) United States Patent
Svrcek et al.

(10) Patent No.: US 12,719,334 B2
(45) Date of Patent: Aug. 25, 2026

(54) HIGH-POWER CORE SYSTEM

(71) Applicant: Mainspring Energy, Inc., Menlo Park, CA (US)

(72) Inventors: Matthew Svrcek, Redwood City, CA (US); David DeGraaff, Mountain View, CA (US); Nate Fitzgerald, Newton, MA (US); Matthew Roelle, Belmont, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 231 days.

(21) Appl. No.: 18/593,424

(22) Filed: Mar. 1, 2024

(65) Prior Publication Data

US 2024/0297553 A1 Sep. 5, 2024

Related U.S. Application Data

(60) Provisional application No. 63/449,171, filed on Mar. 1, 2023.

(51) Int. Cl.
*H02K 7/18* (2006.01)
*H02K 1/12* (2006.01)
*H02K 5/04* (2006.01)

(52) U.S. Cl.
CPC ............ *H02K 7/1876* (2013.01); *H02K 1/12* (2013.01); *H02K 5/04* (2013.01)

(58) Field of Classification Search
CPC .. H02K 7/1876; H02K 7/1884; H02K 7/1815; H02K 7/065; H02K 1/34; H02K 35/02; H02K 1/12; H02K 5/04; F03B 11/002; F03B 63/041; F03B 71/04
USPC .......................................... 310/12.12, 15–39
See application file for complete search history.

(56) References Cited

U.S. PATENT DOCUMENTS 3,170,406 A * 2/1965 Robertson ............ F02B 71/045 417/384
11,421,586 B2 8/2022 Liu et al.
2005/0109295 A1* 5/2005 Kaneko .................. F02B 71/04 123/46 E
2012/0204836 A1* 8/2012 Roelle .................. F02B 75/285 123/46 R
2016/0208686 A1* 7/2016 Gadda .................... F02B 71/00
2020/0195093 A1* 6/2020 Svrcek ................ H02K 7/1884

* cited by examiner

*Primary Examiner* — Michael Andrews
(74) *Attorney, Agent, or Firm* — HG LAW LLP

(57) ABSTRACT

Linear generator systems are presented herein for interfacing a number of different linear electromagnetic machines (LEMs) for generating collective power outputs. A plurality of LEMs is coaxially arranged in sequence along a longitudinal axis. Each LEM comprises a respective translator, and a respective stator. A pair of gas springs are each respectively arranged outboard of a pair of outboard LEMs in contact with the respective translators of the outboard LEMs. A plurality of reaction sections is arranged between adjacent LEMs of the plurality of LEMs. Each of the plurality of reaction sections is in contact with respective translators of the respective adjacent LEMs.

30 Claims, 22 Drawing Sheets

500A
400
404A
408A
406
408B
404B
400
404B
408B
406
408A
404A 500B
502B
502A
404B
408A
406
406
406
504B
504A
408A
404A 902
900A
910B
904B
908B
906
900B
904A
908A
900C
910A 908B
904B
912
914
916
918
900B
904A
908A 908A
912
914
900C
910A
404A
902
920

1000A
1010D
1004D
1008
1002
1006
1010B
1004B
1010A
1004A
1010C
1004C

1000B 1200A
1202
1204
1204
1206
1206
1208
1208

1200B
1202
1204
1204
1206
1206
1208
1208
1210
1210
1210
1210

2000A
2014A
2008
2006
2014B
2012
2004
2010
2014C
2002
2014D
2000B
2012

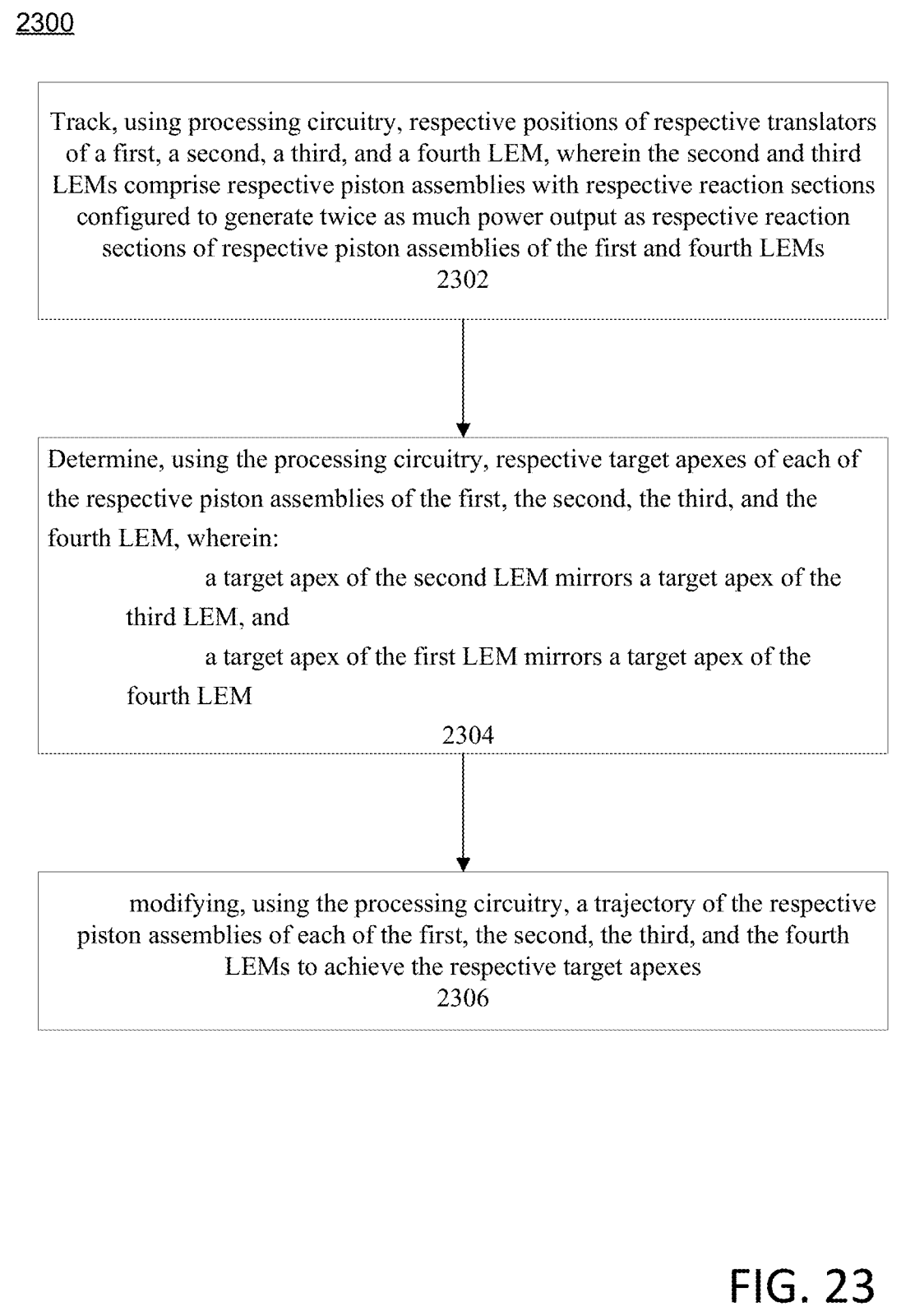

2300

Track, using processing circuitry, respective positions of respective translators of a first, a second, a third, and a fourth LEM, wherein the second and third LEMs comprise respective piston assemblies with respective reaction sections configured to generate twice as much power output as respective reaction sections of respective piston assemblies of the first and fourth LEMs
2302

Determine, using the processing circuitry, respective target apexes of each of the respective piston assemblies of the first, the second, the third, and the fourth LEM, wherein:

a target apex of the second LEM mirrors a target apex of the third LEM, and a target apex of the first LEM mirrors a target apex of the fourth LEM
2304 modifying, using the processing circuitry, a trajectory of the respective piston assemblies of each of the first, the second, the third, and the fourth LEMs to achieve the respective target apexes
2306

FIG. 23

HIGH-POWER CORE SYSTEM

CROSS-REFERENCE TO RELATED APPLICATIONS

This application claims the benefit of U.S. Provisional Patent Application No. 63/449,171 filed Mar. 1, 2023, the disclosure of which is hereby incorporated by reference herein in its entirety.

INTRODUCTION

The present disclosure is directed to systems and methods for power generation for facilities, campuses, and power distribution grids with power demands ranging from the kilowatt (hereinafter "kW") to higher power requirements. For example, data centers as well as campuses that support distribution of utility related services and products may have power demands that exceed 10 megawatts (hereinafter "MW"). The present disclosure provides descriptions of systems and methods for generating power from the hundreds of kW level into the MW-range level.

SUMMARY

Current approaches to high power demand campuses include drawing from multiple power sources using various grid architectures and coupling multiple power output devices with smaller individual power outputs that, when operating contemporaneously, may provide close to the desired power output. These multiple power output devices may operate independent of each other with individual losses that affect overall efficiency of power generation at the desired scale. Power generating systems typically rely on a variety of subsystems acting in concert. For example, a typical crankshaft generator includes a rotating assembly that includes pistons, connecting rods, oiled bearings, and a crankshaft, an oil system, a coolant system, an ignition system, a valving system and camshaft, a fuel system, and an exhaust system. These subsystems are tailored to the crankshaft generator.

Linear generators convert between electrical energy and kinetic energy of a moving element. The design of linear generators must ensure efficient operation, cost effective construction, and reliability. In order to exceed the efficiency of rotary generators, it is necessary for a linear generator to be compatible with an inexpensive and lightweight oscillator design, employ high-efficiency materials, allow geometry optimization, and provide high copper slot fill. Linear generators provide packaging and efficiency options that other power generation systems may not.

One illustrative strategy of optimizing linear generators for more efficient outputs at higher power ranges is eliminating air springs, or gas springs, from an assembly. Hereinafter, a gas spring can be considered a spring of any suitable medium, including using air, for generating a rebound force. A gas spring may utilize, for example, any suitable gas including nitrogen, air, or other gases, inclusive of gases configured for reactions (e.g., such as gases suitable for compression ignition). For example, gas springs for high energy output linear generators may take up a large amount of space, add cost, add extra rings that require maintenance in order to maintain a desired operational range. Furthermore, gas springs operationally cause inherent energy loss due to friction and losses in the compressed gas. They may be considered an "accessory" or "auxiliary" to make a system or apparatus comprising a power cylinder and linear electromagnetic machine function. Another illustrative approach may include arranging power cylinders on opposite ends of an individual linear electromagnetic machine (hereinafter "LEM"). This results in packaging that includes four LEMs, rather than two, and the four LEMs can be configured for operation with the use of only two gas springs. In some embodiments, it is possible to increase power output by a factor of 1.5 for a given length of a core (e.g., a power unit including one or more reaction sections).

Described herein are a number of generators and generator systems that generate power by converting mechanical energy of a translator into electrical energy using one or more LEMs. A translator corresponds to an assembly that uses a piston rod to couple a piston, where the piston face is in contact with a reaction section, to an opposing component that provides a return force responsive to a reaction in the reaction section. In some embodiments, the disclosure is directed to a generator comprising a LEM coupled to a power cylinder on a first end of the LEM. A second end of the LEM, arranged opposite the first end, comprises a gas spring for rebounding a translator in response to a reaction occurring in a reaction section adjacent to the translator. A translator electromagnetically interacts with a stator with a plurality of windings to convert mechanical energy of the translator to an electrical output.

The techniques, systems, and methods of this disclosure provide solutions to problems related to providing high power output using a system comprised of a plurality of LEMs that are physically, communicatively, and electrically coupled as part of a singular power source. Described herein is a high-power core system (hereinafter "HPCS") that improves efficiency (e.g., between costs to operate and power realized at an end device or power cascaded through a power grid) compared to power generating systems that may utilize other forms of smaller generators or generators connected to create, in aggregate, an elevated power output that exceeds a power output of each individual unit. The HPCS of this disclosure reduces heat transfer and ring friction that would otherwise result in losses from having an elevated number of gas springs operating in a single system. For example, by decreasing the number of gas springs per LEM, there is a reduction in heat transfer resulting from the various compressive states of the gas of the gas spring and resulting from friction between sealing rings and the contact surfaces of the sealing rings. As a result, there is a net alternating current (hereinafter "AC") efficiency gain throughout the system due to a reduction in the amount of air that needs to be compressed and distributed throughout the system. Additionally, the gas springs of the updated system can be used to pressurize air bearings that support the translating components within the LEMs. By connecting the pressurized gas reservoirs of the remaining gas springs of the system to the air bearings, there is an additional net AC gain throughout the system due to the direct feeding for pressurized gas from the gas spring to the air bearings. As more LEMs are integrated with more power cylinders, wherein the power cylinders provide the rebound function for different translator instead of gas springs, the net AC efficiency gains of the system are realized when compared to a series of LEMs interfacing with a ratio of one gas spring per air bearing, as now two gas springs can be utilized to pressurize four air bearings. Each generator, or system, achieves the disclosed improvements by including at least one more LEM than reaction section or reaction cylinder. For example, where three LEMs are sequentially arranged, two power cylinders comprising respective reaction sections are arranged between respective adjacent LEMs of the three LEMs, where the pair of outboard LEMs of the three LEMs are smaller than the central inboard LEM.

In some embodiments, the disclosure is directed to a linear generator comprising a plurality of LEMs coaxially arranged in sequence along a longitudinal axis. Each LEM comprises a respective translator and a respective stator. Each translator as described herein comprises at least a translator tube that connects to opposing pistons. The translator tube comprises any suitable beam shape, or geometry for connecting the opposing pistons (e.g., such as a rod or cylinder). The plurality of LEMs comprises a pair of outboard LEMs, each on a respective opposing end of the sequence. The linear generator also includes a pair of gas springs, each respectively arranged outboard of the pair of outboard LEMs in contact with the respective translators of the outboard LEMs. A plurality of reaction sections is arranged between adjacent LEMs of the plurality of LEMs, wherein each of the plurality of reaction sections is in contact with respective translators of the respective adjacent LEMs.

In some embodiments, the plurality of LEMs comprises at least four LEMs. Additionally, or alternatively, the plurality of LEMs consists of an even number of LEMs. For example, the plurality of LEMs consists of four LEMs. In this example, an inboard pair of LEMs of the plurality of LEMs are sized to generate more power than the outboard pair LEMs.

In some embodiments, the inboard pair of LEMs generate at least 1.5 times as much power as the outboard pair LEMs. Additionally, or alternatively, each of the inboard pair of LEMs is larger than each of the outboard pair of LEMs. In some embodiments, a respective diameter of each of the inboard pair of LEMs is larger than a respective diameter of each of the outboard pair of LEMs. The respective length of each of the inboard pair of LEMs may be larger than a respective length of each of the outboard pair of LEMs.

In some embodiments, each translator of the plurality of LEMs comprises a respective number of magnets. The respective number of magnets of each of the translators of the inboard LEMs is greater than the respective number of magnets of each of the translators of the outboard LEMs. Additionally, or alternatively, each stator of the plurality of LEMs comprises a respective number of stator teeth. The respective number of stator teeth of each of the stators of the inboard LEMs is greater than the respective number of stator teeth of each of the stators of the outboard LEMs. In some embodiments, each stator of the plurality of LEMs comprises a respective plurality of stator teeth, each of respective size. The respective size of the plurality of stator teeth of each of the stators of the inboard LEMs is greater than the respective size of the plurality of stator teeth of the stators of the outboard LEMs.

In some embodiments, the linear generator comprises a plurality of power cylinders. Each of the plurality of reaction sections is within a bore of a respective one of the plurality of power cylinders. Each power cylinder of the plurality of power cylinders comprises a respective intake port and a respective exhaust port. The plurality of power cylinders comprise a pair of outboard power cylinders, each arranged inboard of a respective one of the pair of outboard LEMs. The respective intake port of a first outboard power cylinder of the pair of outboard power cylinders is located on an opposing longitudinal side of the first outboard power cylinder relative to the respective intake port of a second outboard power cylinder of the pair of power cylinders. The respective exhaust port of the first outboard power cylinder of the pair of outboard power cylinders is located on the opposing longitudinal side of the first outboard power cylinder relative to the respective exhaust port of the second outboard power cylinder of the pair of power cylinders.

In some embodiments, the respective intake port of the first outboard power cylinder is located on an inboard side of the first outboard power cylinder that is longitudinally adjacent to a first gas spring of the pair of gas springs. The respective exhaust port of the first outboard power cylinder is located longitudinally outboard of the respective intake port of the first outboard power cylinder. The respective intake port of the second outboard power cylinder is located on an inboard side of the second outboard power cylinder that is longitudinally adjacent to a second gas spring of the pair of gas springs. The respective exhaust port of the second outboard power cylinder is located longitudinally outboard of the respective intake port of the second outboard power cylinder.

In some embodiments, the plurality of LEMs, the pair of gas springs, and the plurality of reaction sections form a core, the linear generator further comprising a plurality of cores, comprising the core and a plurality of additional cores. Additionally, or alternatively, each of the plurality of additional cores comprises a respective additional plurality of LEMs coaxially arranged in sequence along a respective longitudinal axis. Each LEM of the respective additional plurality of LEMs comprises a respective additional translator, and a respective additional stator. The additional plurality of LEMs comprises an additional pair of outboard LEMs, each on a respective opposing end of the additional plurality of LEMs. In some embodiments, the linear generator comprises an additional respective pair of gas springs, each respectively arranged outboard of the additional pair of additional outboard LEMs in contact with the respective additional translators of the additional outboard LEMs. A respective additional plurality of reaction sections are arranged between adjacent LEMs of the additional plurality of LEMs, wherein each of the additional plurality reaction sections is in contact with respective translators of the respective adjacent LEMs of the additional plurality of LEMs.

In some embodiments, each of the plurality of cores comprises a respective power output, and each of the respective power outputs are coupled to generate a cumulative power output.

In some embodiments, at least two cores of the plurality of cores are arranged side by side with matching orientations. The at least two cores of the plurality of cores are stacked on top of at least two other cores of the plurality of cores that are arranged side by side with matching orientations. Additionally, or alternatively, at least a first set of the plurality of cores are stacked on top of a second set of the plurality of cores. In some embodiments, all orientations of the at least first set of the plurality of cores and the second set of the plurality of cores match, however, in other embodiments the orientation of the cores may be opposed. In some embodiments, at least two cores of the plurality of cores are stacked on top of each other with matching orientations.

In some embodiments, each respective translator translates along the longitudinal axis within a respective cylinder. Additionally, or alternatively, each of the respective cylinders are arranged in sequence and in contact to form a single bore that extends through all of the respective cylinders. Each LEM of the plurality of LEMs further comprises a respective bearing housing for supporting each respective translator. Each respective bearing housing accommodates a respective gas bearing. Each respective bearing housing comprises one or more of at least one port or at least one valve for modifying a pressure of a respective gas within each respective bearing housing. In some embodiments, the pair of gas springs provides pressurized gas to at least one of the respective bearing housings.

In some embodiments, each LEM of the plurality of LEMs further comprises a respective air bearing for supporting each respective translator. Each respective air bearing is arranged along a respective translator tube of a respective translator.

In some embodiments, each gas spring of the pair of gas springs comprises a gas spring housing volume defined at least in part on a piston of the translator and at least one port for regulating pressure within the gas spring housing volume. Additionally, or alternatively, the at least one port communicates pressure from the gas spring to at least one gas bearings along which respective translators of the plurality of LEMs translate.

In some embodiments, the linear generator comprises a pair of respective boost boxes (e.g., reservoirs) for modifying a pressure within each respective gas spring of the pair of gas springs.

In some embodiments, the linear generator may comprise a device of any suitable architecture for achieving the operational conditions described herein for the various linear generators of the present disclosure. While the present disclosure is generally provided in the context of LEMs, it will be understood that any other electromagnetic machine (EM) can be used in place of any one or more LEMs in the disclosed embodiments. For example, where a linear arrangement of components of a core is not needed, other EMs may be used in place of LEMs. While a "gas spring" is generally provided by the present disclosure, it will be understood that any other suitable driver section, in place of or in addition to a gas spring may be used. For example, the driver section may be any suitable gas spring, other type of spring (e.g., mechanical or otherwise), for providing a rebound or return force to a translator (e.g., by way of a piston or other portion of the translator being in contact with the driver section). In some embodiments, the driver section may be a reaction section in which a reaction can be used to provide the force on the translator that is in contact with the driver section. While the present disclosure generally provides reaction sections, it will be understood that any other suitable compression sections may be used in addition to or in place of reaction sections. That is, the compression sections do not necessarily require that a reaction (e.g., chemical or otherwise) take place in the compression section. In some embodiments, the linear generators and devices of this disclosure may be configured to achieve homogeneous charge compression ignition (hereinafter "HCCI") without the use of spark-based reactions for actuating the various translators of this disclosure. In some embodiments a combination of HCCI and spark-ignition can be used (e.g., to ensure a desired reaction timing is achieved).

In some embodiments, one or more of the driver sections of this disclosure is inclusive of a reaction section of a power cylinder based on the incorporation of appropriate valves or ports in the housing of the driver section. In some embodiments, one or more reaction sections or driver sections (e.g., inclusive of portions interfacing with or included in power cylinders, air springs, or gas springs of this disclosure) may be configured for spark ignition where a spark plug or other apparatus for adequately starting a reaction for generating a force for moving a translator or translator assembly is paired with valves with appropriate coordination of timing for optimal operation of the systems of this disclosure. For example, a valve in a head of the driver section may allow for uniflow scavenging. Additionally, or alternatively, a pair of ports near a bottom dead center of a power cylinder may correspond to respective intake and exhaust ports. The exhaust port may, for example, be arranged closer to a top of the driver section than a respective intake port. To avoid pass through, the scavenging to enable the reaction is brief in duration. In another example, direct injection may be possible where a port is arranged towards a top dead center of a power cylinder and gas from this portion may still be useable for providing the gas to a bearing (e.g., a gas bearing for supporting a translator within a cylinder).

In some embodiments, where the driver section is inclusive of a reaction section (e.g., of a power cylinder), a variety of different approaches to scavenging may be utilized. For example, valves (e.g., poppet valves, or other suitable valve or port architectures), may be electrically, or otherwise, actuated on an inboard end of a cylinder that forms the driver section. In some embodiments, one or more valves (e.g., poppet valves) may be arranged towards an outboard end of the cylinder that forms the driver section. Through these valves, or ports, fresh charge would flow along the cylinder axis similar to a normal reaction chamber, from inboard end to outboard end. Cross-flow scavenging may also be possible where both the intake and exhaust ports are in the cylinder wall towards the inboard end. The intake ports are on one azimuthal half of the cylinder, and the exhaust on the other azimuthal half. The piston and intake ports may be shaped to direct the intake flow towards the head portion of the driver section. In some embodiments, loop scavenging may also be achieved with both intake and exhaust ports on a same azimuthal side of the cylinder.

In some embodiments, the disclosure is directed to a structural frame with features for positioning and aligning one or more of the linear generators of this disclosure. The features define a housing with a plurality of openings. The linear generator and components thereof may all be arranged within the housing. The plurality of openings, for example, accommodate insertion of at least one component of the linear generator into the housing. In some embodiments, the housing comprises a cuboid-shaped volume.

In some embodiments, the structural frame further comprises a generator core mounting assembly. The generator core mounting assembly includes a plurality of cross beams spaced along the longitudinal axis, each extending laterally from one side of the structural frame to an opposite side of the structural frame. The generator core mounting assembly also includes a plurality of pillars spaced along the longitudinal axis, wherein respective pairs of the plurality of pillars are coupled to a respective one of the plurality of cross beams. In some embodiments, the plurality of pillars are orthogonal to the plurality of cross beams along the longitudinal axis. Additionally, or alternatively, the plurality of pillars each extend at least vertically.

In some embodiments, the housing is a first housing, and the structural frame comprises a plurality of other housings. The first housing is arranged transverse along a side of the plurality of cross beams and between each respective pair of the plurality of pillars. At least one other housing of the plurality of other housings is arranged adjacent to the first housing and transverse to the plurality of cross beams along the side of the plurality of cross beams between each respective pair of the plurality of pillars.

In some embodiments, the generator core mounting assembly is a first generator core mounting assembly. The structural frame comprises at least one other generator core mounting assembly. A bottom side of the at least one other generator core mounting assembly is affixed to a top side of the plurality of pillars of the first generator core mounting assembly. Additionally, or alternatively, bottom sides of the plurality of cross beams of the at least one other generator core mounting assembly are affixed to top sides of the plurality of pillars of the first generator core mounting assembly.

In some embodiments, the disclosure is directed to a power generation module comprising a housing defining a volume, wherein the volume accommodates a plurality of cores arranged in a matrix. Additionally, or alternatively, the matrix comprises a plurality of rows of cores and a plurality of columns of cores.

BRIEF DESCRIPTIONS OF THE DRAWINGS

The above and other objects and advantages of the disclosure may be apparent upon consideration of the following detailed description, taken in conjunction with the accompanying drawings, in which:

FIG. 23 is a block diagram of a method for controlling a LGEN system, in accordance with some embodiments of the present disclosure.

Figure 1:
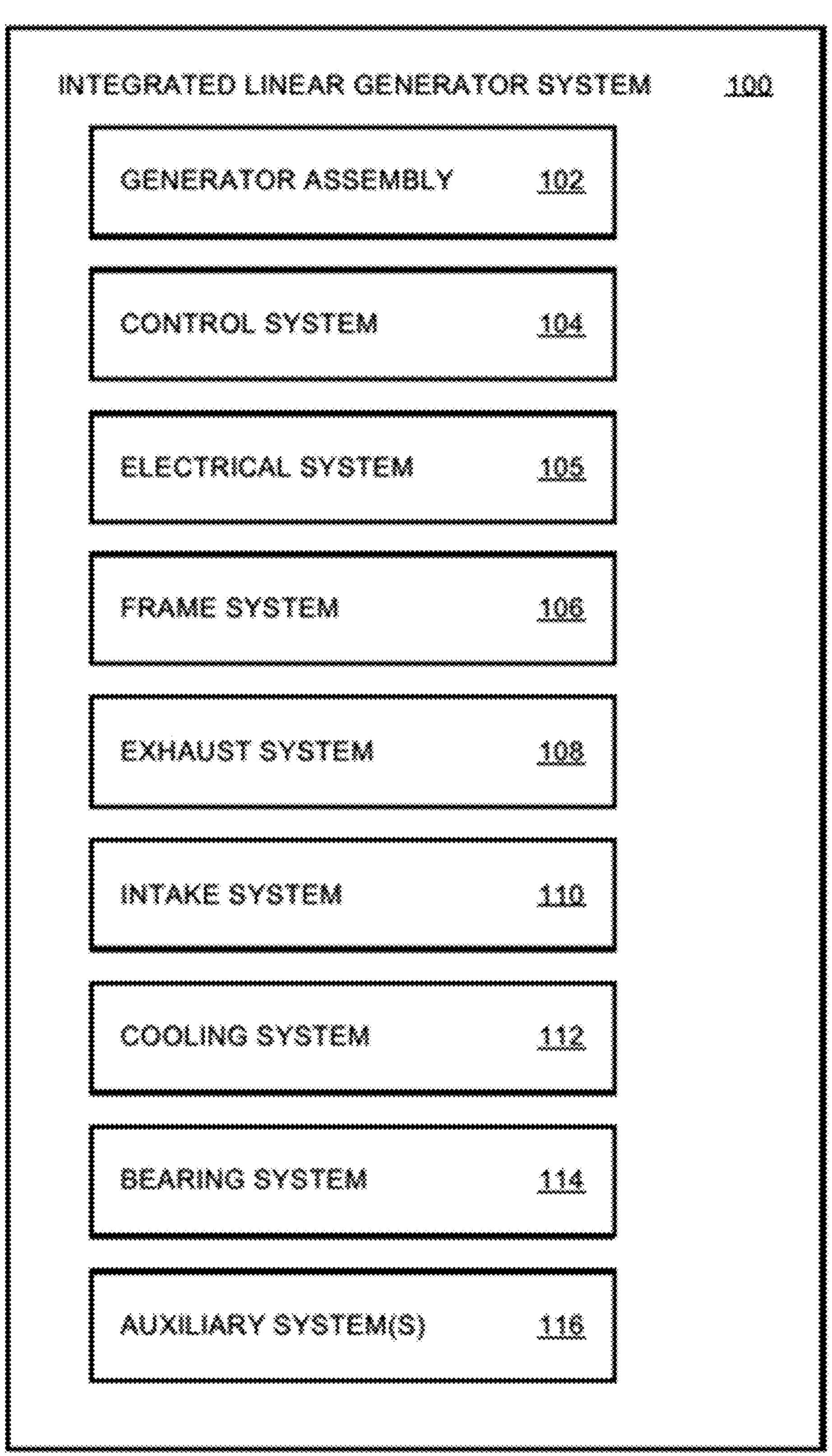
FIG. 1 shows a system diagram of an illustrative integrated linear generator system, in accordance with some embodiments of the present disclosure.

The figures are not intended to be exhaustive or to limit the disclosure to the precise form disclosed. It should be understood that the concepts and embodiments disclosed can be practiced with modification and alteration, and that the disclosure is limited only by the claims and the equivalents thereof.

DETAILED DESCRIPTION

The present disclosure provides linear generator systems configured to provide electrical work (i.e., electricity) from an input of a fuel and oxidizer. In some embodiments, the present disclosure provides linear systems configured to convert between kinetic and electrical energy in order to meet power output requirements for various industrial or other high power draw set ups. A single linear generator includes a pair of opposed, oscillating translators arranged along an axis. The translators both contact a single compression or reaction section, and each translator also contacts a respective driver section (e.g., gas spring). As each translator moves along the axis, the compression or reaction section and gas springs are alternately compressed and expanded. The compression section as described herein can be where a reaction takes place (e.g., as possible based on processes such as HCCI) and where a compression section is recited, a reaction section may also be considered a suitable nomenclature. In some embodiments, the present disclosure is applicable to oil-free engines that operate with compression ignition (e.g., homogeneous charge compression ignition, stratified charge compression ignition, or other compression ignition), spark ignition, or both.

In some embodiments, there are no mechanical linkages between translators (i.e., a linear free-piston generator or a linear free-piston generator). Electrical work is extracted from the linear generator via multiphase stators, which are configured to interact electromagnetically with the translators as the translators move. A stator is a LEM component configured to accommodate current in one or more phases, electromotive force in the one or more phases, or both, to provide an electromagnetic interaction with a translator. The electromagnetic interaction includes a magnetic flux interaction (e.g., with a motor air gap affecting the reluctance), a force interaction (e.g., with a force constant affecting the current-force relationship), or both. Described herein are assemblies and systems that incorporate multiple of the linear generators for achieving a desired power output.

Linear generators convert between electrical energy and kinetic energy of a moving element. The design of linear generators and systems incorporating multiples thereof must ensure efficient operation, cost effective construction, and reliability. In order to match the efficiency of other means of generating elevated power outputs by alternative generator configurations, there is a necessity for a linear generator, or a system of multiple linear generators, to be compatible with an inexpensive and lightweight oscillator design, employ high-efficiency materials, allow geometry optimization, and provide high copper slot fill. The present disclosure addresses these and other requirements.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

FIG. 1 shows a system diagram of an illustrative integrated linear generator system 100, in accordance with some embodiments of the present disclosure. Integrated linear generator system 100 includes generator assembly 102, control system 104, electrical system 105, frame system 106, exhaust system 108, intake system 110, cooling system 112, bearing system 114, and auxiliary system(s) 116. Generator system 100 is configured to generate and manage electric power as controlled by control system 104 and electrical system 105. In some embodiments, electrical system 105 includes both low-voltage and high-voltage components. For example, electrical system 105 may include 480 VAC components (e.g., grid or grid-tied components, auxiliary components), 120 VAC components/circuits (e.g., auxiliary components), a high voltage DC bus and components (e.g., >400 VDC, >700 VDC, or >1000 VDC components), a low voltage DC bus and components (e.g., 12 VDC, 24 VDC, or 48 VDC components), any other suitable electrical circuits operating with any suitable voltage and current characteristics, or any combination thereof. Intake system 110 is configured to provide reactants (e.g., air, fuel, or both) to generator assembly 102, and exhaust system 108 is configured to remove exhaust products from generator assembly 102. Cooling system 112 is configured to limit, control, or otherwise affect heat transfer and material temperature of components of integrated linear generator system 100. Bearing system 114 is configured to constrain the off-axis motion (e.g., radial, lateral, or otherwise lateral motion) of translators of generator assembly 102 using, for example, a low-friction gas bearing. Frame system 106 is configured to manage rigidity, flexibility, and alignment of components of integrated linear generator system 100. The divisions between, or combination of, systems 102-114 may be implemented in any suitable arrangement and are shown as separate in FIG. 1 for purposes of the following description. For example, any suitable components of control system 104, electrical system 105, frame system 106, bearing system 114, intake system 110, exhaust system 108, and cooling system 112 may be integral to generator assembly 102. Auxiliary system(s) 116 may include any suitable system or subsystem configured to support operation of integrated linear generator system 100.

It will be understood that system 100 is merely illustrative. Any suitable combination of subsystems may be used, including those that contain fewer or more than what is shown in FIG. 1.

Generator assembly 102 includes, for example, the moving and stationary assemblies and components that are configured to convert chemical and/or thermal energy into electrical energy. In some embodiments, generator assembly 102 includes cylinders, translators, stators, bearings, bearing housings, seals, corresponding alignment hardware, any other suitable components, or any suitable combination thereof. In some embodiments, generator assembly 102 is configured to perform a thermodynamic cycle such as, for example, a chemical generator cycle. An illustrative example includes a two-stroke cycle using compression ignition and port breathing via uniflow scavenging (e.g., intake ports at a first axial end and exhaust ports arranged at a second axial end, wherein scavenging occurs primarily axially). In a further example, generator assembly 102 may be configured to perform a cycle approximating, for example, an Otto cycle, a Diesel cycle, an Atkinson cycle, a Miller cycle, a Carnot cycle, an Ericsson cycle, a Stirling cycle, any other suitable idealized or actual cycle, or any suitable combination thereof.

Figure 2:
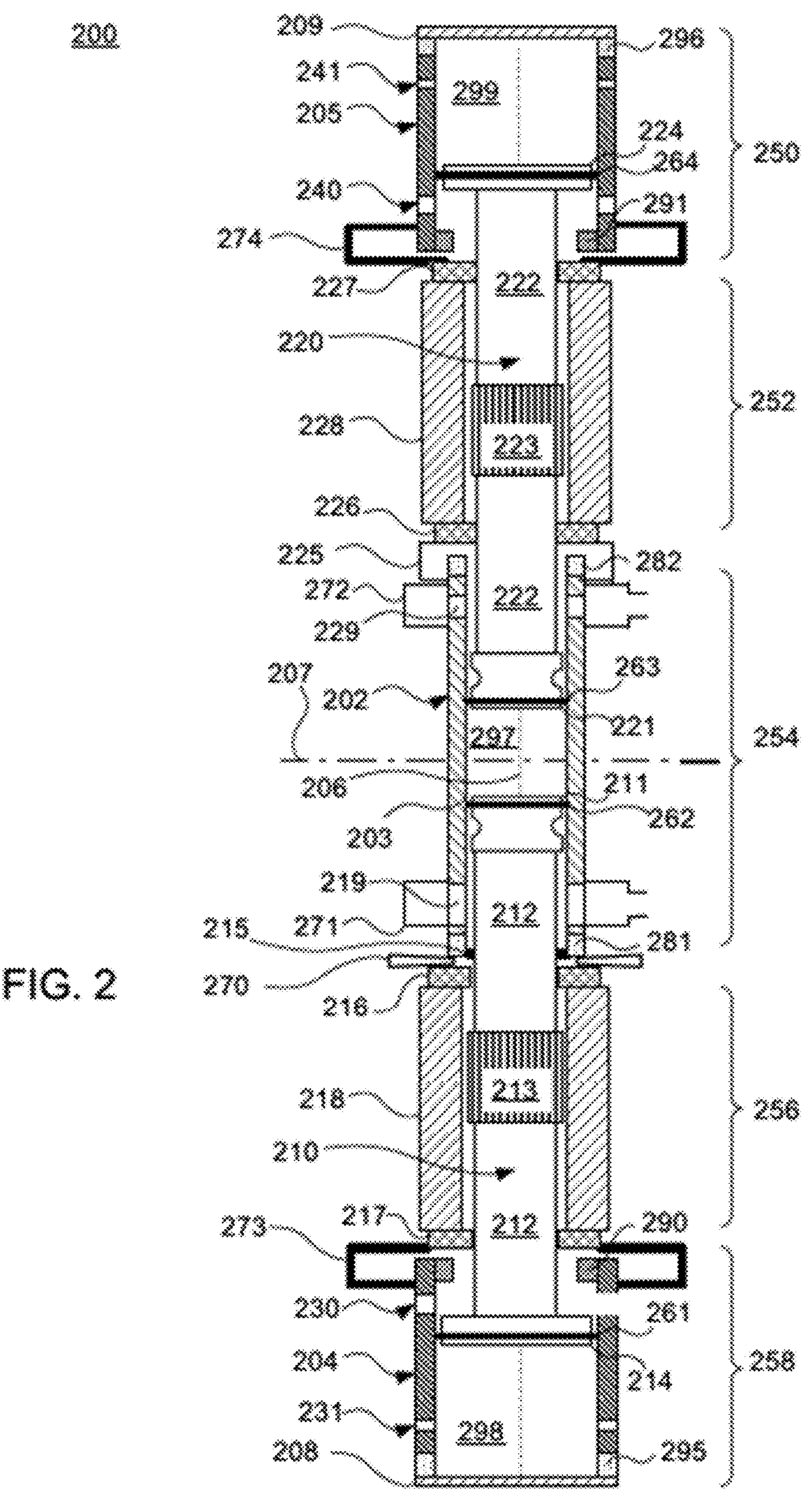
FIG. 2 shows a cross-sectional side view of an illustrative generator assembly, in accordance with some embodiments of the present disclosure.

FIG. 2 shows a cross-sectional view of illustrative generator assembly 200, in accordance with some embodiments of the present disclosure. Generator assembly 200, and the other assemblies and devices of this disclosure, may include any suitable LEM architecture to enable adequate and efficient conversion of kinetic energy of a translator to electrical energy. Generator assembly 200 includes translators 210 and 220, which are configured to move along axis 206 (e.g., translate linearly along axis 206). Translators 210 and 220 are configured to move within cylinders 202, 204 and 205, thus forming expansion and compression volumes 297, 298, and 299 for performing boundary work (e.g., determined using the cyclic integral of PdV over a suitable range such as a stroke or cycle). For clarity, the spatial arrangement of the systems and assemblies described herein will be referred to in the context of cylindrical coordinates, having axial, radial, and azimuthal directions. It will be understood that any suitable coordinate system may be used (e.g., cylindrical coordinates may be mapped to any suitable coordinate system), in accordance with the present disclosure. Note that axis 206 is directed in the axial direction, and the radial direction is defined as being perpendicular to axis 206 (e.g., directed away from axis 206). The azimuthal direction is defined as the angular direction around axis 206 (e.g., orthogonal to both axis 206 and the radial direction, and directed around axis 206).

In some embodiments, the stationary components of generator assembly 200 include cylinder 202, cylinder 204, cylinder 205, stator 218, stator 228, bearing housing 216, bearing housing 217, bearing housing 226, bearing housing 227, seal 215, seal 225, exhaust manifold 271, and intake manifold 272. In some embodiments, bearing housings 216 and 217 are coupled to stator 218 (e.g., either directly connected, or coupled by an intermediate component such as a flexure or mount). For example, bearing housings 216 and 217 may be aligned to (e.g., laterally or axially aligned), and fastened to, stator 218 to maintain a radial air gap between magnet assembly 213 and stator 218. Similarly, in some embodiments, bearing housings 226 and 227 are rigidly coupled to stator 228.

Translator 210 includes tube 212, piston 211, seal 262, piston 214, seal 261, and magnet assembly 213, all rigidly coupled to move as a rigid body along axis 206, relative to the stationary components. Translator 220 includes tube 222, piston 221, seal 263, piston 224, seal 264, and magnet assembly 223, all rigidly coupled to move as a rigid body along axis 206. In some embodiments, pistons 211 and 221 may include features or components to manage, modify, reduce, or otherwise control thermal expansion of or heat transfer to tubes 212 and 222, respectively (e.g., a spacer with low thermal conductivity, a collar that affects the flow of blow-by gases, or both) In some embodiments, magnet assemblies 213 and 223 may be a region of tubes 212 and 222, respectively. In some embodiments, magnet assemblies 213 and 223 may include separate components affixed to tubes 212 and 222, respectively. Reaction section 297 is bounded by pistons 211 and 221 (e.g., and also defined by seals 262 and 263), as well as bore 203 of cylinder 202. Gas springs 298 and 299 are bounded by respective pistons 214 and 224, as well as respective cylinders 204 and 205. Accordingly, as translators 210 and 220 move along axis 206, the volumes of reaction section 297, gas spring 298, and gas spring 299 expand and contract. Further, for example, pressures within those volumes decrease or increase as the volume increases or decreases, respectively. Each of gas springs 298 and 299 may, for example, comprise a plurality of ports, or valves, for one or more of exchanging gas within the spring volume, providing gas to increase pressure within the spring volume, or removing gas within the spring volume. For example, one or more of the ports, or valves, may be in fluid communication with a bearing housing while another of the one or more ports provides fluid into the gas spring from a pressurized source.

Each of bearing housings 216, 217, 226, and 227 is configured to provide a gas bearing between itself and the corresponding translator (e.g., tube 212 and 222). For example, each of bearing housings 216, 217, 226, and 227 may be configured to direct pressurized gas to the gas bearing (e.g., via a flow system). The gas within the gas bearing may be any suitable gas, including air, inert gases, or gases which enable propagation of reactions where such reactions assist in proper and efficient operation of the systems of this disclosure. In an illustrative example, each of bearing housings 216, 217, 226, and 227 may be configured to direct pressurized gas having an absolute pressure greater than ambient pressure (e.g., 1 atm at sea level) to the gas bearing such that bearing gas has sufficient pressure to flow through the gas bearing and into the environment (e.g., directly or via other ducting). In some embodiments, bearing gas may be pressurized relative to the environment (e.g., about 1 atm), a pressure in a breathing system (e.g., a boost pressure, or a gas pressure in an exhaust system that may be greater than or less than 1 atm), or any other suitable pressure reference. In some embodiments, generator assembly 200 is configured for oil-less operation, with bearing housings 216, 217, 226, and 227 forming gas bearings against translators 210 and 220. Each of translators 210 and 220 is configured achieve a position-velocity trajectory. The trajectory may include a top dead center (TDC) position, when the respective translator is nearest axial centerline 207 (i.e., more inboard), and a bottom dead center (BDC) position, where the respective translator is furthest from axial centerline 207 (i.e., more outboard).

Cylinder 202 includes bore 203, which houses reaction section 297. Cylinder 202 also includes illustrative intake breathing ports 219 and exhaust breathing ports 229, which couple bore 203 to the outside of cylinder 202. For example, intake breathing ports 229 couple bore 203 to an intake system, such as intake manifold 272 thereof. In a further example, exhaust breathing ports 219 couple bore 203 to an exhaust system, such as exhaust manifold 271 thereof. Intake manifold 272 may seal to cylinder 202, seal 225 (e.g., by extending axially to seal 225), bearing housing 226 (e.g., by extending axially to bearing housing 226, an intervening component, or a combination thereof. Exhaust manifold 271 may seal to cylinder 202, seal 215, bearing housing 216 (e.g., by extending axially to bearing housing 216, an intervening component, or a combination thereof. In some embodiments, as illustrated, seal 215 includes a contact seal, which may be comprised of a self-lubricating material (e.g., graphite), ceramic material, metal, plastic, or any other suitable material, or any combination thereof. Seal 215 is stationary with respect to the motion of translator 210 and can be housed within a ring compressor 281 (as illustrated), cylinder 202, a dedicated seal holder, or any other suitable component, or any combination thereof. In some embodiments, seal 215 includes a contact seal, non-contact seal, any other suitable seal, or any combination thereof.

In some embodiments, as illustrated, a translator cooler 270 may be included to provide a flow of pressurized gas (e.g., air) used to cool translator 210. In some embodiments, cooling gas for translator cooler 270 may be provided by a blower (e.g., of an intake system), reservoir of a gas spring system, a port of a gas spring system, an external gas supply, any other suitable gas supply, or any combination thereof. In some embodiments, translator cooler 270 may be configured to provide preferential cooling fluid flow. For example, translator cooler 270 may provide more cooling fluid flow to one or more surface areas of translator 210 and less cooling flow to the one or more other surface areas of translator 210, or vice versa. Cooling gas may be provided by a duct (not shown) spanning both LEMS having cooling conduits directed to one or more sections of each translator. In some embodiments, translator cooler 270 may be configured to provide uniform cooling.

When intake breathing ports 229 are not covered by piston 221 (e.g., intake ports are open), fluid exchange between reaction section 297 and the intake system may occur. When exhaust breathing ports 219 are not covered by piston 211, fluid exchange between reaction section 297 and the exhaust system may occur. Fluid flow primarily occurs from the intake system through intake breathing ports 229 to bore 203, and from bore 203 through exhaust breathing ports 219 to the exhaust system. For example, averaged over time, fluid flows from the intake system to bore 203, and from bore 203 to the exhaust system. However, flow may also occur in the opposite directions such as, for example, from blowback or plugging pulses, during some time periods (e.g., intermittent or transient events). In some embodiments, the radially outer surface of cylinder 202 is cooled. For example, the radially-outer surface of cylinder 202 may be air-cooled (e.g., by a cooling system), liquid-cooled (e.g., by a cooling system), or both. In some embodiments, a thermal interface material may be arranged between the air cooling features (such as fins) and cylinder 202 to improve thermal conductivity.

In some embodiments, cylinder 202 may include one or more ports arranged in between intake breathing ports 229 and exhaust breathing ports 219, which may be configured to house sensors (e.g., coupled to a control system), fuel injectors (e.g., coupled to an intake system or dedicated fuel system), or any other suitable components that may require access to bore 203. Along axis 206, intake breathing ports 229 and exhaust breathing ports 219 may be, but need not be, positioned symmetrically about a center of cylinder 202. Port location can be referenced to any suitable datum, however, one datum is the position of the front of the port (e.g., nearest axial centerline 207). The front of the ports defines the closed portion of the cycle (e.g., the start of compression, the end of expansion, the start of breathing, the end of breathing). For example, in some embodiments, exhaust breathing ports 219 may be closer to axial centerline 207 than intake breathing ports 229. To illustrate, exhaust breathing ports 219 may open to reaction section 297 before intake breathing ports 229 during an expansion stroke, and exhaust breathing ports 219 may close to reaction section 297 after intake breathing ports 229 during a compression stroke.

In some embodiments, breathing techniques other than uniflow scavenging may be used, such as, for example, loop scavenging or cross scavenging, and accordingly breathing ports may be positioned to be uncovered by only a single piston (e.g., with intake and exhaust breathing ports on the same side axially of the cylinder). In some embodiments, the centerline of piston positions may be changed during operation to change the relative timing of port openings and closings. For example, while the port locations may be spatially fixed on cylinder 202, the apex positions of pistons 211 and 221 (e.g., TDC position and BDC position) may be selected to move the TDC centerline (e.g., the midpoint between TDC positions of pistons 211 and 221 in either axial direction). In a further example, moving the TDC centerline may allow breathing behavior to be changed. The timing of port opening and closing, relative strength (e.g., amplitude in pressure wave), or both, of breathing behavior may be changed accordingly. Further, the compression ratio, expansion ratio, or both, may be changed by moving the TDC centerline or the BDC positions. To illustrate, the TDC centerline may, but need not, coincide axially with axial centerline 207. Breathing port locations and piston apex positions may be used to affect breathing behavior.

In some embodiments, the BDC position of one or both pistons may be changed during operation to change the relative timing of port openings and closings. For example, one port may be maintained open longer to impact breathing. It will be understood that TDC and BDC refer to respective positions of pistons in contact with a reaction section (e.g., which correspond to BDC an TDC of pistons in contact with gas springs, respectively). For example, at or near TDC, a reaction section has a minimum volume, and a gas spring has a maximum volume. In a further example at or near BDC, a reaction section has a maximum volume, and a gas spring has a minimum volume. In some embodiments, cylinder assembly 254 includes cylinder 202, intake manifold 272, exhaust manifold 271, mounting hardware (e.g., mounts, flexures, or other hardware), and any other suitable components that may be mounted as a unit. Ring compressors 281 and 282 are coupled to the axial ends of cylinder 202 for the purposes of maintaining seals 262 and 263, respectively, within pistons 211 and 221, respectively, during replacement, installation, removal, or inspection. For example, during inspection or maintenance, translators 210 and 220 may be positioned axially so that ring compressors 281 and 282 are axially aligned with respective seals 262 and 263. Further, ring compressors 281 and 282 may be removed with respective pistons 211 and 221 during maintenance or inspection. Ring compressors 281 and 282 may have the same or similar inner diameter as bore 203 of cylinder 202.

In some embodiments, ring compressors 281 and 282 may comprise of two or more sections (e.g., a clamshell design) configured to hold seals 262 and 263 in place during replacement, installation, removal, or inspection. In some embodiments, ring compressors 281 and 282 may comprise a single piece configured to hold seals 262 and 263 during replacement, installation, removal, or inspection. Ring compressors 281 and 282 may be attached to cylinder 202 through any suitable means, including but not limited to, v-band clamps, fasteners, bolts, springs, or any combination thereof.

In some embodiments, as illustrated, cylinders 204 and 205 are closed by respective heads 208 and 209, which may be bolted or otherwise fastened to cylinders 204 and 205 (e.g., to suitable flanges of cylinders 204 and 205). In some embodiments, cylinders 204 and 205 include a closed end (e.g., to seal gas springs 298 and 299, respectively), and no separate head need be included. In some embodiments, as illustrated, spacers 295 and 296 are arranged to provide axial space, and hence volume, to respective gas springs 298 and 299. Spacers 295 and 296 may be bolted, fastened, or otherwise secured to respective cylinders 204 and 205, respective heads 208 and 209, or both. In some embodiments, spacers 295 and 296 are configured to function as ring compressors (e.g., during disassembly, inspection or replacement of rings). In some embodiments, spacers 295 and 296 may comprise two or more sections (e.g., a clamshell design). Cylinders 204 and 205 include respective lower-pressure ports 230 and 240 for exchanging lower pressure gas and respective higher-pressure ports 231 and 241 for exchanging higher pressure gas. In some embodiments, lower-pressure ports 230 and 240 are coupled to the environment, with the corresponding gas flow referred to herein as "atmospheric breathing."

In some embodiments, lower-pressure ports 230 and 240 are coupled to a low-pressure reservoir or source (e.g., conditioned atmospheric air or other suitable gas reservoir or source above atmospheric pressure). For example, lower-pressure ports 230 and 240 may be coupled to respective reservoirs 273 and 274, as illustrated. Reservoirs 273 and 274 may be configured to seal back sections of pistons 214 and 224, respectively. As illustrated, reservoirs 273 and 274 are sealed against bearing housings 217 and 227, respectively, and also cylinders 204 and 205, respectively. Reservoirs 273 and 274 may be sealed against any suitable component of a linear generator including, for example, a frame, a stator, a gas spring head, any other suitable component, or any combination thereof. The volume of reservoirs 273 and 274 may be sized to minimize or otherwise limit pressure fluctuations in gas in the respective back sections. In some embodiments, a filter may be installed at, or upstream of, lower-pressure ports 230 and 240 to prevent the intake of particles (e.g., dust or debris), certain molecules (e.g., water in some instances), or other undesirable constituents of the gas source. In some embodiments, cylinders 204 and 205 need not include lower-pressure ports 230 and 240, higher-pressure ports 231 and 241, or any ports at all. For example, in some embodiments, no high-pressure ports are included, and low-pressure ports 230 and 240 are included to provide make-up gas to make up for blow-by past respective pistons 214 and 224 (e.g., and may be included at any suitable location in the corresponding cylinder or cylinder head if applicable). In some embodiments, flow from high-pressure ports 230 and 240 may be directed to provide pressure for gas bearings (e.g., to bearing housings 216, 217, and 226, 227, respectively) thus using the gas spring as a compressor to provide compressed gas to the gas bearings.

In some embodiments, driver sections 250 and 258 may include features for removing energy from the generator system to protect against damage or failures (e.g., overpressure of gas spring 298 or 299, loss of scaling of gas spring 298 or 299). For example, either or both of cylinders 204 and 205 may include grooves (e.g., "scallops") configured to allow higher-pressure gas to leak around the seals (e.g., rings) if pistons 214 and 224 overtravel, thus causing the gas spring to lose pressure and energy. In a further example, a pressure relief valve may be included and coupled to the gas spring to cause the gas spring to release energy (e.g., gas) if the pressure exceeds a design threshold.

Stator 218, magnet assembly 213, tube 212, and bearing housings 216 and 217 form linear electromagnetic machine (LEM) 256. Similarly, stator 228, magnet assembly 223, tube 222, and bearing housings 226 and 228 form LEM 252. Further, a LEM may optionally include one or more pistons. For example, a LEM may be defined to include stator 218, translator 210, and bearing housings 216 and 217. In a further example, a LEM may be defined to include stator 228, translator 220, and bearing housings 226 and 227. A LEM includes a stationary assembly (e.g., a stator and bearing housings) and a translating assembly (e.g., a translator) that is constrained to move along an axis, wherein the stator is capable of applying an electromagnetic force on the translator to cause and/or effect motion along the axis. The bearing housings of a LEM may be, but need not be, affixed to the stator. For example, the bearings housings may be coupled to the stator, a structural frame, a cylinder, either directly or by any intervening components, or any combination thereof. Stators 218 and 228 may include a plurality of phase windings, which form a plurality of phases. The current in each of the phases may be controlled in time by a control system (e.g., which may include corresponding power electronics and processing equipment) to affect the position of translators 210 and 220, motion of translators 210 and 220, work interactions with translators 210 and 220, or any combination thereof.

In some embodiments, magnet assemblies 213 and 223 include permanent magnets arranged in an array (e.g., of alternating North and South poles). Because translators 210 and 220 move as substantially rigid assemblies, electromagnetic forces applied to respective magnet assemblies 213 and 223 accelerate and decelerate translators 210 and 220. In some embodiments, stators 218 and 228 may be air-cooled (e.g., by an air cooling system), liquid-cooled (e.g., by a liquid cooling system), or both. In some embodiments, stators 218 and 228 are arranged around respective translators 210 and 220, or respective magnet assemblies 213 and 223 thereof (e.g., the motor air gap is arcuate with a thickness profile). For example, stators 218 and 228 may extend fully around (e.g., 360 degrees azimuthally around) or partially around (e.g., having azimuthally arranged segments and azimuthally arranged gaps between windings of a phase) respective translators 210 and 220. In some embodiments, stators 218 and 228 are arranged axially along respective translators 210 and 220, or respective magnet assemblies 213 and 223 thereof. For example, magnet assemblies 213 and 223 may include flat magnet sections and stators 218 and 228 may include flat surfaces that correspond to the magnet sections (e.g., the motor air gap is planar with a thickness profile). In some embodiments, stators 218 and 228 extend axially along respective translators 210 and 220, or respective magnet assemblies 213 and 223 thereof.

In some embodiments, generator assembly 200 includes one or more features for protecting components of generator assembly 200 from damage due to mechanical failures, control failures, component failures, operation at extreme conditions, or a combination thereof. Bump stops 290 and 291, as illustrated, are arranged to convert kinetic energy from respective translators 210 and 220 into deformation, by contacting respective pistons 214 and 224 (or other locations on a translator) in the event of an overtravel of the translators. For example, one or both of stators 218 and 228 may include one or more features for protecting generator assembly 200. In some embodiments, one or both of stators 218 and 228 include one or more features (e.g., a bump stop, mechanical springs, pneumatic pistons) configured to convert translator kinetic energy into sound, heat, solid deformation, or a combination thereof, thus slowing, stopping, or redirecting the translator's motion. For example, a bump stop may be configured to undergo a plastic deformation (e.g., be bent, compacted, crumpled, punched or otherwise deformed) upon contact with a translator to convert kinetic energy of the translator. In some embodiments, one or more bump stops may be arranged at either or both of driver sections 250 and 258. In some embodiments, bump stops are included as part of other components of generator assembly 200 such as, for example, driver sections 250 and 258.

In some embodiments, bump stops are located at each end of cylinder 202 near BDC. A bump stop may be affixed directly or with intervening components to a structural frame at any suitable location, affixed directly or with intervening components to a cylinder at any suitable location (e.g., cylinder 203, 204, 205, or a combination thereof), affixed directly or with intervening components to a stator, or a combination thereof. In some embodiments, generator assembly 200 may include features or components for affixing to a structure frame. For example, cylinder assembly 254, driver sections 250 and 258, and LEMs 252 and 256 may include one or more features or components for affixing to a structural frame, one or more features or components for aligning to a structural frame, one or more components or features for aligning off of a structural frame to another component (e.g., LEM 252 to LEM 256, cylinder assembly 254 to a LEM), or any combination thereof. In some embodiments, features or components used to affix a portion of generator assembly 200 to a structural frame may provide compliance in a direction (e.g., axially, laterally, or radially) and stiffness in a different direction (e.g., axially stiff while radially compliant) to allow for changes during operation.

Figure 3:
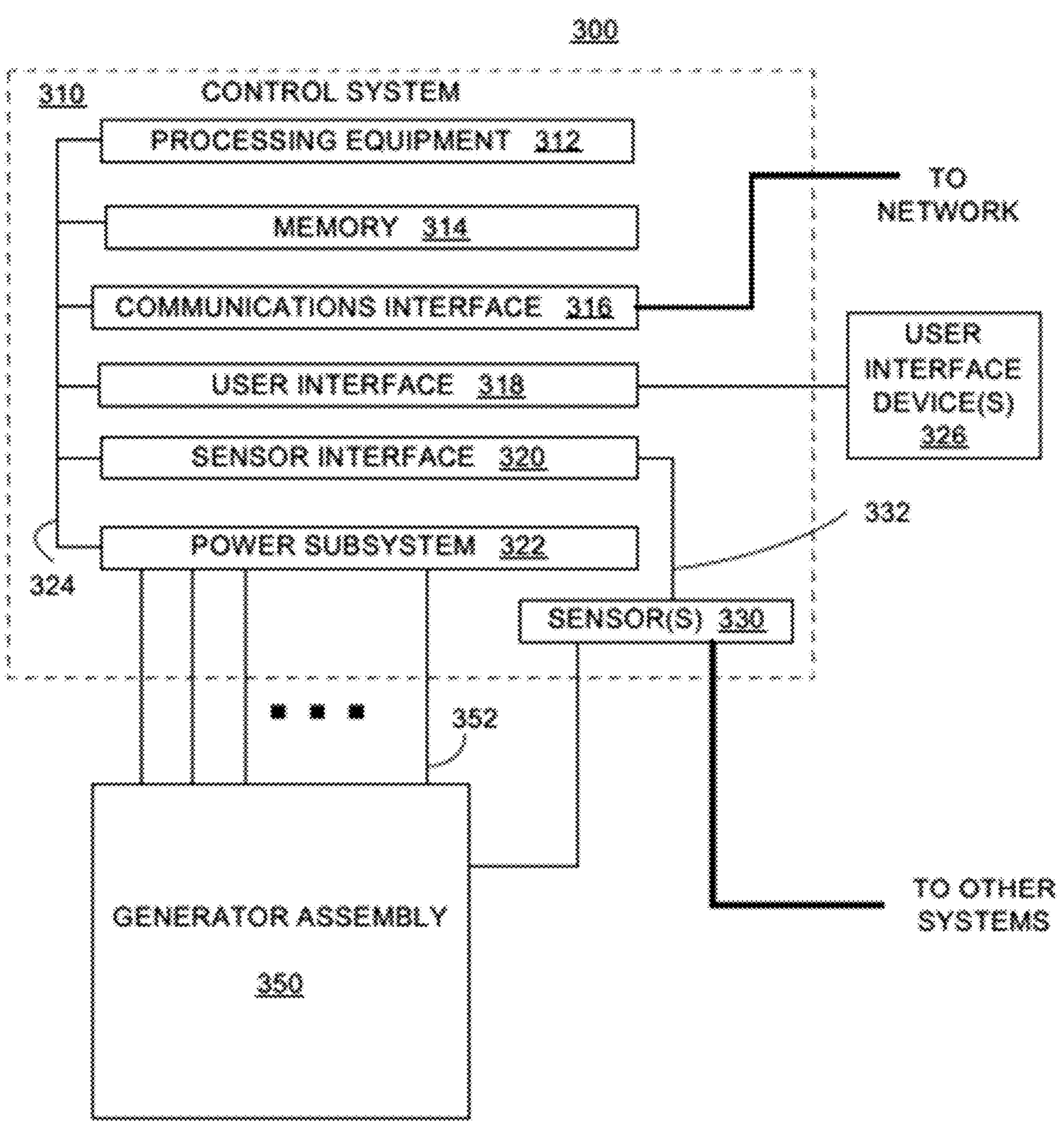
FIG. 3 is a block diagram of an illustrative linear generator, including a control system for controlling operation of a generator assembly, in accordance with some embodiments of the present disclosure.

FIG. 3 is a block diagram of illustrative linear generator 300, including control system 310 for controlling operation of generator assembly 350, in accordance with some embodiments of the present disclosure. Generator assembly 350 may include one or more stators, each including multiple windings corresponding to multiple phases (e.g., each phase includes one or more windings). For example, a stator may include three or more phases, which may electromagnetically interact with a translator to apply force to the translator. For example, a phase may apply a force on the translator in the same direction of motion (e.g., motoring) or in the opposite direction of motion (e.g., braking or generating), or a combination thereof (alternately) over the course of a stroke or cycle. The current flow (e.g., direction and magnitude) in each winding, and hence each phase (e.g., even if more than one winding is included in a phase), may be controlled by control system 310 and supplied/received using power subsystem 322.

Control system 310 may include processing equipment 312, memory 314, one or more communications interfaces 316, one or more user interfaces 318, sensor interface 320, power subsystem 322, any other suitable components or modules that are not shown, or any combination thereof. Control system 310 may be implemented at least partially in one or more computers, embedded systems, terminals, control stations, handheld devices, modules, any other suitable interface devices, or any combination thereof. In some embodiments, the components of control system 310 may be communicatively coupled via one or more communications buses 324, as shown in FIG. 3.

In some embodiments, control system 310 is configured to control trajectories of translators, control a power output, control energy storage, control operating conditions, respond to electrical loads, manage the provision of intake gas to a cylinder, manage the removal of exhaust gas from the cylinder, ensure safe operation (e.g., perform diagnostics and detect faults), any other suitable function, or any suitable combination thereof (e.g., all of the aforementioned).

In some embodiments, control system 310 receives information from one or more sensors 330, user inputs (e.g., at user interface 318), reference databases (e.g., look-up tables stored in memory 314), any other sources, or any combination thereof, and determine corresponding control responses. For example, control system 310 may receive position information from sensors 330 relating to a translator and stator of generator assembly 350, along with desired force information, and determine current values for one or more phases of the electromagnetic machine. In some embodiments, control system 310 controls the current in each phase of a stator. In some embodiments, control system 310 controls the current in each phase based on position information (e.g., axial position, axial velocity, axial acceleration), magnetic flux information, motor constant information (e.g., force constant, back emf), any other suitable information, or any combination thereof. Control system 310 may control the magnitude of current in each phase, direction of current flow in each phase, or both. Control system 310 may control the commutation of currents in a plurality of phases.

Processing equipment 312 may include a processor (e.g., a central processing unit), cache, random access memory (RAM), read only memory (ROM), any other suitable components, or any combination thereof that may process information regarding multiphase electromagnetic machine 350. Memory 314 may include any suitable volatile or non-volatile memory that may include, for example, random access memory (RAM), read only memory (ROM), flash memory, a hard disk, any other suitable memory, or any combination thereof. Information stored in memory 314 may be accessible by processing equipment 312 via communications bus 324. For example, computer readable program instructions (e.g., for implementing the techniques disclosed herein) stored in memory 314 may be accessed and executed by processing equipment 312. In some embodiments, memory 314 includes a non-transitory computer readable medium for storing computer executable instructions that cause processing equipment 312 (e.g., processing equipment of a suitable computing system), to carry out a method for controlling a generator assembly, intake system, exhaust system, cooling system, bearing system, gas spring system, any other suitable systems, or any combination thereof. For example, memory 314 may include computer executable instructions for implementing any of the control techniques described herein.

In some embodiments, communications interface 316 includes a wired connection (e.g., using IEEE 802.3 ethernet, or universal serial bus interface protocols), wireless coupling (e.g., using IEEE 802.11 "Wi-Fi," Bluetooth, or via cellular network), optical coupling, inductive coupling, any other suitable coupling, or any combination thereof, for communicating with one or more systems external to control system 310. For example, communications interface 316 may include a USB port configured to accept a flash memory drive. In a further example, communications interface 316 may include an Ethernet port configured to allow communication with one or more devices, networks, or both. In a further example, communications interface 316 may include a transceiver configured to communicate using any suitable standards over a cellular network.

In some embodiments, user interface 318 includes a wired connection (e.g., using IEEE 802.3 ethernet, or universal serial bus interface, tip-ring-seal RCA type connection), wireless coupling (e.g., using IEEE 802.11 "Wi-Fi," Infrared, Bluetooth, or via cellular network), optical coupling, inductive coupling, any other suitable coupling, or any combination thereof, for communicating with one or more of user interface devices 326. User interface device(s) 326 may include a display, keyboard, mouse, audio device, any other suitable user interface devices, or any combination thereof. For example, a display may include a display screen such as, for example, a cathode ray tube screen, a liquid crystal display screen, a light emitting diode display screen, a plasma display screen, any other suitable display screen that may provide graphics, text, images or other visuals to a user, or any combination of screens thereof. Further, a display may include a touchscreen, which may provide tactile interaction with a user by, for example, offering one or more soft commands on a display screen. In a further example, user interface device(s) 326 may include a keyboard such as a QWERTY keyboard, a numeric keypad, any other suitable collection of hard command buttons, or any combination thereof. In a further example, user interface device(s) 326 may include a mouse or any other suitable pointing device that may control a cursor or icon on a graphical user interface displayed on a display screen. In a further example, user interface devices 326 may include an audio device such as a microphone, a speaker, headphones, any other suitable device for providing and/or receiving audio signals, or any combination thereof. In some embodiments, user interface 318, user interface device(s) 326, or both, need not be included (e.g., control system 310 need not receive user input nor provide output to a user). In some embodiments, user interface device(s) 326 includes a computing device with which a user may interact. For example, user interface device(s) 326 may include a computer having touchscreen, and a software application (e.g., a web portal hosted by an applications server or other host system) may generate a display and process user input. In a further example, user interface device(s) 326 may be coupled to communications interface 316 (e.g., using a web-based application implemented over a network connection).

In some embodiments, sensor interface 320 includes a power supply (e.g., for supplying power to sensor(s) 330), a signal conditioner, a signal pre-processor, any other suitable components, or any combination thereof. For example, sensor interface 320 may include one or more filters (e.g., analog and/or digital), an amplifier, a sampler, and an analog to digital converter for conditioning and pre-processing signals from sensor(s) 330. In some embodiments, sensor interface 320 communicates with sensor(s) 330 via communicative coupling 332, which may be a wired connection (e.g., using IEEE 802.3 ethernet, or universal serial bus interface), wireless coupling (e.g., using IEEE 802.11 "Wi-Fi," or Bluetooth), optical coupling, inductive coupling, any other suitable coupling, or any combination thereof.

Sensor(s) 330 may include any suitable type of sensor, which may be configured to sense any suitable property or aspect of generator assembly 350, any other system, or any combination thereof. In some embodiments, sensor(s) 330 includes a linear encoder, rotary encoder, or both, configured to sense a relative position between a translator and stator of generator assembly 350. In some embodiments, sensor(s) 330 includes an accelerometer configured to sense an acceleration of a translator relative to a fixed stator, a vibration of a nominally static component, or any other suitable acceleration. In some embodiments, sensor(s) 330 includes a camera configured to capture images (e.g., time-lapse imaging) of a translator relative to a stator of generator assembly 350. In some embodiments, sensor(s) 330 includes one or more current sensors (e.g., coupled to a phase of a stator of generator assembly 350), one or more voltage sensors (e.g., coupled to a phase of a stator of generator assembly 350), or both, configured to sense a voltage, current, work output and/or input (e.g., current multiplied by voltage), any other suitable electrical property of a linear generator, or any combination thereof. In some embodiments, sensor(s) 330 includes one or more temperature sensors such as, for example, a thermocouple, a thermistor, a resistance temperature detector (RTD), any other suitable sensor for detecting temperature, or any combination thereof. For example, sensor(s) 330 may include a thermocouple arranged to measure a temperature of a permanent magnet, a winding, a power subsystem component such as a transistor, a cylinder, a bearing housing, a gas (e.g., an intake gas or an exhaust gas), or any other component or fluid of a linear generator. In some embodiments, control system 310 is configured to control axial positions of translators of generator assembly 350 during non-operating events (e.g., when not generating power). For example, in some embodiments, control system 310 is configured to move the translators axially outward and engage a locking mechanism (not shown in the figure) to lock the translators in place axially during maintenance, inspection, or removal, installing, or replacement of components in the generator assembly 350.

In some embodiments, sensor(s) 330 may be included in control system 310. In some embodiments, sensor(s) 330 may be integrated, partially or wholly, into generator assembly 350 (e.g., an encoder tape affixed to a translator). In some embodiments, sensor(s) 330, sensor interface 320, or both, may be removable from, external to, optionally omitted from, optionally installed with, or otherwise not included in, control system 310. For example, sensor(s) 330 may include piezoelectric pressure sensors having control circuitry separate from control system 310. Further to this example, the control circuitry may be optionally integrated into control system 310.

In some embodiments, power subsystem 322 includes control circuitry, power electronics, electric loads (e.g., for dissipation of electrical energy to heat via a resistive load bank), grounds (e.g., chassis or earth ground), terminal strips, electric power storage equipment (e.g., batteries, capacitors), electric bus lines for transferring power, insulated gate bipolar transistors (IGBTs), mechanical relays, solid state relays, power diodes, thyristors, metal oxide semiconductor field-effect transistors (MOSFETs), any other suitable transistors, switches, contactors, fuses, pulse width modulation controllers, digital to analog controllers, any other suitable electronic components, any other suitable controllers, or any combination thereof. Power subsystem 322 may receive control signals via communications bus 324 from processing equipment 312 regarding generator assembly 350. For example, power subsystem 322 may include multiple IGBTs coupled via power coupling 352 to corresponding phase leads of the multiple phases of a stator. The IGBTs may be coupled to high and low bus voltage lines, as well as the windings of the phases, which may be coupled to a wye neutral point. In some embodiments, power coupling 352 includes one or more cables, leads, connectors, or a combination thereof. For example, each phase of a stator may be coupled via a respective cable to corresponding terminals of power subsystem 322. In some embodiments, power subsystem 322 includes a virtual phase, which may accommodate current flow, but does not correspond to any phase of a stator of generator assembly 350. In some embodiments, power subsystem 322 includes a grid tie inverter (GTI), configured to manage electric power interactions between linear generator 300 and an electric power grid. For example, in some embodiments, power subsystem 322 may include a DC bus, having a DC voltage managed by a GTI. In some embodiments, power subsystem 322 includes batteries, capacitors, or both, for storing electrical energy from the linear generator system, an external source (e.g., the electric grid), or both, and for discharging the stored electrical energy to support the operation of the linear generator system (e.g., for start-up, for output load). In an illustrative example, power subsystem 322 may include, or be similar to, electrical system 105 of FIG. 1. Accordingly, referencing FIG. 1, control system 104 and electrical system 105 may be combined.

Although not shown in FIG. 3, control system 310 may include one or more system interfaces for controlling, monitoring, receiving information from, or a combination thereof, any suitable system. For example, a control system may include a motor controller for controlling a boost blower motor. In a further example, a control system may include a motor controller for controlling a fan of the cooling system.

In an illustrative example, control system 310 may be configured to control a force interaction between a translator and a stator. The force may be applied to the translator by controlling currents (e.g., magnitude and direction) in one or more phases that interact electromagnetically with the translator. In some embodiments, a desired force is determined based on position information, velocity information, acceleration information or a combination thereof, and control system 310 applies current to one or more phases to achieve the desired force on the translator (e.g., the achieved force may be, but need not be equal to the desired force). An encoder may be used to determine a position of the translator relative to the stator, a velocity of the translator (e.g., by calculating a suitable time derivative or second time derivative using any suitable analytical or numerical differentiation technique), an acceleration of the translator (e.g., by calculating a time derivative using any suitable analytical or numerical differentiation technique), any other suitable information, or any combination thereof.

In a further illustrative example, control system 310 may be configured to control the storage, accumulation, and conversion of energy in a gas spring during operation of the linear generator system (e.g., during a cycle of the generator assembly). In some embodiments, the operation of a gas spring may be adjustable (e.g., the amount of energy stored, the maximum pressure, or the minimum pressure may be adjustable). In some embodiments, a low-pressure port, a high-pressure port, or both, may be utilized to control characteristics of the gas spring. For example, the low-pressure port, the high-pressure port, or both, may be used to control the amount, temperature, pressure, any other suitable characteristics, and/or any combination thereof of the gas in the gas spring. In some embodiments, adjusting any of the aforementioned characteristics, and thus adjusting the amount of mass in the gas spring, may vary the effective spring constant of the gas spring.

The effective spring constant may depend on, for example, gas temperature, gas pressure, gas composition, a quantity derived thereof (e.g., density), or a combination thereof. For example, to effect a change in stored energy, one may change the effective spring constant, the displacement, or both. Two illustrative approaches include: (1) for a fixed effective spring constant (e.g., which may still include a known position dependence), displacement may be used to control the amount of energy stored in the gas spring, and (2) for a fixed displacement (e.g., fixed TDC and BDC positions), the effective spring constant may be used to control the amount of energy stored in the gas spring. To illustrate, in some embodiments, control system 310 is configured to control axial displacement of the translator to control the storage of energy in a gas spring. For example, control system 310 may control the BDC position (i.e., the outboard apex position which is the TDC of the gas spring) of a translator during a stroke to store a desired amount of energy in the corresponding gas spring (e.g., at least a sufficient amount of energy to perform a subsequent stroke without requiring net electrical input during the subsequent stroke). Further, in some circumstances, a more outboard BDC position may correspond to a relatively larger energy being stored in the gas spring (e.g., such that it is possible to produce net electrical output from generator assembly 350 to power subsystem 322 during a subsequent stroke while providing enough energy to perform the subsequent stroke). Further, control system 310 may determine, or estimate, the required energy to perform a subsequent stroke, and may control the storage of energy in the gas spring to store at least the required energy during an expansion stroke (i.e., during expansion of a reaction section and simultaneous compression of the gas spring). In some embodiments, one or more parameters associated with an auxiliary system is adjusted to effect flow in to, or out of, a gas spring. For example, gas spring supply tank pressure, a regulator pressure, or other parameter may be adjusted to affect a flow of gas to a low-pressure port (e.g., flow into a gas spring) or a high-pressure port (e.g., flow out of a gas spring) of a gas spring system.

In some embodiments, the geometry of a gas spring may be adjusted to obtain desirable operation. For example, the volume of the gas spring may be increased or decreased by controlling the gas exchange with the gas spring via the low-pressure port, the high-pressure port, or both, and the characteristics of the gas flowing therein. In some embodiments, the dead volume within the cylinder may be adjusted to vary the spring constant of the gas spring (e.g., another form of affecting change in position or volume of the gas spring). It will be understood that any of the aforementioned control and adjustment of the gas spring therein may provide for control of the amount of energy stored by the gas spring during an expansion stroke of the generator assembly. It will also be understood that the aforementioned control of the characteristics of the gas spring may also provide for control in the frequency of cycles of the generator assembly.

In some embodiments, an exhaust system may be tuned along with an intake system to affect the breathing process. In some embodiments, one or more intake runners and one or more exhaust tuned pipes may be configured to provide a breathing process having particular breathing characteristics. For example, one or more intake runners and one or more exhaust tuned pipes may include predetermined lengths, diameters, or both, to generate desired breathing characteristics. In an illustrative example, a desired breathing characteristic may include an instant pressure profile in the intake manifold and an instant pressure profile in the exhaust manifold that cause intake gas to be drawn into the bore (e.g., a high intake manifold pressure occurring when an exhaust suction wave occurs). In a further illustrative example, a desired breathing characteristic may include a plugging pulse from the exhaust system that limits, reduces, or prevents substantial blow-through of unreacted fuel in the exhaust (e.g., prevents greater than one, ten, one hundred, or one thousand parts per million increase in fuel in the exhaust gas). Desired breathing characteristics may allow lower boost pressures, lower blower power requirement, lower emissions, higher indicated power, higher indicated efficiency, lower fuel consumptions, or a combination thereof.

In some embodiments, the exhaust system, the intake system, and the generator assembly may be configured to exhibit desired breathing characteristics. For example, the axial arrangement and design of intake and exhaust breathing ports (e.g., positions of the breathing ports along the axis of the cylinder), the design of the intake system (e.g., size and shape of the intake manifold or the type of fuel injection strategy), the design of the exhaust systems (e.g., size and shape of the exhaust manifold or the length of the tuned pipe), intake boost pressure, along with other suitable system properties and operational modes, may affect breathing characteristics. In some embodiments, desired breathing and exhaust characteristics may be achieved by configuring various geometric properties such as intake breathing ports' open and close positions, intake runner length and cross section, exhaust breathing ports' open and close positions, tuned pipe length and cross-section, exhaust runner length and cross-section, manifold volumes and lengths scales, or any combination thereof. It will be understood that a port's opening or closing is referred to in the context of its coupling to a compression/expansion volume (e.g., in front of a seal, such as the forward portion of a piston). For example, a port may be closed by a piston while remaining open to a volume behind the piston seal, near a translator tube (e.g., a reaction back section). In a further example, ports being open or closed refers to the pathway for gas exchange between the respective manifolds/plenums and the volume of the cylinder bore between the intake and exhaust ports. To illustrate, the compression/reaction section volume "V" may be given by:

$$V=A_{Cyl}(x_{ip}+x_{ep})$$

where "Acyl" is the nominal cross sectional area of the bore, "$x_{ip}$" is the axial position of the intake-side piston face, "$x_{ep}$" is the axial position of the exhaust-side piston face, with axial positions measured from a centerline of the cylinder (e.g., axial centerline 207 of FIG. 2). The volume behind a piston may also undergo compression and expansion in some circumstances.

Breathing characteristics such as the amplitudes of a blow-down pulse, plugging pulse, and a suction wave, and the timing thereof during the breathing process, may be affected by geometric properties of the system. Further, operational properties may be configured to cause desired breathing characteristics and may include intake gas pressure generated by a boost blower, in-bore gas pressure when exhaust breathing ports are uncovered, equivalence ratio, top dead center (TDC) position of piston faces when the reaction cylinder volume is at a minimum during an operating cycle (e.g., near the center), bottom dead center (BDC) position of piston faces when the reaction cylinder volume is at a maximum during an operating cycle (e.g., away from the center of the cylinder), fuel pressure, and frequency (e.g., inverse of cycle time) of the translator reciprocation. For example, TDC and BDC positions may affect the timing and duration of the breathing process. In a further example, the equivalence ratio may affect the amplitude of the blow-down pulse and the wave characteristics in the tuned pipe. In some embodiments, the TDC position of a piston face may be adjusted relative to a centerline to affect breathing, the BDC position may be adjusted relative to the ports to affect breathing, or both. For example, for an opposed piston configuration, the TDC and BDC positions of each translator may be adjusted to affect breathing or other generator performance.

In some embodiments, operating characteristics may be pre-defined by a manufacturer, user, or both. For example, particular operating characteristics may be stored in memory of processing equipment, and may be accessed to provide one or more control signals. In some embodiments, one or more of the operating characteristics may be changed by a user. Control system 310 may be used to maintain, adjust, or otherwise manage those operating characteristics. For example, control system 310 may be used to alter operation based on environmental conditions such as temperature and pressure.

In some embodiments, control system 310 computes a position-force trajectory for the one or more translators in a free-piston generator based at least in part on a desired generator performance (e.g., a desired apex position) and a current position of one or more translators. Based on the calculated position-force trajectory, control system 310 effects the displacement of the one or more translators by applying particular forces to the one or more translators over a specified time or position intervals. The calculation of each position-force trajectory by control system 310 is computed without regard to a deviation from a previously determined trajectory (position-force, time-position, or any other suitable trajectory). Control system 310 may calculate a position-force trajectory when a particular trigger is activated (e.g., in response to a particular event), repeatedly over a generator stroke or cycle, after changes to the operating state of the generator, or any combination thereof. In some embodiments, control system 310 may also calculate a position-force trajectory without regard to the timing of a desired generator performance. In some instances, control system 310 may calculate a position-force trajectory based on the operating state of the generator.

In some embodiments, control system 310 may estimate a current operating parameter of the generator based on a preceding force that was calculated as part of a previous position-force trajectory or based on a preceding force that was applied to the one or more translators. In certain instances, control system 310 may calculate a position-force trajectory using a closed-form solution, a numerically iterative solution, or a combination of both. In embodiments with multiple translators, control system 310 may, in addition to calculating a position-force trajectory for each respective translator, also calculate synchronization forces for the multiple translators and cause certain forces to be applied to the multiple translators based on the synchronization calculations to synchronize the movements of the multiple translators as desired. In some embodiments, the control system 310 may employ a hybrid control strategy that switches between a position-force trajectory control technique and another control technique (e.g., a control technique that relies on the calculation of deviation from a previously determined trajectory) depending on the operating state of the generator.

A consideration that arises in the control of free-piston generators with opposed pistons, is the synchronization of the translators. In some opposed-piston free-piston generators, it can be desired that the apices (at both TDC and BDC) of the two translators be at least substantially synchronized in order to maintain system stability. In other opposed-piston free-piston generators, some level of non-synchronization can be desired for generator performance purposes, such as, for example, generator breathing, gas exchange, or any other suitable generator operating condition. In some embodiments of an opposed-piston free-piston generator, control system 310 may regulate a difference between the positions of the respective translator. As used herein, the term "regulate" refers to controlling to a reference, such as, for example, zero. Control system 310 may employ any suitable control technique for regulation, such as proportional-integral-derivative (PID) control, optimal control, robust control, linear-quadratic regulator control, model-predictive control, adaptive control, any other suitable technique, or any combination thereof.

In some embodiments, control system 310 may use PID control to regulate and synchronize the positions of translators. For example, control system 310 may use PID control to determine control inputs (e.g., forces values to be applied to the translators by respective LEMs) to regulate a difference in position between the translators relative to their center of motion. Opposite forces may be added to each translator to synchronize each equally and minimize the disturbance on apex positions. This may be done continuously to balance net forces and, therefore, maintain sufficient synchronization. In some embodiments, control system 310 may use a specified Poincare map at the zero-velocity positions of the translators (i.e., at the respective apices). For example, control system 310 can split a stroke into two halves and apply additional motor force in one direction during the first half of the stroke and then apply additional motor force in the opposite direction during the second half of the stroke.

Control system 310 can determine prior to an expansion stroke that a first translator is going to be late to BDC (e.g., using any suitable expected phasing of the two translators, based on timing of a previous stroke, based on any other suitable technique, or any combination thereof), and apply additional motor force to this first translator during the first half of the expansion stroke in the direction of motion (i.e., encouraging displacement) and then apply additional motor force to this first translator during the second half of the expansion stroke in the opposite direction of motion during (i.e., discouraging displacement). Conversely for the second translator, control system 310 can apply additional motor force to this second translator in the opposite direction of motion during the first half of the expansion stroke (i.e., discouraging displacement) and then apply additional motor force to this second translator in the direction of motion during the second half of the expansion stroke (i.e., encouraging displacement). In some embodiments, control system 310 may determine synchronization forces based on a desired timing of a desired generator performance. For example, control system 310 may determine synchronization forces to be applied to one or both translators such that the apices of the respective translators occur within a sufficiently small time difference.

In some embodiments, control system 310 may use a repetitive adaptive control technique. Repetitive adaptive control can be advantageous when the operating state, condition, performance, and/or parameters of a free-piston generator are relatively steady, and the cycle-to-cycle variation is limited. In some embodiments, control system 310 may use a repetitive adaptive control technique that determines a position-force trajectory at each part of a current generator cycle based on the position-force trajectory from a previous generator cycle. In some embodiments, control system 310 may use a repetitive adaptive control technique that drives force values toward a known and desirable propagation path (e.g., to enforce a smoother or more continuous force profile). For example, control system 310 may first approximate, based on information from a previous cycle (e.g., force values, generator performance, etc.), a position-force trajectory as a series of discrete force values over a generator cycle. Control system 310 may then cause the discrete force values to be applied to the translator over each stroke of the generator cycle, and at the end of each cycle, control system 310 may adjust the discrete force values based on generator operating characteristics, measurements, performance, and/or conditions. Control system 310 may alter all or some of the discrete force values prior to a subsequent cycle if, for example, a translator does not sufficiently achieve a desired target position for a given stroke. For example, if a translator apexes short of the desired target TDC on a previous cycle, control system 310 may, on the subsequent cycle, reduce the magnitude of the some or all of the discrete force values.

In embodiments with opposed-piston free-piston generators with a shared (or common) reaction section, control system 310 may alter the discrete force values in one or more portions of a stroke for one or both of the translators, dependently or independently, during the subsequent cycle. For example, if on a current generator cycle an exhaust reached its apex at TDC after the intake piston reached its apex at TDC, control system 310 can, on the subsequent cycle, adjust the discrete force values applied to the translator associated with the exhaust piston and not adjust the discrete force values applied to the translator associated with the intake piston in order to achieve sufficient synchronization at TDC. This can be achieved by, for example, control system 310 reducing the magnitude of the discrete force values applied to the translator associated with exhaust piston over the first half of the stroke, thereby allowing the midpoint velocity of the translator to increase, and then increasing the magnitude of the discrete force values applied to the translator associated with exhaust piston over the second half of the stroke, thereby achieving sufficient synchronization at TDC. In some embodiments, control system 310 may use a repetitive adaptive control technique that is based on calculating a deviation from a previously determined trajectory (position-force, position-velocity, time-position, or any suitable trajectory).

Figure 4:
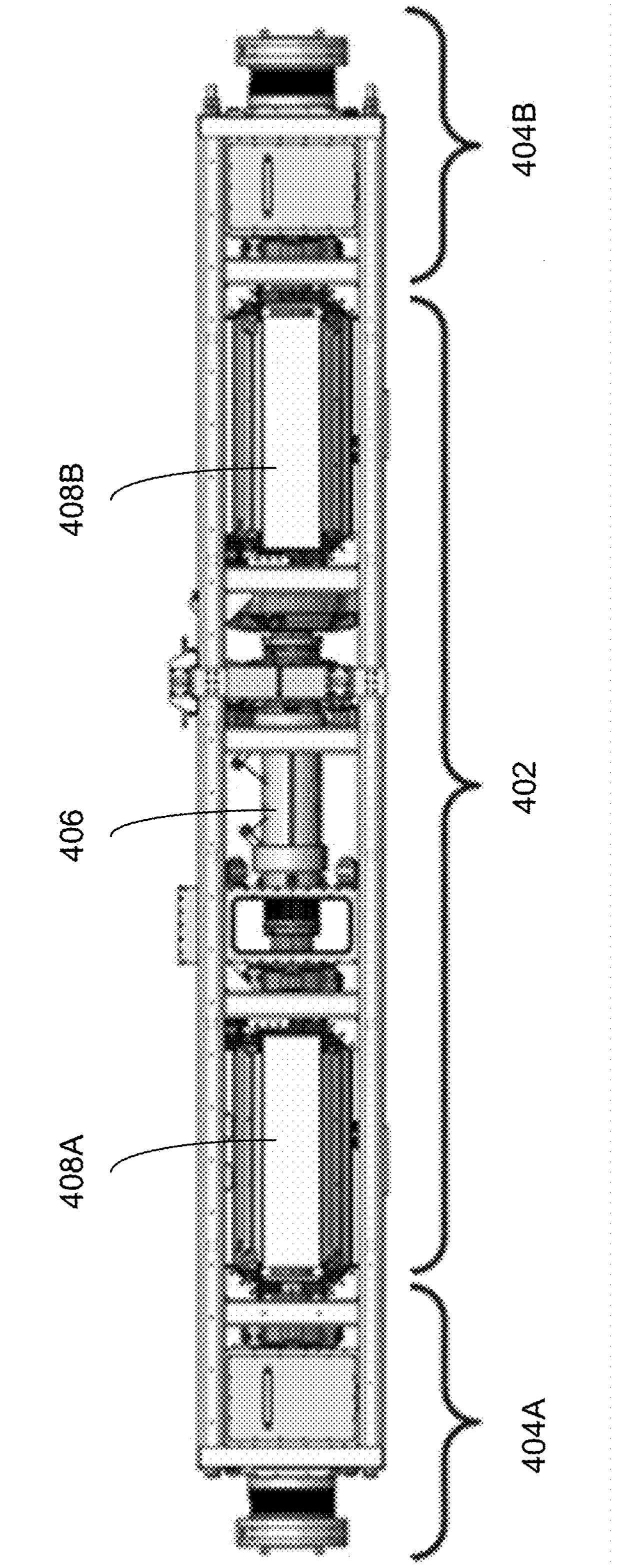
FIG. 4 is an example linear generator assembly, in accordance with some embodiments of the present disclosure.

FIG. 4 depicts linear generator (herein after "LGEN") assembly 400. LGEN assembly 400 may incorporate, or be incorporated into, any of or all of FIGS. 1-3, in whole or in part. For example, LGEN assembly 400 may, in some embodiments, be considered an alternative view of an example of an LGEN similar to that shown above in FIG. 2. Such configuration includes two gas springs outboard of two LEMs and a single power cylinder (hereinafter "PC"); hence for every power generating element (PC) there are two power harnessing devices (LEMs) and two translator return devices (gas springs).

In order to maintain pressure and energy in the gas springs for consistent actuation of the translators, energy must be provided to the gas springs for modification of pressure. While the gas springs assist with achieving optimum actuation paths of, for example, pistons to which translators of LEMs or PCs are coupled, the gas springs do not directly contribute to power generation and instead incur energy losses inherently as part of the operation of an LGEN assembly. Accordingly, there is a desire to eliminate one or more gas springs from a system incorporating multiple LEMs or PCs in order to increase the overall operational efficiency of the system by allocating more energy generated from a fuel reaction to electrical energy output from a LGEN and less to losses. Additionally, the elimination of one or more gas springs from a system with multiple LEMs or PCs may reduce the size of the system as well as reduces the complexity of components used for portions of the system with multiple LEMs or PCs. LGEN assembly 400 depicts an example of such a system which utilizes components from FIGS. 1-3.

LGEN assembly 400 comprises power generation subassembly 402 arranged between gas springs 404A and 404B. Gas spring 404A is arranged on one end of power generation subassembly 402 with gas spring 404B arranged on an opposite end of power generation subassembly 402. Gas springs 404A and 404B mirror each other in that they each provide rebound forces for respective elements of power generation subassembly 402 such that the elements of power generation subassembly 402 propagate towards a center of power generation subassembly 402 after having received the rebound force from gas springs 404A and 404B (e.g., as respective pistons compress air in each gas spring housing). Power generation subassembly 404 is comprised of PC 406 arranged between LEM 408A and LEM 408B. LEMs 408A and 408B include any or all elements of the LEMs shown in or described in reference to FIGS. 1-3 and FIGS. 5-6. In some embodiments, PC 406 includes one reaction section.

Figures 5A, 5B:
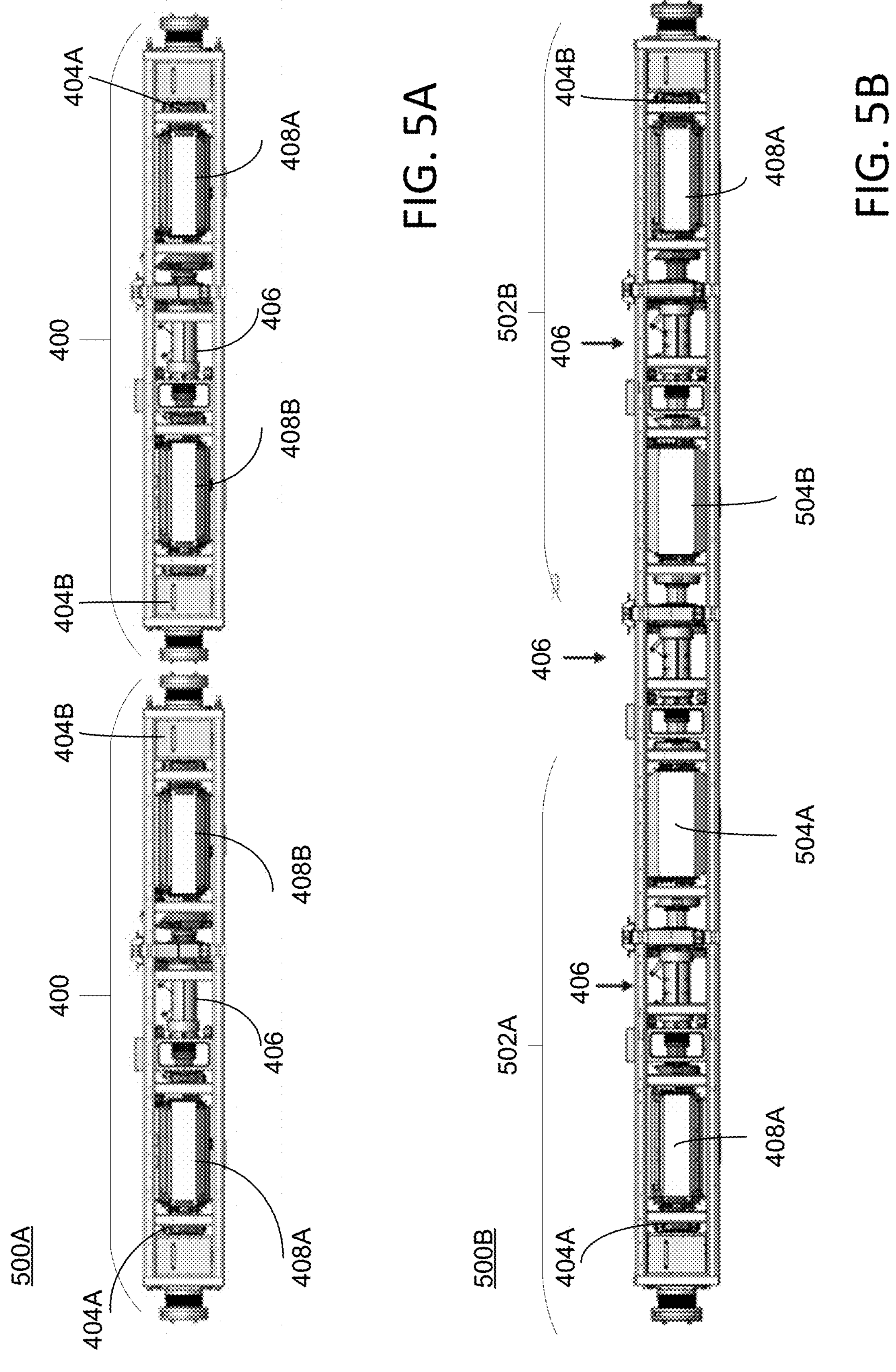
FIG. 5A shows a pair of LGEN assemblies, in accordance with some embodiments of the present disclosure.
FIG. 5B shows a high power LGEN assembly, in accordance with some embodiments of the present disclosure.

FIG. 5A depicts a pair of mirrored LGEN assemblies 400 that are aligned to form LGEN assembly 500A to illustrate the principal that, with certain modifications, LGEN assemblies can be combined to form a larger LGEN assembly configured to generate an elevated power output. As shown in FIG. 5A, there is a respective PC 406 arranged between each respective pairs of LGENs 408A and 408B, with gas springs 404A arranged on opposite distal ends of each of LGEN assemblies 400 and gas springs 404B being arranged towards each other as each of LGEN assemblies 400 are aligned. In order to increase the efficiency of this assembly, another power cylinder (PC 406 as illustrated in FIG. 5B) is arranged to replace gas springs 404B in order to increase overall power output and efficiency of LGEN assembly 500A.

FIG. 5B depicts high power LGEN assembly 500B. High power LGEN assembly 500B is an improved construction of LGEN assembly 500A as there are fewer gas springs in high power LGEN assembly 500B than there are in LGEN assembly 500A. Improved efficiency is achieved by replacing gas springs that would otherwise be towards the center of the assembly with a power cylinder (PC 406). High power LGEN assembly 500B may, in some embodiments, be configured to generate at least 50% more power than LGEN assembly 500A while remaining similar in size from a packaging perspective. Instead of bouncing inner translators of LGENs 504A and 504B off two gas springs pointed at each other, as illustrated in FIG. 5A, those gas springs are replaced by PC 406. Therefore, there are now three PCs 406 in high power LGEN assembly 500B as opposed to the two PCs 406 of LGEN assembly 500A. With the addition of the third PC 406, there is now additional force and energy output that was unable to be realized via LGEN assembly 500A. In order to withstand the rebounding force of PC 406, LEMs 504A and 504B (e.g., the two middle LEMs of high power LGEN assembly 500B) may be scaled up in size to remove more energy on the stroke as compared to the stroke having a gas spring at once end. For example, each of LEMs 504A and 504B may be at least 1.3 times larger in outer diameter as compared to LEMs 408A, which are mirrored on each side of centrally mounted PC 406. The result is LEMs 504A and 504B each can handle and output around twice the force of LEMs 408A. LEMs 504A and 504B may, for example, have larger magnet carriers that may be at least twice the size of the magnet carriers of LEMs 408A. Subassemblies 502A and 502B are shown as mirror images of each other in order to allow for synchronization of operation of the different translators without creating a bias of forces or momentum in either lateral direction.

Another difference between LGEN assembly 500A and high power LGEN assembly 500B is the ratio of gas springs to air bearings. Each LEM includes an air bearing for supporting low-friction linear motion of the translators. Where LGEN assembly 500A has four gas springs to assist with charging the four air bearings in the four LEMs, high power LGEN assembly 500B has two gas springs for assisting with pressurizing the four air bearings of the four LEMs. Accordingly, there needs to be increased air flow through high power LGEN assembly 500B which can be achieved by adjusting the reservoir (e.g., a boost box that is configured for regulating pressure within the gas springs in order to affect trajectories of translators) volume or high-pressure port location of gas springs 404A and 404B of high power LGEN assembly 500B. Additionally, or alternatively, a dead volume associated with each of gas springs 404A and 404B can be reduced to increase the boost achievable and therefore increasing the volume of air flow can be accommodated. The reduced dead volume may, in some embodiments, assist with reducing translator speeds of LEMs 408A during one or more operation cycles, which are lighter than translators of LEMs 408A. The reduced speed is ideal for matching operational frequencies of the four LEMs. In some embodiments, additional mass may be added to translators of LEMs 408A to accommodate the higher mass and power of LEMs 504A and 504B in order to make synchronizing operation of the four LEMs easier.

Figure 6:
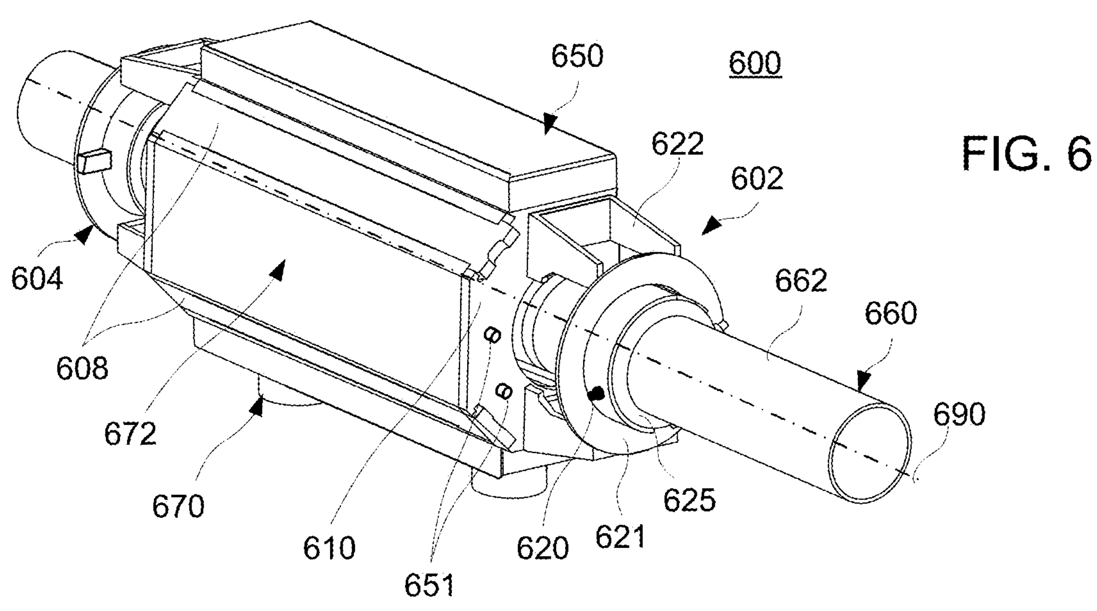
FIG. 6 shows a perspective view of an illustrative linear electromagnetic machine with cooling, in accordance with some embodiments of the present disclosure.

FIG. 6 depicts a perspective view of illustrative LEM 600 with cooling, in accordance with some embodiments of the present disclosure. LEM 600 includes stator 650, translator 660, bearing assemblies 602 and 604, and cooling system 670. Translator 660 is configured to move along axis 690, as constrained by bearing assemblies 602 and 604. Stator 650, which may include a plurality of phases, is configured to interact electromagnetically with a section of translator 660 that may include permanent magnets, an electromagnet, an induction section, or a combination thereof. Bearing assemblies 602 and 604 may each include one more bearing housings, one or more mounts, one or more flexures, any other suitable components, or any suitable combination thereof to form a bearing interface with translator 160 (e.g., with surface 662 thereof that may act as a bearing surface). In some embodiments, LEM 600 may be configured for air cooling, liquid cooling, or both. Cooling system 670 may include plenums, jackets, shrouds, shields, vanes, any other suitable hardware, or any combination thereof to guide a cooling fluid around components of stator 650 and translator 660. For example, LEM 600 may be configured for air-cooling, and cooling system 670 may include a cooling jacket, shroud, or both configured to receive and guide cooling air throughout stator 650 and around translator 660. In a further example, LEM 600 may be configured for liquid cooling, and cooling system 670 may include a cooling jacket configured to receive and guide cooling fluid through stator 650. In some embodiments, as illustrated, stator 650 includes spines 608, and end plates 610. As illustrated, bearing assembly 602 includes, bearing housing 625, flexure 621, mount 622, and feature 620 (e.g., which may include a feature for adjusting bearing stiffness, or a port for bearing gas). In some embodiments, tie-rods 651 are included to provide axial compression to components of stator 650. For example, tie-rods 651 may include sections (e.g., threaded sections) at each end that extend axially through end plates 610, and washers, nuts, crimp connectors, or other terminations are affixed to the sections to engage endplates 610 and maintain compression.

Figure 7:
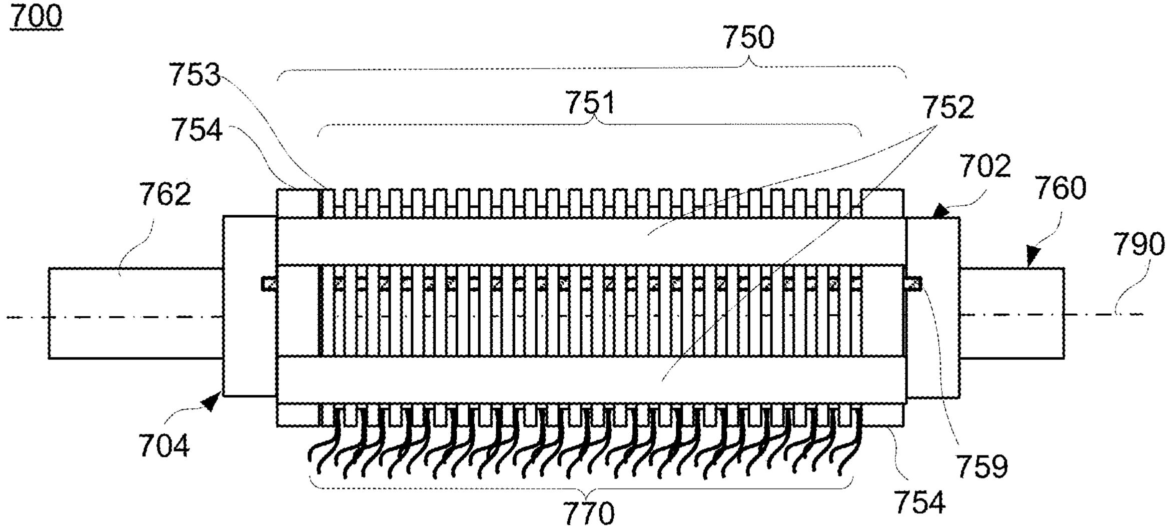
FIG. 7 shows a side view of an illustrative linear electromagnetic machine including a hoop stack and spines, in accordance with some embodiments of the present disclosure.

FIG. 7 depicts a side view of illustrative linear electromagnetic machine 700 including hoop stack 751 and spines 752, in accordance with some embodiments of the present disclosure. Hoop stack 751 includes a plurality of hoops (e.g., including hoop 753 labelled for reference) arranged along axis 790 to form a stator bore (e.g., formed by stator teeth affixed to hoops of hoop stack 751). Hoop stack 751, as illustrated, includes end plates 754, which are arranged on respective axial ends of the plurality of hoops for structural support. Spines 753 are coupled to end plates 754 and the hoops of hoop stack 751 to maintain alignment of the hoops. In some embodiments, one or more optional tie-rods 759 may be included to provide axial compression to hoop stack 751 (e.g., tie-rods 759 may engage with end plates 754). Bearing assemblies 702 and 704 maintain alignment (e.g., lateral alignment of a motor gap) between stator 750 and translator 760. A plurality of phase leads 770 correspond to coils of hoop stack 751 and extend along the length of stator 750.

With respect to LGEN assembly 400 of FIG. 4, for example, scaling of the translator and stator (e.g., as described in reference to FIGS. 6 and 7) may be used to increase the power generation of the assembly. For example, for the target elevated power outputs described herein, a target LEM force output may increase by at least a factor of 1.5, and more than a factor of 2 or 3. Accordingly, the LEM configured to generate more force requires additional magnet diameter to create a larger field for generating electrical energy output. In some embodiments, the magnet diameter may increase from anywhere from 1.5 times certain known diameters (e.g., corresponding to a LEM that generates a lower nominal force) to over 2 times certain currently implemented diameters. Radially, the stator teeth remain the same height. In some embodiments, the stator teeth may be modified to increase or decrease in radial height to accommodate packaging, target power output, or combinations thereof. Cooling system 670, as shown in FIG. 6, includes a frame, for example, for enclosing hoop stack 751 and spines 752 along a portion of area defined by stator 650 arranged between end plates 754. As previously described, cooling system 670 includes cooling shroud 672. By shrinking cooling shroud 672 at least 5 mm in the radial direction or by decreasing the shroud distance at the sides by at least 10%, the increased magnet diameter (e.g., corresponding to up to an increase in diameter from a magnet diameter of a LEM for generating nominal force to a magnet diameter of a LEM for generating at least 1.5 times the nominal force) can be accommodated within a same frame between a LEM configured to generate a nominal force and a LEM configured to generate a augmented force (e.g., 1.5 times the nominal force). With such modifications, the LEM stator axial length and bearing positions can remain the same regardless of target force outputs (i.e., LEM diameter). Additionally, lengths of the translator and magnets in an axial direction may also remain consistent between LEM assemblies configured for the different force outputs.

In some embodiments, a translator may incorporate a length to accommodate for bump stop travel as well as additional length where an encoder is used to monitor position to allow for encoder reader head clearance. The incorporated length may, for example, be 115 mm added onto the translator. The additional length may be allocated evenly on either side of a magnet carrier to ensure the magnets remain centered on the translator. By including this magnet carrier centering via the additional length on either axal side of the translator, both the nominal output LEM and the augmented output LEM can utilize similar or the exact same mounts, brackets, or end plates, thereby reducing overall complexity and cost of manufacturing and assembly.

Figures 8A, 8B:
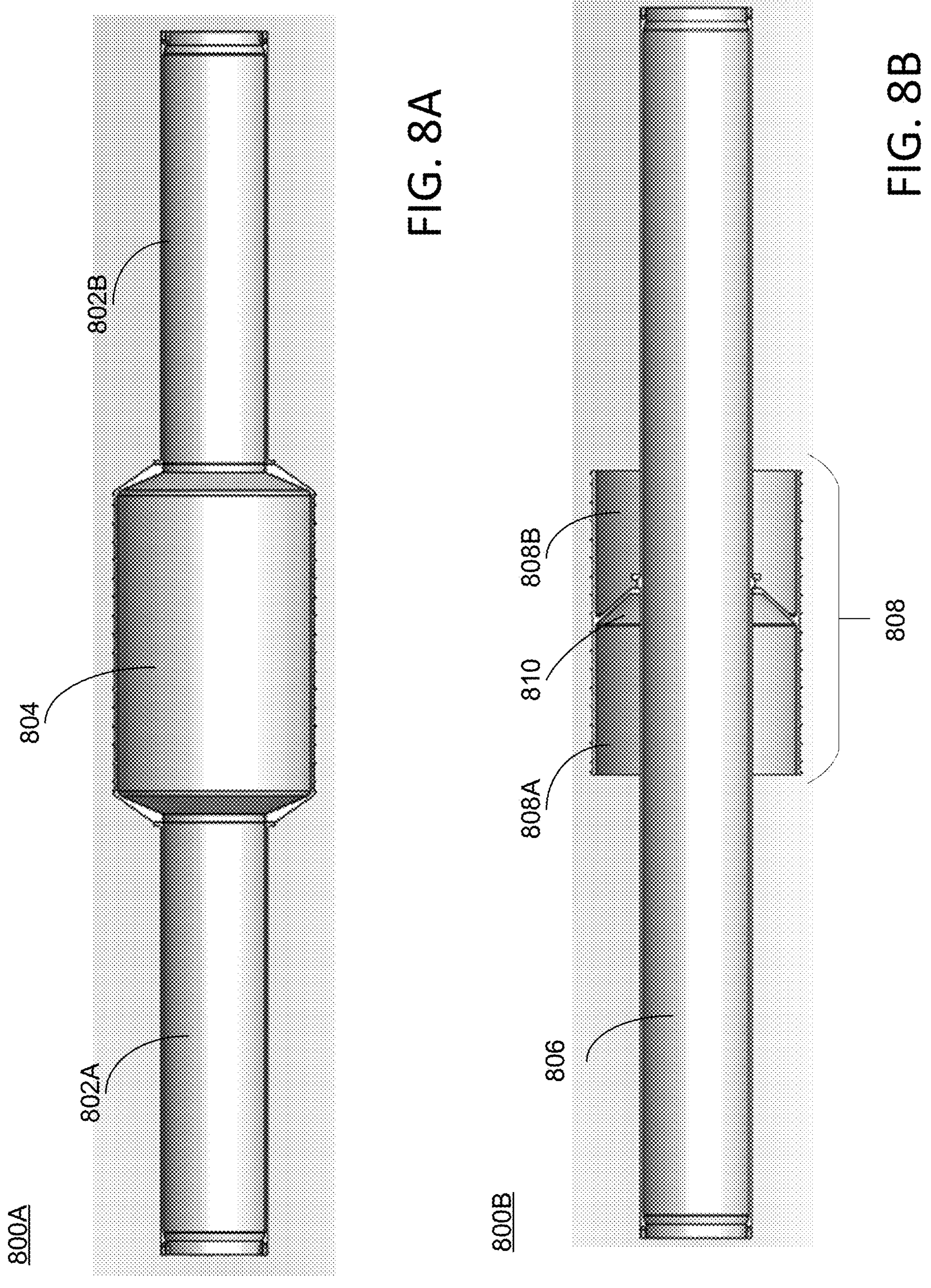
FIG. 8A shows a three element translator tube, in accordance with some embodiments of the present disclosure.
FIG. 8B shows a two element translator tube, in accordance with some embodiments of the present disclosure.

FIG. 8A depicts translator tube 800A. Translator tube 800A is comprised of end tubes 802A and 802B as well as central tube 804, which forms an expansion region capable of carrying a larger number of magnets due to the increased diameter. In some embodiments, translator tube 800A may have each component integrated as a single component. Alternatively, one or more of these components may be formed separately from the other components and assembled with one or more of the other components to form translator tube 800A. In some embodiments, end tubes 802A and 802B may be separate tubes that are welded to the tapered flanges of central tube 804. In other embodiments, end tubes 802A and 802B may comprise a single tube that goes through central tube 804 and attaches to the tapered flanges of central tube for example via welding. Central tube 804 corresponds to a magnet carrier location for a translator of a LEM. That is, magnets (not shown) attach to the surface of central tube 804. As shown, central tube 804 comprises a larger diameter than each of end tubes 802A and 802B. Additionally, central tube 804 comprises a diameter at least 1.5 times or up to 2.5 times larger than a diameter of a magnet carrier of a translator and LEM configured for a lower power output (e.g., a nominal output force instead of the augmented output force that can be generated using a LEM with central tube 804). Accordingly, central tube 804 also may comprise a greater mass than a magnet section for a LEM configured to provide an output less than an augmented output force (e.g., where the force output is closer to a nominal output force magnitude than the augmented output force). In some embodiments, multiple LEMs are coupled in a single frame to generate an elevated power output. Where at least four LEMs are coupled together, the two centrally mounted LEMs comprise central tube 804 with the larger magnet carrier; the fully assembled translators increased mass as compared to two translators in the LEMs arranged towards the axially outer ends of the frame.

FIG. 8B depicts translator tube 800B. Translator tube 800B is comprised of main body tube 806. In some embodiments, main body tube 806 may be a continuous tube or separate tube sections. Central tube 808 is shown as being attached to main body tube 806 by offset flange 810 such that central tube portions 808A and 808B are longitudinally centered when encircling main body tube 806. Offset flange 810 may be attached to main body tube 806 by any suitable means such as welding and may be located at the center of central tube 808, slightly offset from center, as shown in FIG. 8B, or at or near the ends of central tube 808. In some embodiments, central tube 808 may be coupled to or affixed to main body tube 806 by a plurality of offset flange 810. In some embodiments, central tube 808 may stiffen the translator tube 800B, that is it may assist with reducing expansion or flexing of main body tube 806 during operation of a LEM comprised of translator tube 800B. The translator tubes of this present disclosure may be any suitable material for the operation conditions of the various assemblies and systems of this disclosure. For example, a magnetically permeable material may be used to form the tubes.

Figures 9A, 9B, 9C:
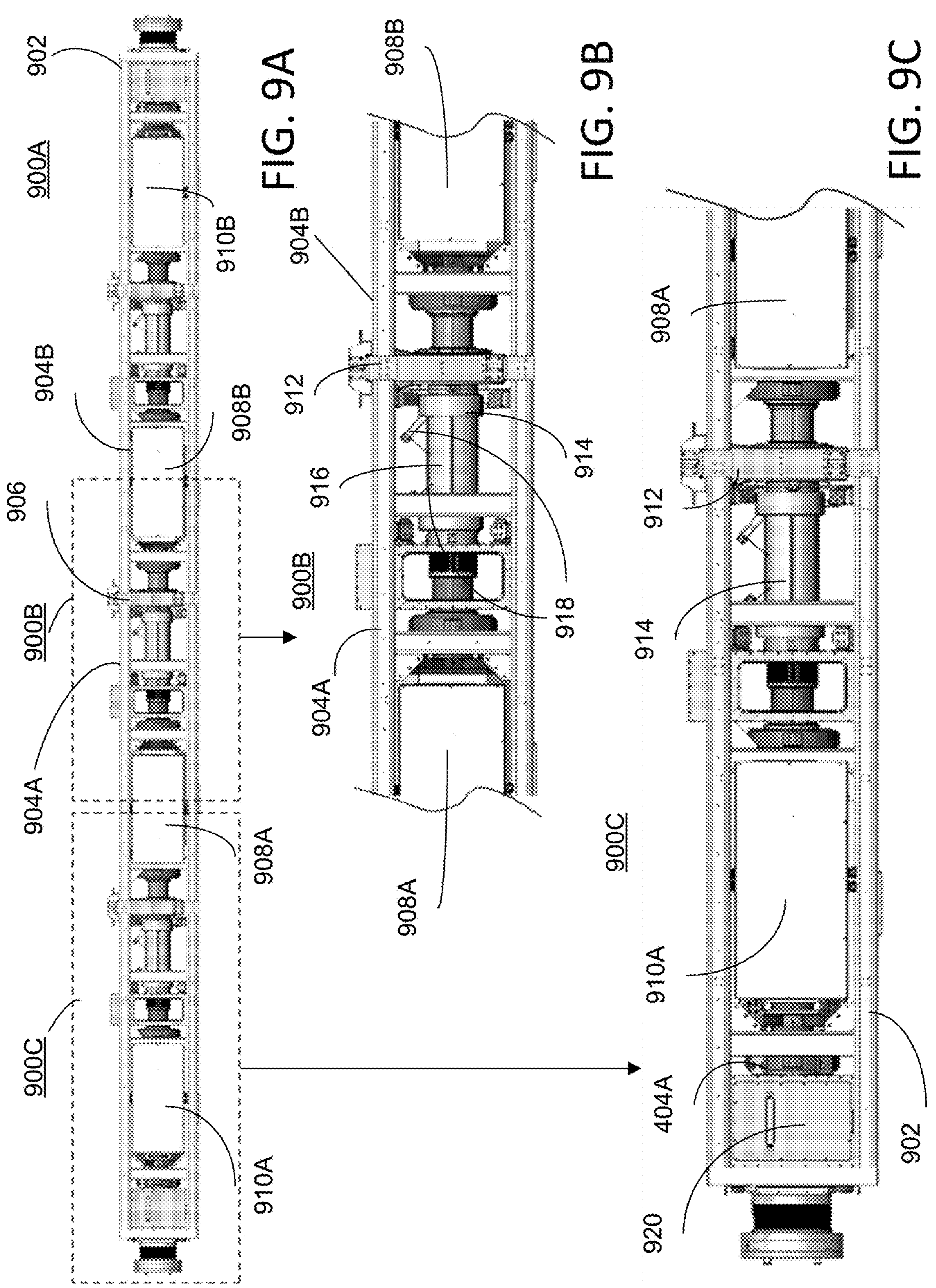
FIG. 9A shows a high power LGEN assembly, in accordance with some embodiments of the present disclosure.
FIG. 9B shows a power cylinder with a liquid cooling jacking, in accordance with some embodiments of the present disclosure.
FIG. 9C shows an outboard end of the high power LGEN assembly of FIG. 9A, in accordance with some embodiments of the present disclosure.

FIG. 9A depicts high power LGEN assembly 900A. High power LGEN assembly 900A corresponds to, for example, high power LGEN assembly 800B and is comprised of frame 902. Frame 902 includes unit frames 904A and 904B which are coupled at interface 906, which is shown in more detail in FIG. 9B as part of PC portion 900B. PC portion 900B is comprised of a PC that replaces a pair of inboard gas springs that would otherwise provide rebound forces for pistons of LEMs 908A and 908B. Each of LEMs 910A, 910B, 908A, and 908B may, in some embodiments, comprise any or all of the same or similar electromagnetic design, coil winding, coil wrapping, stator tooth shape, stator tooth size, stator stacking approach, magnets, magnet retention approach, cooling system or apparatus, or mounting as with any suitable unitary LEM architecture. In some embodiments, LEMs 908A and 908B are configured to produce higher force and energy outputs than LEMs 910A and 910B.

FIG. 9B shows PC portion 900B of high power LGEN assembly 900A. PC portion 900B is comprised of PC 914 and various components for intake, exhaust, and cooling. Frame 902 may be comprised of continuous axial beams as shown or it may be modular, such that standard frame sections are welded or bolted together to create a solid structural support when all the LEMs and PCs of high power LGEN assembly 900A are operating. Frame coupling assembly may comprise one or more of brackets, fasteners, weld seams, frame members, or other suitable coupling apparatuses to provide a structure that axially and laterally aligns the PCs and LEMS and supports the loads generated by the LGEN assembly 900A. Encompassing PC 914 is liquid cooling jacket 916. Liquid cooling jacking 916 receives coolant through one of ports 918 and expels coolant through an opposite of ports 918 in order to regulate the temperature of the cylinder of PC 914 and the components therein (e.g., scaling rings) and to reduce thermal expansion of parts and concomitant material stress, fatigue, and wear leading to mechanical failure of one or more components.

FIG. 9C shows outboard subassembly 900C of high power LGEN assembly 900A. Outboard subassembly 900C is comprised of LEM 910A arranged between gas spring 404A of FIG. 4 and PC 914. Reservoir 920, which is considered a boost box for the gas spring for providing an initial pressurization to gas within the gas spring and also to provide controlled increases in pressure based on control system needs to regulating speed or trajectory of translators, is adjacent and operatively connected to gas spring 404A as shown in FIG. 2 and the related description above. On an opposite side of PC 914 is LEM 908A which is coupled to PC 914 via at least frame 902.

As mentioned above with respect to FIGS. 2, 4, 5A and 5B, there are many variables that affect intake and exhaust breathing, for example, breathing port locations and piston apex positions may be used to affect breathing behavior. Similarly, in the context of the high power LGEN assembly, the orientation of each of the three power cylinders can be used to affect the timing of port opening and hence overall breathing.

Figures 10A, 10B:
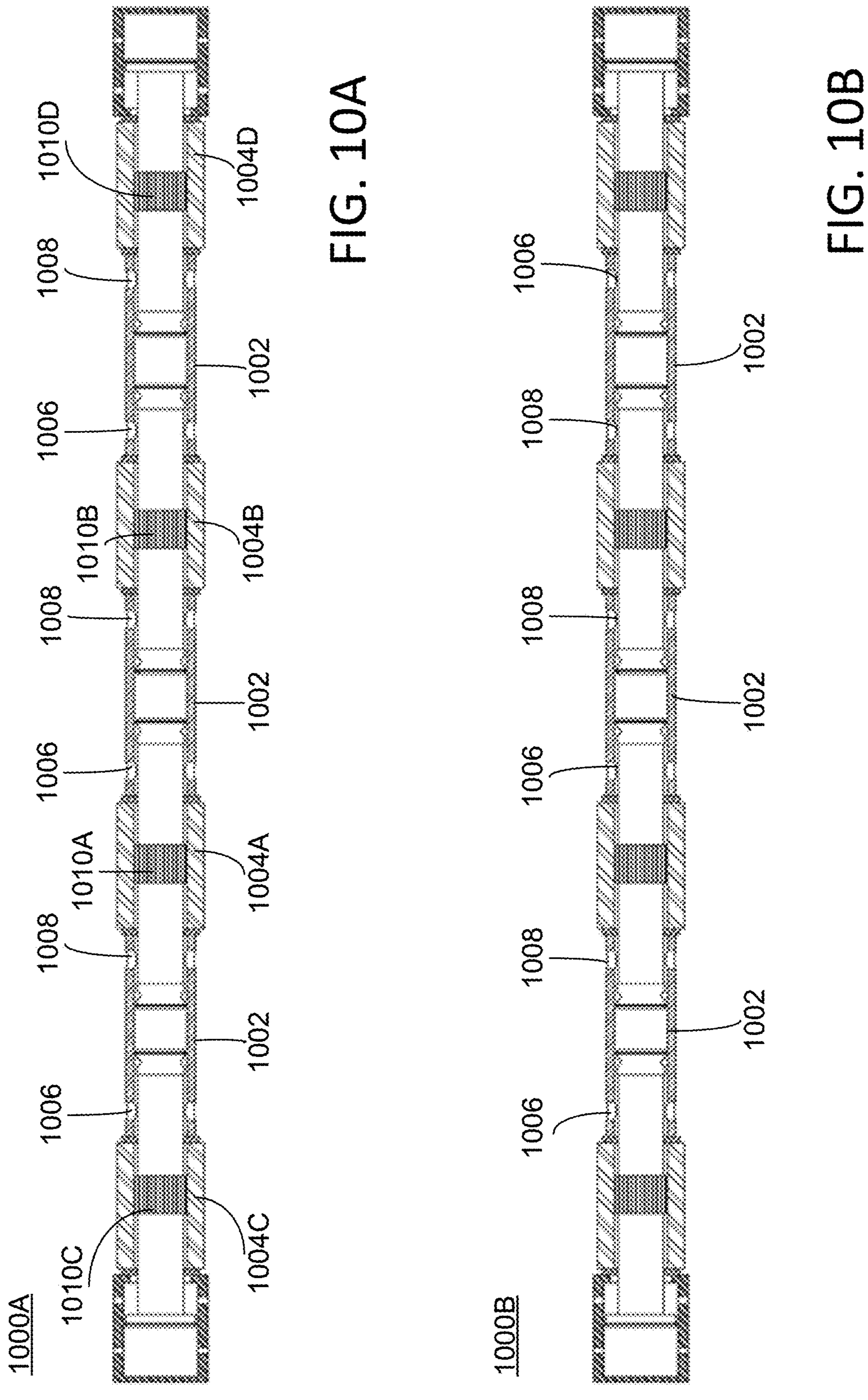
FIG. 10A shows a layout of intake and exhaust ports for different power cylinders of a LGEN assembly, in accordance with some embodiments of the present disclosure.
FIG. 10B shows a layout of intake and exhaust ports for outboard power cylinders of a LGEN assembly, in accordance with some embodiments of the present disclosure.

FIG. 10A shows LGEN assembly 1000A with three of PCs 1002. A first of PCs 1002 is arranged between inboard LEMs 1004A and 1004B at an approximate center of LGEN assembly 1000A. Inboard, as recited herein, corresponds to a portion of an assembly that is towards a center of an assembly as displayed in the figures. Outboard, as recited herein, corresponds to the distal ends of assemblies as displayed in the figures. For example, outboard components described herein would be arranged on either lateral side of inboard components based on the lateral or side views of the various assemblies of this disclosure. A second of PCs 1002 is arranged between an inboard end of LEM 1004C and an outboard end of LEM 1004A. A third of PCs 1002 is arranged between an outboard end of LEM 1004B and an inboard end of LEM 1004D. Each of PCs 1002 is comprised of a respective intake port 1006 and a respective exhaust port 1008. Each of intake port 1006 may be any suitable port for the pressures and air/fuel mixtures required for operation of any of PCs 1002 make consistent ports for PC and LEMs are inboard of ends of pistons (e.g., not extending into PCs). As shown in FIG. 10A, each of intake ports 1006 may be arranged on a first side of each of PCs 1002, with each of exhaust ports 1008 being arranged on a second side of each of PCs 1002. LEMs 1004A-1004D each comprise a respective translator, labelled as translators 1010A-D. Each of translators 1010A-D may comprise the same components.

In some embodiments, translators 1010A and 1010B may be configured to convert more kinetic energy to electrical energy than translators 1010C and 1010D. For example, translators 1010A and 1010B may comprise larger or more magnets for interfacing with respective stators or stator assemblies. The translator of the present disclosure (e.g., any or all of translators 1010A-D) may be of any suitable structure and arrangement of components, including, for example any suitable one or more rods, one or more pistons or any other suitable caps, or any other suitable component, arranging in any suitable arrangement. Intake ports 1006 and exhaust 1008 may, in some embodiments, be overlapped by ends of one or more respective translators during motion of the respective translators (e.g., translators 1010A and 1010C or translators 1010A and 1010B or translators 1010B and 1010D) on either side of a respective PC comprised of respective pairs of intake ports 1006 and exhaust ports 1008. In some other embodiments, one or more of intake ports 1006 and exhaust ports 1008 may be arranged along a respective PC such that the respective translators on either side (e.g., translators 1010A and 1010C or translators 1010A and 1010B or translators 1010B and 1010D) do not extend far enough into the respective PC to cover either or both of respective intake ports 1006 or exhaust ports 1008 during motion of each respective translator. In some alternative embodiments, one or more of the ports in one or more of the relative orientations and locations are positioned on part of LEM, instead of PC. Additionally, or alternatively, the different LEMs and PCs of this disclosure may be incorporated into various assemblies and systems to have varying iterations of the described relative port locations and orientations in any suitable combination for achieving desired operational parameters. In some embodiments, each PC is geometrically equivalent, within manufacturing tolerances across LGEN assembly 1000A, or any assembly or system of this disclosure that utilizes at least two PCs.

In some embodiments, one or more of intake ports 1006, exhaust ports 1008, or other suitable port or valve architectures may be incorporated into one or more portions (e.g., one or more PCs, LEMs, driver sections, or gas springs) of LGEN assembly 1000A, or any of the linear generators, cores, or assemblies of this disclosure, in order to enable propagation of a reaction (e.g., based on one or more of spark ignition or compression ignition) that at least partially contacts the compression section, or reaction section, by one or more of modifying or regulating contents of an internal volume of the at least one driver section or the at least one compression section. For example, one or more of the scavenging approaches of this disclosure may be utilized to enable propagation of the reaction and the reaction may be caused by one or more of spark ignition or compression ignition (e.g., HCCI).

FIG. 10B shows LGEN assembly 1000B with three of PCs 1002. The two outboard installments of PC 1002 have mirroring intake ports 1006 and exhaust ports 1008. This results in both outboard PCs 1002 having respective intake ports 1006 towards a respective outboard end of LGEN assembly 1000B with respective exhaust ports 1008 arranged towards a centrally located PC 1002. LGEN assembly 1000B provides outboard PCs 1002 that mirror ports in order to achieve the desired timing of the opening of the ports of the outboard PCs relative to the central PC. Other arrangements of the power cylinders may be used to control relative port timing across the various power cylinders. This approach of flipping the orientation of various of the power cylinders can be used if the power cylinders are the same construction, that is, the same design, because of manufacturing cost reductions realized by having commonality of components. In other embodiments, different power cylinders may be used based on their location in the overall LGEN system; such power cylinders may have different breathing ports (e.g., differing in length, or axial location) as compared to other power cylinders in the assembly.

Figure 11:
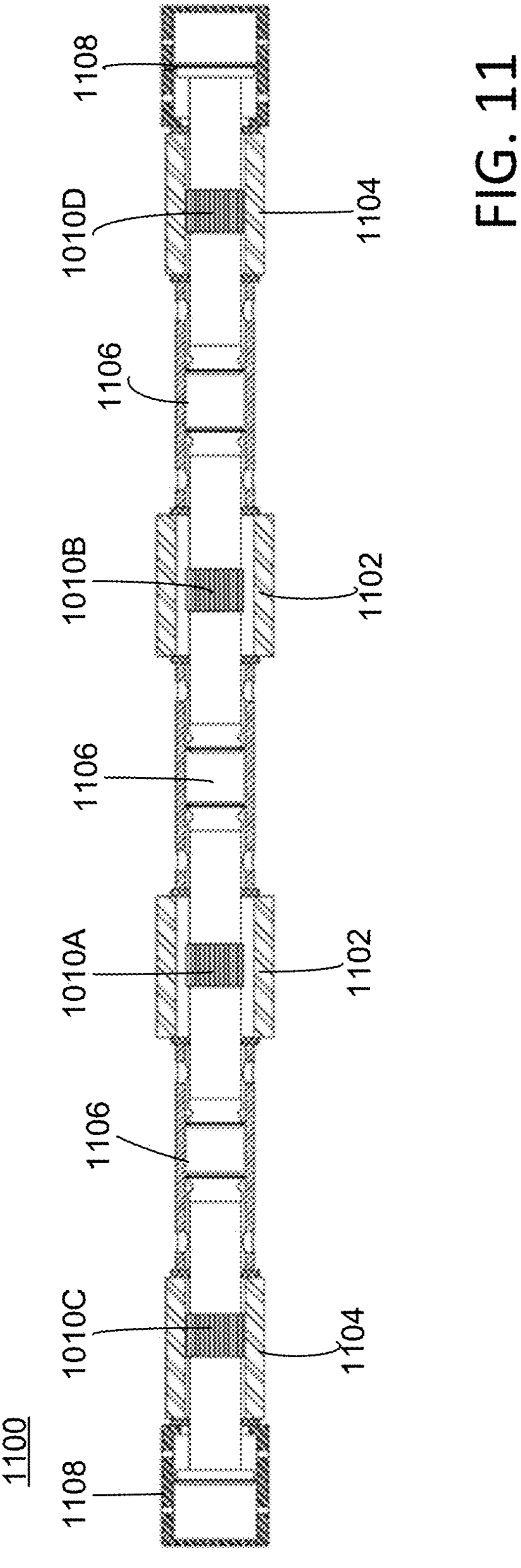
FIG. 11 shows an LGEN assembly with inboard LEMs that are larger than the outboard LEMs, in accordance with some embodiments of the present disclosure.

FIG. 11 depicts a cross sectional view of high power LGEN assembly 1100. High power LGEN assembly 1100 corresponds to high power LGEN assembly 800B of FIG. 8B. High power LGEN assembly 1100 is comprised of inboard LEMs 1102, outboard LEMs 1104, PCs 1106, and gas springs 1108. Each LEM has a respective translator which are labelled as translators 1010A-D, as also shown in FIG. 10A. As described in reference to FIG. 8B, inboard LEMs 1102 are relatively larger, that is, they have larger magnetic carriers on the translator and a larger stator to accommodate the larger translator. This is because each associated inboard translator is loaded by a power cylinder on both ends, rather than having a gas spring on one end of its travel. Whereas a gas spring causes a translator to switch direction by imparting, at most, the amount of kinetic energy that it had when entering the gas spring, a reaction section adds energy to the translator near the end of the travel (e.g., at or near apex). Hence, a translator with power cylinders at both ends of its travel will tend to operate at a higher frequency than a translator with a gas spring at one end of its travel. In order to slow down the inboard translators, a larger LEM assembly (stator and translator magnet assembly) is employed. This allows the inboard LEMS 1102 to generate larger forces on their respective translators and also larger power output during operation. Outboard LEMs 1104 are comprised of translators having smaller magnetic carriers from a diameter, mass, and power output perspective. Preferably, the operational frequency of all of the translators are synchronized so that they reach TDC and BDC at approximately the same time. The control system may accomplish this by controlling the speed of the translators and the apices in the reaction section and gas spring. In some embodiments, Since the outboard LEMs 1104 may need to operate at a reduced speed to match the frequency of the translators of the inboard LEMs 1102, the mass can be increased. As with the assembly of FIG. 8B, there are only two outboard gas springs 1108 for outer translators with a centrally arranged PC 1106, which provides rebound forces for translators of inboard LEMs 1102, thereby improving overall operational efficiency of high power LGEN assembly 1100.

Figures 12A, 12B:
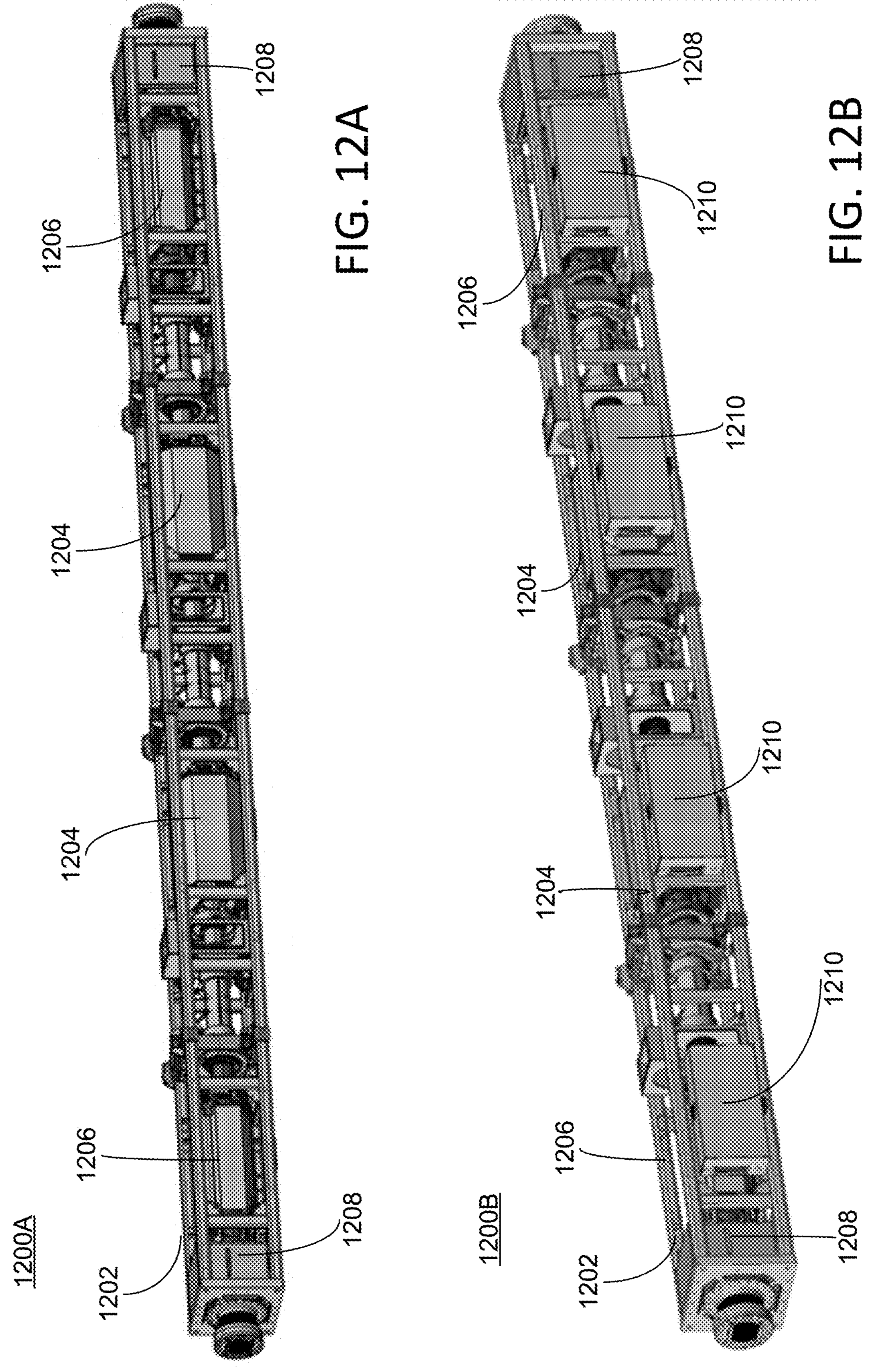
FIG. 12A shows an isometric view of a LGEN assembly including a frame, in accordance with some embodiments of the disclosure.
FIG. 12B shows an isometric LGEN assembly including a frame with additional components mounted to the frame, in accordance with some embodiments of the disclosure.

FIG. 12A is an isometric view of LGEN assembly 1200A. LGEN assembly 1200A is comprised of frame 1202. Frame 1202 is considered a structural frame for supporting and housing the components of LGEN assembly 1200A, or any other components of a LGEN or LGEN assembly of this disclosure. Frame 1202 may be considered a core frame as a core of this disclosure may be suitably arranged within frame 1202 (e.g., by inserting one or more LGEN, PC, or LEM components throughout the various openings therein). Frame 1202 includes features for positioning and aligning various components of a core, including one or more components, subassemblies, cores in respective entireties, LGENs, LEMS and PCs of this disclosure. In some embodiments, frame 1202 comprises a cuboid-shaped volume (e.g., as shown in FIG. 12A). The shape of the volume encompassed by frame 1202 may be any suitable geometry for mounting and accommodating structures or components of one or more cores or LGENs of this disclosure.

As shown in FIG. 12A, frame 1202 includes features that define a housing with a plurality of openings and linear generator components are arranged within the housing. The plurality of openings accommodate insertion of at least one component of the linear generator into the housing. For example, high power LEMs 1204 are arranged towards the center of frame 1202 and nominal power LEMs 1206 are arranged towards the outboard ends of frame 1202. Abutting each outboard end of nominal power LEMs 1206 is a respective reservoir 1208 (e.g., a boost box) for a respective gas spring. As described above in the description related to FIG. 2, the gas springs interfacing with reservoirs 1208 may be used as compressors to bleed off some pressure (e.g., through a valve, such as a reed valve) to provide pressure for the gas bearings in each of the LEMS 1206 and 1204. Hence, each gas spring or reservoir 1208 may provide pressure for the air bearings of two or more LEMS, for example the nearest outboard LEM 1206 and the nearest inboard LEM 1204.

FIG. 12B is an isometric view of LGEN assembly 1200B. LGEN assembly 1200B includes all the components of LGEN assembly 1200A, including frame 1202. Mounted towards an exterior of frame 1202 are LEM inverter cabinets 1210. LEM inverter cabinets 1210 store, or house, inverters for each of the LEMs mounted to frame 1202 in order to provide each LEM with an individualized power conversion during operation of each respective LEM.

Figure 13:
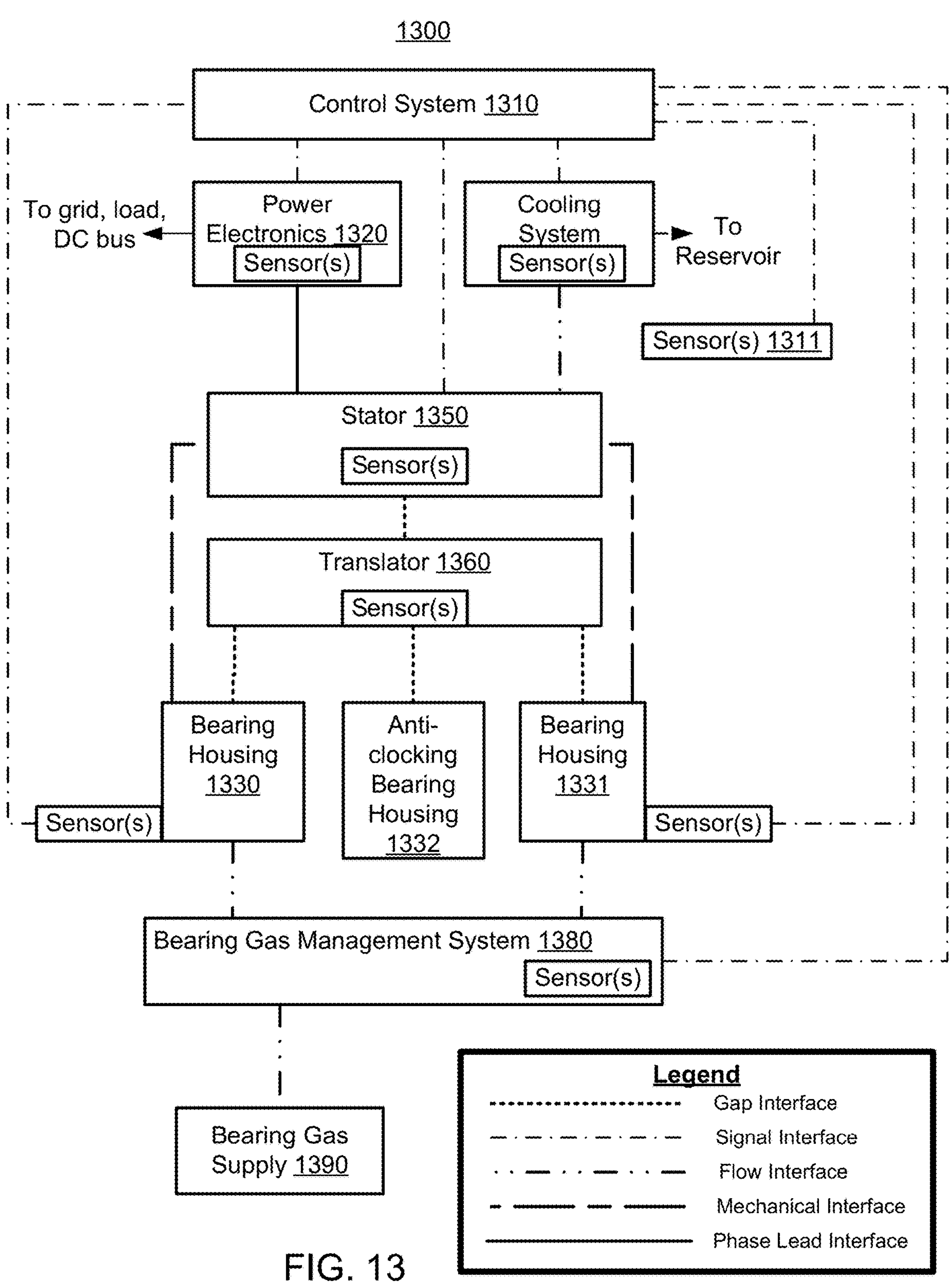
FIG. 13 shows a block diagram of an illustrative LEM system, in accordance with some embodiments of the present disclosure.

FIG. 13 depicts a block diagram of illustrative LEM system 1300, in accordance with some embodiments of the present disclosure. LEM system 1300, as illustrated, includes control system 1310, power electronics 1320, cooling system 1321, sensors 1311, stator 1350, translator 1360, bearing housings 1330 and 1331, bearing gas management system 1380, and bearing gas supply 1390. Components of LEM system 1300 are coupled, as illustrated, by a gap interface, signal interface, flow interface, mechanical interface, phase lead interface, or a combination thereof. For example, translator 1360 is coupled to stator 1350 by a gap interface (e.g., a motor air gap), bearing housing 1330 by a gap interface (e.g., a bearing interface such as a gas bearing between bearing housing 1330 and its associated translator), and bearing housing 1331 by a gap interface (e.g., a bearing interface such as a gas bearing between bearing housing 1331 and its associate translator).

Control system 1310 is configured to interface with (e.g., provide control signals to, receive feedback from) power electronics 1320 to control currents in phases of stator 1350. Power electronics 1320 is coupled to stator 1350 by a plurality of phase leads, which may include lengths of electrically conductive material, electrical terminals and terminations, connectors, sensors (e.g., current sensors), any other suitable components, or any combination thereof. Control system 1310 is configured to interface with (e.g., provide control signals to, receive feedback from) cooling system 1321 to control cooling of stator 1350 (e.g., to remove heat from windings, stator teeth, hoops, or a combination thereof). For example, cooling system 1321 may include one or more cooling jackets, plenums, manifolds, pumps, compressors, filters, sensors, any other suitable components, or any combination thereof. In a further example, cooling system 1321 may exchange heat and fluid with a reservoir (e.g., the environment provides cooling air and accepts heated air). In a further example, control system 1310 may be communicatively coupled to cooling system 1321 and is configured to provide a control signal to cooling system 1321 to cause heat removal from a plurality of windings of stator 1350. Control system 1310 is configured to interface with (e.g., provide control signals to, receive sensor signals from) sensors 1311, which may include, for example, sensors for measuring air flow, fuel flow, temperature, location, velocity, acceleration, force, current, voltage, capacitance, humidity, capacitance, emissions (e.g., NOX or CO2) or pressure by way of nonlimiting example.

Bearing housings 1330 and 1331 may include any suitable number and type of bearing housing, in accordance with the present disclosure. As illustrated, bearing housings 1330 and 1331 are configured for gas bearings (e.g., using bearing gas management system 1380 and bearing gas supply 1390), although a LEM system may include any suitable type of bearing (e.g., contact or non-contact). In some embodiments, one or more sensors is coupled to each bearing housings 1330 and 1331, configured to sense, for example, bearing gas pressure, bearing gas temperature, bearing gas flow rate, bearing housing acceleration (e.g., an accelerometer may be affixed to a bearing housing to measure vibration), bearing housing temperature, any other suitable property or behavior, or any combination thereof.

Bearing gas management system 1380 is configured to control at least one aspect of respective bearing gas provided to bearing housings 1330 and 1331. For example, bearing gas management system 1380 may include one or more filters, compressors, pumps, pressure regulators, valves, sensors, any other suitable components, or any combination thereof for providing bearing gas to bearing housings 1330 and 1331. For example, control system 1310 is configured to interface with (e.g., provide control signals to, receive feedback from) bearing gas management system 1380 for controlling at least one property of the bearing gas. In a further example, control system 1310 is configured to interface with (e.g., provide control signals to, receive feedback from) bearing gas management system 1380 for controlling a stiffness of the bearing interface (e.g., to lateral displacement of translator 1360) between translator 1360 and bearing housings 1330 and 1331. Bearing gas supply 1390 may include one or more filters, compressors, pumps, pressure regulators, valves, sensors, any other suitable components, or any combination thereof for providing bearing gas to bearing gas management system 1380. In some embodiments, bearing gas management system 1380 and bearing gas supply 1390 may be combined as a single system. In some embodiments, bearing gas supply 1390 need not be included (e.g., bearing gas management system 1380 may intake atmospheric air).

In some embodiments, stator 1350 includes a plurality of coils and an axis, translator 1360 is arranged to move axially along the axis, and bearing housing 1330, bearing housing 1331, or both are coupled to stator 1350 to constrain lateral motion of translator 1360. For example, the coils include windings that interface with a plurality of stator teeth that define an axis (e.g., an axis of a stator bore). In some such embodiments, control system 1310 is configured to control axial displacement of the translator, and control lateral displacement of the translator. For example, bearing housing 1330, bearing housing 1331, or both, and translator 1360 form a bearing interface, and control system 1310 is configured to control a stiffness of the bearing interface against the lateral displacement of translator 1360. In an illustrative example, the bearing interface may include a gas bearing interface configured for oil-less operation (e.g., without the use of liquid lubricant).

In some embodiments, bearing gas management system 1380 is configured to provide a pressurized gas to the bearing interface. In some such embodiments, control system 1310 is communicatively coupled to bearing gas management system 1380 and is configured to provide a control signal to bearing gas management system 1380 to cause the pressurized gas to be provided to the bearing interface. For example, control system 1310 may cause bearing gas management system 1380 to control a property of the pressurized gas to control the lateral stiffness to lateral displacement of the translator. To illustrate, bearing gas management system 1380 may provide a pressurized gas to the bearing gap by opening a valve. To further illustrate, bearing gas management system 1380 may provide pressurized gas by controlling a valve, a pressure regulator, or both.

In some embodiments, power electronics 1320 are coupled to a plurality of windings of stator 1350. Control system 1310 is communicatively coupled to power electronics 1320 and is configured to provide a control signal to power electronics 1320 to cause electrical current to flow in at least one winding of the plurality of windings to control the axial displacement of translator 1360.

In some embodiments, one or more sensors of LEM system 1300 include a position sensor (e.g., an encoder) that senses an axial position of translator 1360 relative to stator 1350. In some such embodiments, control system 1310 is communicatively coupled to the sensor (e.g., of sensors 1311) and is configured to cause electrical current to flow in the plurality of windings of stator 1350 based on the axial position of translator 1360. In some embodiments, control system 1310 is configured to estimate an axial position of translator 1360 relative to stator 1350 and cause electrical current to flow in the plurality of windings of stator 1350 based on the axial position of translator 1360.

In some embodiments, translator 1360 includes at least one rail having a rail surface. System 1300 may optionally include at least one anti-clocking bearing housing (e.g., bearing housing 1332) coupled to stator 1350 and configured to constrain azimuthal motion of translator 1360, wherein anti-clocking bearing housing 1332 and the rail surface form a rail interface. For example, control system 1310 is configured to cause the rail interface to achieve a stiffness against azimuthal motion of the translator.

In some embodiments, bearing housing 1330 is arranged on a first longitudinal side of stator 1350 to constrain the lateral motion of translator 1360 at the first longitudinal side of stator 1350, and bearing housing 1331 is arranged on a second longitudinal side of stator 1350 to constrain the lateral motion of translator 1360 at the second longitudinal side of stator 1350.

In some embodiments, control system 1310 is configured to control a LEM by causing electric current to flow in at least one winding of a plurality of windings of a stator to apply a force on a translator along a longitudinal axis of the stator, and controlling lateral stiffness to lateral displacement of the translator arranged to move along a longitudinal axis of the stator. For example, the translator and the stator may form a motor air gap, and the lateral stiffness provided by the bearings is capable of maintaining the motor air gap in an operable range. For example, causing electric current to flow at least one winding may include providing a control signal to power electronics 1320 that are electrically coupled to the plurality of windings.

In some embodiments, control system 1310 is configured to monitor a property of the bearing gas, bearing housing, or both, for a fault condition and, in response to an identification of the fault condition, brake the translator. For example, control system 1310 may brake, slow down, or otherwise modify the trajectory of the translator, or translator, by causing power electronics 1320 to apply currents to phases of stator 1350 that cause a force on translator 1360 that oppose motion of translator 1360 (e.g., thus reducing a velocity of, or even stopping translator 1360). To illustrate, control system 1310 may monitor a mass flowrate of bearing gas, a pressure of bearing gas, a temperature of bearing gas, a temperature of a bearing housing, a vibration of a bearing housing, a force load on a bearing housing, a translator position trajectory, or a combination thereof.

Figure 14:
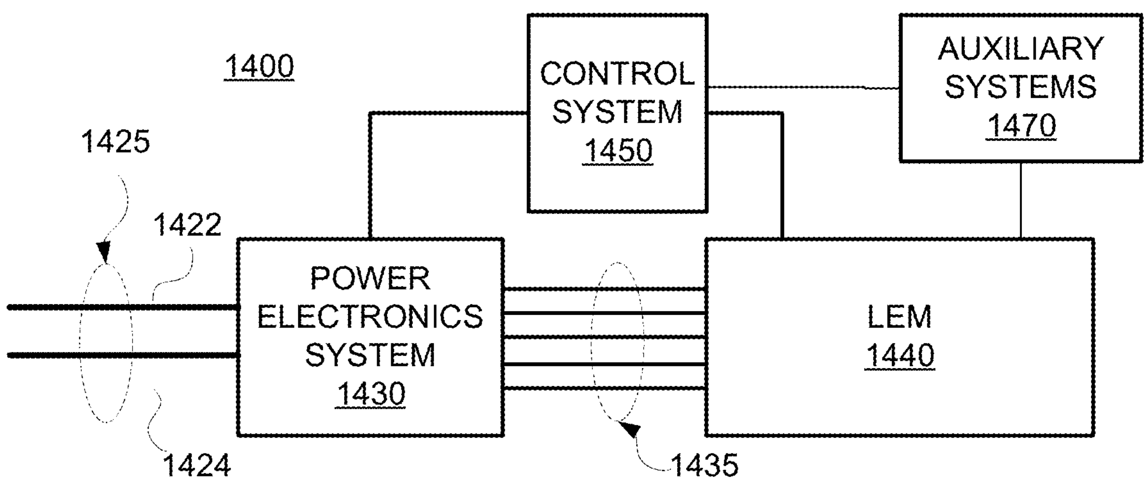
FIG. 14 shows a diagram of an illustrative system, in accordance with some embodiments of the present disclosure.

FIG. 14 shows a diagram of illustrative system 1400, in accordance with some embodiments of the present disclosure. System 1400 includes LEM 1440, power electronics system 1430, control system 1450, and auxiliary system 1470. System 1400 may be referred to as a LEM system. It will be understood that while shown separately in FIG. 14, LEM 1440 and power electronics system 1430 may be integrated, or otherwise combined to any suitable extent. For example, in some embodiments, LEM 1440 and power electronics system 1430 may be affixed (e.g., directly or indirectly) to one another and coupled by phase leads 1435. In a further example, in some embodiments, power electronics system 1430 may be integrated as part of LEM 1440. In a further example, LEM 1440 may include a stator having a plurality of phases and a translator (e.g., and other suitable components such as cylinders, bearings, plumbing, etc.), with phase leads 1435 that are coupled to DC bus 1425 by power electronics system 1430.

In some embodiments, LEM 1440 may include one or more translators which may undergo reciprocating motion relative to corresponding one or more stators under the combined effects of gas pressures and electromagnetic forces. The translators may, but need not, include permanent magnets, which may generate a back electromotive force (emf) in phases of the respective stator. It will be understood that, as used herein and as widely understood, back emf refers to a voltage. Power electronics system 1430 are configured to control current in the phases of the stator of a LEM. For example, power electronics system 1430 may expose phase leads of phases of a stator to one or more buses of a DC bus, a neutral, a ground, or a combination thereof.

Power electronics system 1430 may include, for example, switches (e.g., insulated gate bipolar transistors (IGBTs), metal oxide semiconductor field effect transistor (MOSFET)), diodes, current sensors, voltage sensors, circuitry for managing PWM signals, any other suitable components, or any suitable combination thereof. For example, power electronics system 1430 may include one or more H-bridges, or other motor control topology of switches for applying, or extracting current to one or more phases. In some embodiments, power electronics system 1430 may interface with LEM 1440 via phase leads 1435 which couple to windings of the stators, and power electronics system 1430 may interface with a grid-tie inverter (not shown) via DC bus 1425 (e.g., a pair of buses, one bus at a higher voltage relative to the other bus). Bus 1422 and bus 1424 together form DC bus 1425 in system 1400. For example, bus 1422 may be at nominally 800V relative to 0V of bus 1424. Bus 1422 and bus 1424 may be at any suitable, nominal voltage (e.g., >100 VDC, >200 VDC, >400 VDC, >600 VDC, over 800 VDC), which may fluctuate in time about a mean value, in accordance with the present disclosure. Accordingly, the term "DC bus" as used herein shall refer to a pair of buses having a roughly fixed mean voltage difference, although the instantaneous voltage may fluctuate, vary, exhibit noise, or otherwise be non-constant.

Figure 15:
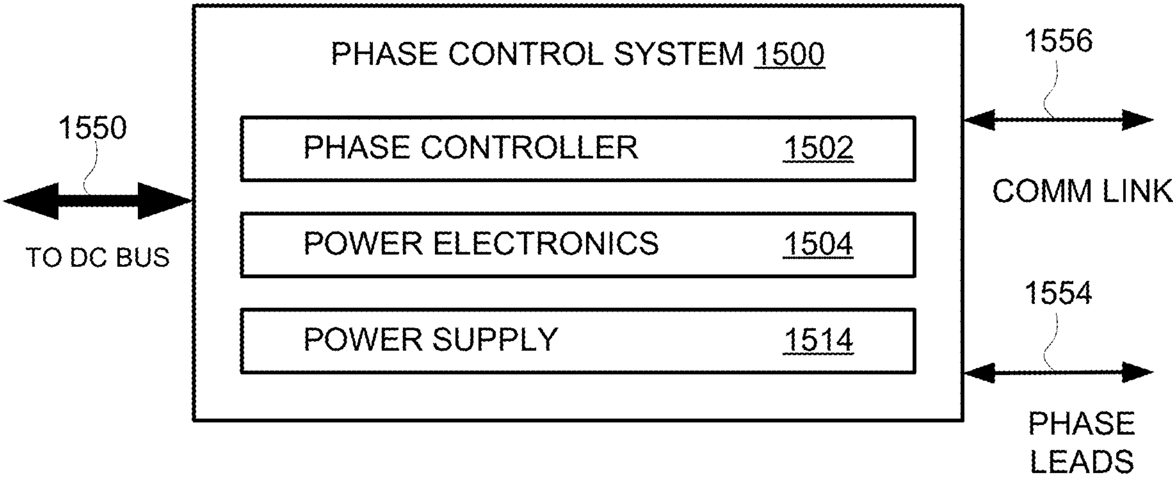
FIG. 15 shows a block diagram of an illustrative phase control system, in accordance with some embodiments of the present disclosure.

FIG. 15 depicts a block diagram of illustrative phase control system 1500, in accordance with some embodiments of the present disclosure. Phase control system 1500, as shown illustratively in FIG. 15, includes phase controller 1502, power electronics 1504, and power supply 1514. In some embodiments, each phase control system (e.g., similar to phase control system 1500) controls an application of current to a single phase of a multiphase stator. Further, each phase control system may include elements of the overall electrical system distributed to each phase control system (e.g., elements of control system 1450, power electronics system 1430, and auxiliary systems 1470 of FIG. 14). In an illustrative example, phase control system 1500 may be included along with other phase controllers (e.g., other similar controllers) to control phase of a plurality of phases of a stator.

In some embodiments, phase controller 1502 is configured to control current in one or more phases of a stator. In some embodiments, a desired or commanded current to be applied to the corresponding phase is calculated locally by phase controller 1502. In some embodiments, a desired or commanded current to be applied to the one or more phases is communicated from a central controller, which determines currents to be applied on each of the phases (e.g., of the stator, and optionally other phases of other stators). For example, the desired or commanded current to be applied to the one or more phases may be determined to achieve a measured magnet or translator position, to achieve a total LEM force (e.g., summed from the electromagnetic force applied by each phase), to a achieve a translator velocity or acceleration, to achieve a desired translator position (e.g., an apex position), or any combination thereof.

In some embodiments, phase controller 1502 is configured to sense magnetic flux in the corresponding phase. For example, phase controller 1502 may sense the phase's magnetic flux and use the sensed flux as a control feedback. In some such embodiments, phase controller 1502 need not include a current sensor or be configured to receive input from a current sensor. Further, in some such embodiments, phase controller 1502 includes a current sensor with relatively reduced performance, requirements, cost, or a combination thereof.

In some embodiments, the current applied to or voltage applied across each phase is controlled locally (i.e., by an instance of phase control system 1500) to any suitable degree. In some embodiments, phase controller 1502 may execute a local control loop on phase current. For example, a current command may be communicated over a communication link from a central controller to phase controller 1502. Any suitable part of the control mechanism may also be distributed in accordance with the present disclosure. For example, a position measurement may be distributed to every phase and each phase controller 1502 may determine desired position and force to determine a current command, which may be applied by power electronics 1504.

In some embodiments, phase controller 1502 is configured to provide a control signal to power electronics 1504. Power electronics 1504 is configured to electrically couple to the phase leads of the phase and provide the current to the phase. Accordingly, power electronics 1504 includes components configured for amperages and voltages relevant to the DC bus and phase leads. For example, power electronics 1504 may include any suitable components of power electronics system 1430 of FIG. 14. Phase controller 1502 need not be configured to electrically manage or interact with such large currents or voltages as required by the phase leads and power electronics 1504. In some embodiments, phase controller 1502 and power electronics 1504 may be combined or integrated into a single module configured to control and apply current to the phase. In some embodiments, power electronics 1504 may be shared among more than one phase. For example, power electronics 1504 may include multiple power circuits, be configured to receive multiple control signals, and be configured to apply current to more than one phase.

In some embodiments, each phase control system may estimate position of the translator relative to the stator, rather than a central algorithm estimating or measuring position. Accordingly, the central algorithm may be distributed among several phase control systems. In some embodiments, each position estimator for multiple phase control systems may be part of a distributed position estimator. The distributed position estimator may estimate position based on, for example, the sensing of phase voltage in each corresponding phase. In some such embodiments, a dedicated position sensor need not be included, thus saving the cost and reliability concerns of the position sensor.

Power supply 1514 is configured to power components of phase control system 1500, aside from applying current to the corresponding phase. For example, power supply 1514 may provide power for processing functions of phase controller 1502, diagnostics (e.g., for power electronics 1504), any other suitable process requiring power, or any suitable combination thereof. In some embodiments, each phase control system may include a power supply (e.g., similar to power supply 1514).

In some embodiments, suitable components of phase control system 1500 may be coupled to grid via coupling 1550. For example, power electronics 1504, may be coupled to coupling 1550. In some embodiments, coupling 1550 may include cables or buses transmitting AC power (e.g., three-phase 480 VAC). In some embodiments, coupling 1550 may include cables or buses transmitting DC power (e.g., a DC bus), which may be coupled to a grid via a grid-tie inverter separate from phase control system 1500, for example.

In some embodiments, suitable components of phase control system 1500 may be coupled to one or more phases of a LEM via phase leads 1554. For example, power electronics 1504 may be coupled to phase leads 1554. In some embodiments, phase leads 1554 may include two phase leads per phase corresponding to phase control system 1500 (e.g., six phase leads of three phases correspond to phase control system 1500, or a full bridge topology). In some embodiments, phase leads 1554 may include one phase lead per phase corresponding to phase control system 1500 (e.g., six phase leads of six wye-connected phases, or a half-bridge topology). In some embodiments, phase leads may be wired in a star configuration. For example, for a wye-type configuration, one phase lead from each phase may be coupled together to form a neutral (e.g., having net zero current input or output, so phase currents must sum to zero), while each phase control system applies a controlled phase voltage, and thus current, to the other lead of the corresponding phase. In some such embodiments, only some of the DC bus voltage (e.g., the difference between a bus and the neutral voltage) may be available to apply across each phase. In some embodiments, phase leads for each phase may be wired in an independent configuration. For example, a phase control system may include a full H-bridge per phase and may be able to apply the full DC bus voltage across the phase in either direction (e.g., to cause a desired current to flow in either direction). This configuration provides a larger voltage range available to each phase as well as control independence from the other phases. For example, without a common neutral wye connection, the phase currents need not sum to zero.

In some embodiments, suitable components of phase control system 1500 may be coupled to communications (COMM) link 1556. For example, phase controller 1502, power electronics 1504, power supply 1514, or a combination thereof may be coupled to COMM link 1556. In some embodiments, COMM link 1556 may include a wired communications link such as, for example, an ethernet cable, a serial cable, any other suitable wired link, or any combination thereof. In some embodiments, COMM link 1556 may include a wireless communications link such as, for example, a WiFi transmitter/receiver, a Bluetooth transmitter/receiver, any other suitable wireless link, or any combination thereof. COMM link 1556 may include any suitable communication link enabling transmission of data, messages, signals, information, or a combination thereof. In some embodiments, phase control system 1500 is coupled to a central control system via communications link 1556. For example, in some embodiments, phase controller 1502 communicates with a central controller via COMM link 1556.

In some embodiments, phase control system 1500 may be configured to extract power from the corresponding phase of the LEM. For example, in the event of a detected system failure or loss of communication, phase controller 1502 may attempt to extract energy from the kinetic energy of a translator by commanding current in the opposite direction of a back emf in the corresponding phase.

In some embodiments, which include a long stator and short magnet section (e.g., the phases extend spatially beyond a magnet section), some phases are unused for at least some of the magnet travel. For example, when a portion of a magnet section is not under a phase (e.g., not axially overlapping with at least some of the phase), the phase will not interact electromagnetically with the magnet section in a significant way. Unused phases may be used as inductors and phase control system 1500 may be configured to store energy in capacitors or perform power conversion to help regulate the DC bus voltage, bus current, bus power, or a combination thereof. Accordingly, phase control system 1500, or phase controller 1502 thereof, may be used for other purposes besides exciting an electromagnetic force in the LEM.

In some embodiments, a LEM, or components thereof, may be tested, operated, characterized, measured, or otherwise interrogated. For example, a stator may be coupled by phase leads to power electronics, and current may be applied to phases to measure ohmic resistance, measure winding inductance, test for shorts among windings, test thermal response of the stator, test power electronics, test a control system, or a combination thereof. In a further example, a LEM may be coupled to power electronics by phase leads, coupled to a cooling system, and coupled to a bearing gas management system. The control system may cause the power electronics to apply current to the phase leads (e.g., to cause the translator to move axially and achieve a desired trajectory), cause the cooling system to provide a coolant (e.g., cooling air) to the stator, cause bearing gas to be provided to one or more bearing housings, and cause bearing gas to be provided to one or more anti-clocking bearing housings.

In an illustrative example, a LEM may be included as part of a linear generator (e.g., as described herein in reference to any or all of the preceding figures). The ability to test the LEM, and components thereof, without first installing, for example, in a linear generator or other system may allow easier maintenance, troubleshooting, and characterization of the LEM, without the complexity of the additional components of the linear generator. For example, a linear generator may include two LEMs, and it is advantageous to be able to test either LEM as a stand-alone unit. In some embodiments, an external energy source provides the force to cause translator movement (e.g., including a compressor, electromagnetic source, or other suitable source). In some embodiments, a LEM may be operated as a stand-alone unit as part of a generator, pump, compressor, or actuator.

Figure 16:
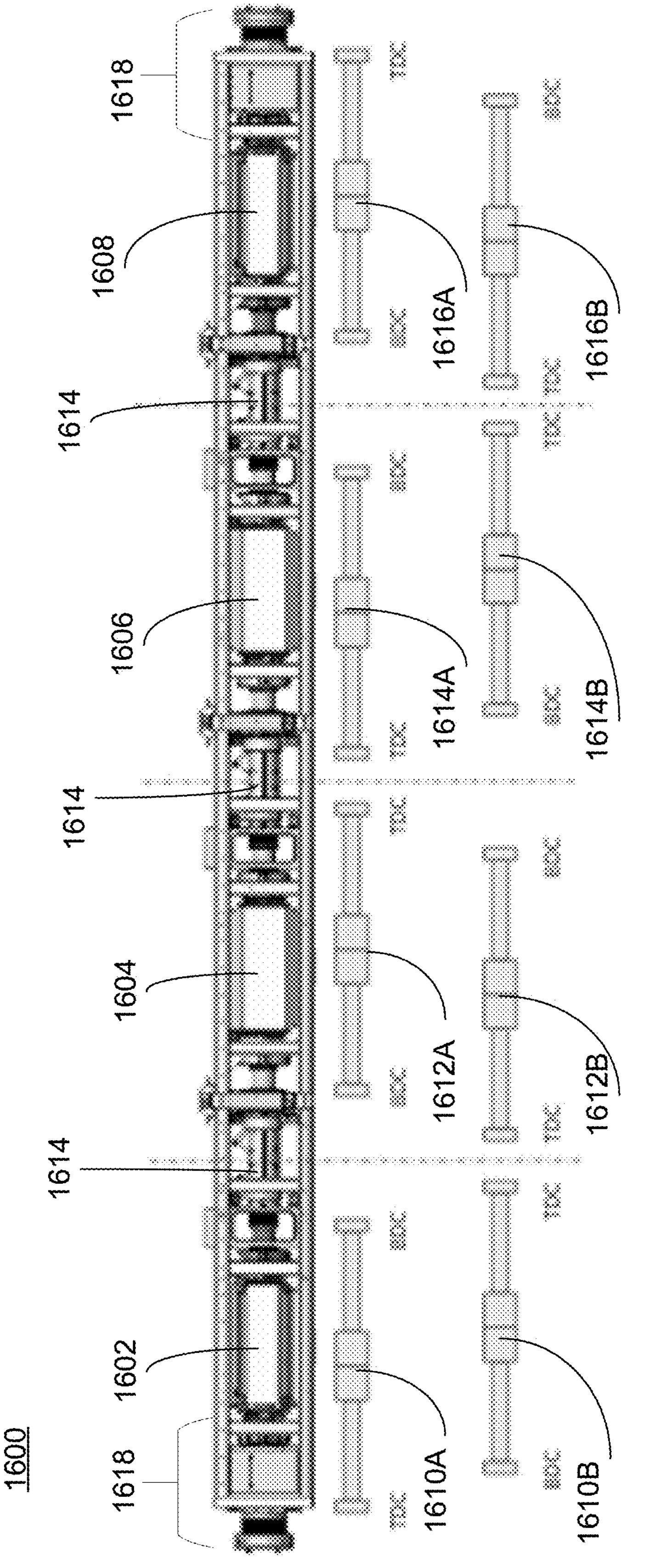
FIG. 16 shows a timing and breathing diagram for a LGEN assembly, in accordance with some embodiments of the present disclosure.

FIG. 16 is an exemplary timing and breathing diagram for LGEN assembly 1600 with depictions of where translators of each LEM of LGEN assembly is expected to be depending on the timing and breathing strategy adopted. LGEN assembly 1600 may include any or all components shown in, or described in reference to, any or all of the other figures of this disclosure. LGEN assembly 1600 is comprised of LEMs 1602, 1604, 1606, and 1608. LEMs 1604 and 1606 may be configured to generate more power output than LEMs 1602 and 1608. For example, in some embodiments, LEMs 1602 and 1608 may be considered to have half the output capabilities of LEMs 1604 and 1606 as they are bounded on respective outer ends by boosted gas spring assemblies 1618, each comprising a respective reservoir or boost box on outboard ends of each gas spring assembly, instead of being arranged between a pair of PCs 1614, like each of LEMs 1604 and 1606. Through the incorporation of three of PCs 1614, there is now additional force and energy output that was unable to be realized via LGEN assembly 500A of FIG. 5A. As there is a reaction section on either end of translators of LEMs 1604 and 1606, the translators of these LEMs require more energy to be removed during operation of LGEN assembly 1600 in order to maintain stable operation of all four LEMs.

As shown in FIG. 16, LEM 1602 can either have apex arrangement 1610A or 1610B. LEM 1604 can either have apex arrangement 1612A or 1612B. LEM 1606 can have apex arrangement 1614A or 1614B. LEM 1608 can have apex arrangement 1616A or 1616B. Apex arrangements 1610A, 1612A, 1614A, and 1616A correspond to a first timing and breathing state for LGEN assembly 1600. In this first state, LEMs 1604 and 1606 mirror each other's apexes, as exemplified by apex arrangements 1612A and 1614A, respectively. The respective TDCs of LEMS 1604 and 1606 each face each other on either side of the centrally mounted PC 1614. Additionally, LEMs 1602 and 1608 also have mirrored apexes, as exemplified by apex arrangements 1610A and 1616A. The TDCs of LEMS 1602 and 1608 face towards the outboard ends of LGEN assembly 1600 such that the TDCs are rebounded off of boosted gas spring assemblies 1618. Apex arrangements 1610B, 1612B, 1614B, and 1616B correspond to a second timing and breathing state for LGEN assembly 1600. In this second state, LEMs 1604 and 1606 also mirror each other's apexes, as exemplified by apex arrangements 1612B and 1614B, respectively. The respective BDCs of LEMS 1604 and 1606 each face each other on either side of the centrally mounted PC 1614. Additionally, LEMs 1602 and 1608 also have mirrored apexes, as exemplified by apex arrangements 1610A and 1616A. The BDCs of LEMS 1602 and 1608 face towards the outboard ends of LGEN assembly 1600 such that the BDCs are rebounded off of boosted gas spring assemblies 1618.

The paths of the respective translators of outboard LEMs 1602 and 1608 cannot be expected to match the paths of respective translators of inboard LEMs 1604 and 1606 given the differences in sizes and masses. Ideally, however, these four LEMs operate in complementing frequencies, which is why each of the timing a breathing strategies considered provide mirrored paths of the translators throughout the assemblies. The arrangements of TDCs or BDCs is considered based on the pressure differential between events resulting in a translator (e.g., including a piston affixed to the translator for rebounding off a reaction section) achieving TDC as compared to a BDC. Given the arrangement of the LEMs of LGEN assembly 1600, the pressure of power cylinder TDC events is likely to exceed pressure associated with gas spring BDC events thereby resulting in different rebound forces which may be amplified by the differences of masses of the components of the inboard and outboard LEMs. For example, rebounding off either of gas springs 1612 is expected to result in different trajectories for similar mass translators than rebounding off reaction cylinders (e.g., corresponding to each of PCs 1614). This difference is then increased by mass differential leading to a desire to offset the different reaction forces throughout LGEN 1600 based on the mirroring of apexes and timing of rebounds. Operating with the timing as shown in LGEN 1600 will tend to reduce axial vibration motion of the LGEN because forces of the translators are generally internal forces except for the forces on the gas springs which oppose each other axially. In some embodiments, at least one of PCs 1614 may include one or more ports to deliver air, fuel, or both to the PCs from one or more sources of air and fuel. For example, in some embodiments, one or more of PCs 1614 may receive only air to implement an idle state when desired. When operating in the idle state, LGEN 1600 can keep each of the four LEMs synchronized from an operational frequency standpoint using one or both of the strategies discussed herein.

Figures 17A, 17B:
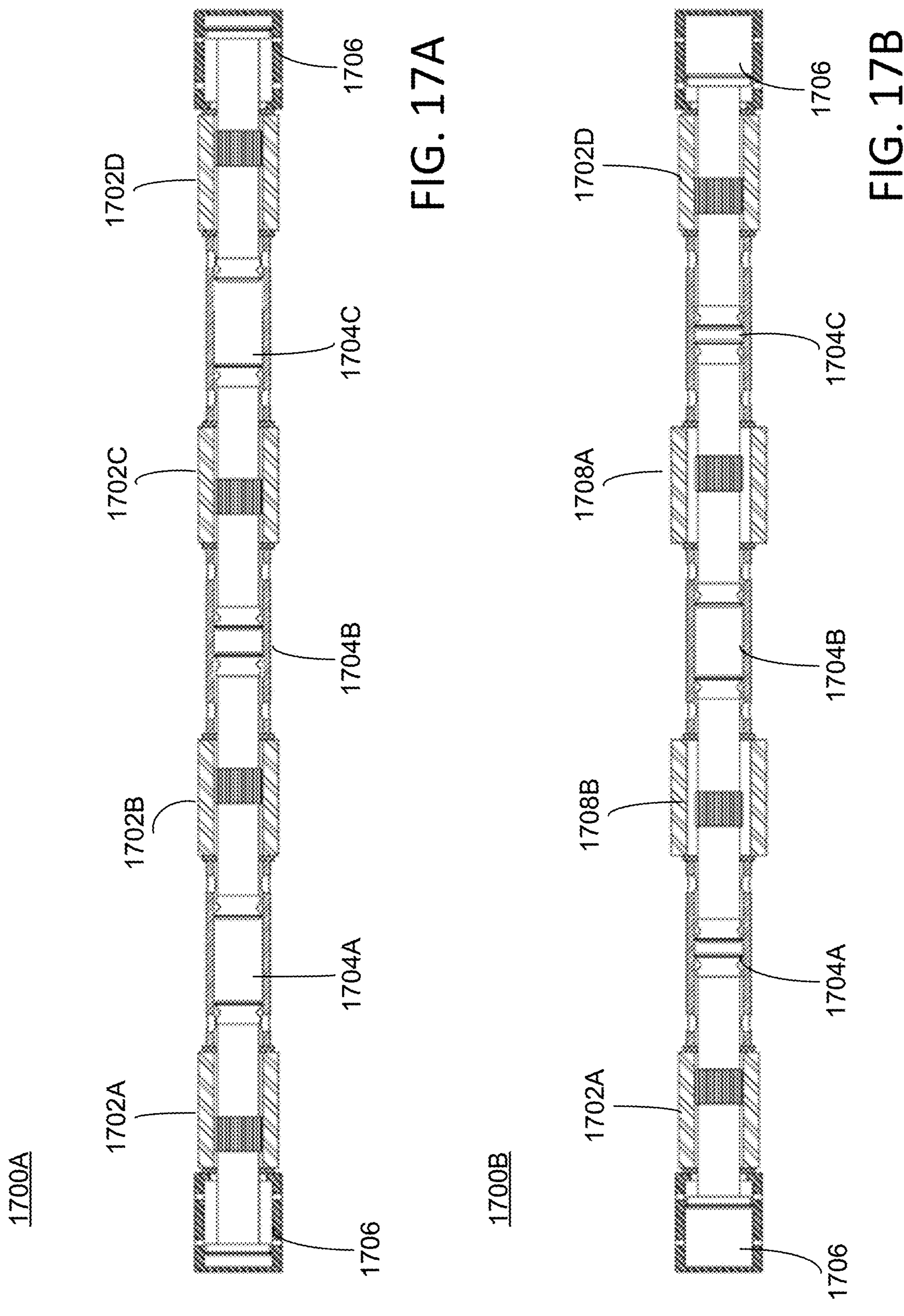
FIG. 17A shows a LGEN assembly including four equally sized LEMs, in accordance with some embodiments of the present disclosure.
FIG. 17B shows a LGEN assembly including two inboard LEMs that are configured for higher outputs than two outboard LEMs, in accordance with some embodiments of the present disclosure.

FIG. 17A depicts LGEN assembly 1700A comprised of LEMs 1702A-D. Each of LEMs 1702A-D are configured to generate roughly the same amount of energy out. LGEN assembly 1700A is an exemplary assembly where the timing and breathing of each of LEMs 1702A-D are not affected by differences in component mass (i.e., they are of the same size), but rather are affected only by the difference between inboard LEMs 1702B and 1702C using PCs 1704A-C for both BDC and TDC rebounds whereas outboard LEMs 1702A and 1702D rely on rebound forces on once side from a PC and on an outboard side from gas springs 1706.

FIG. 17B depicts LGEN assembly 1700B comprised of LEMs 1702A, 1702D, 1708A, and 1708B. Each of LEMs 1702A and 1702D are configured to generate roughly the same amount of energy out whereas LEMs 1708A and 1708B are configured to generate more power output than either of LEMs 1702A and 1702D. LGEN assembly 1700B is an exemplary assembly where the timing and breathing of each of LEMs 1702A, 1702D, 1708A, and 1708B are affected by both differences in component mass as well as whether gas springs 1706 or PCs 1704A-C are used for generating rebound forces. As LEMs 1708A and 1708B are configured to generate larger power outputs, they are shown with larger diameters than LEMs 1708A and 1708B.

Figure 18:
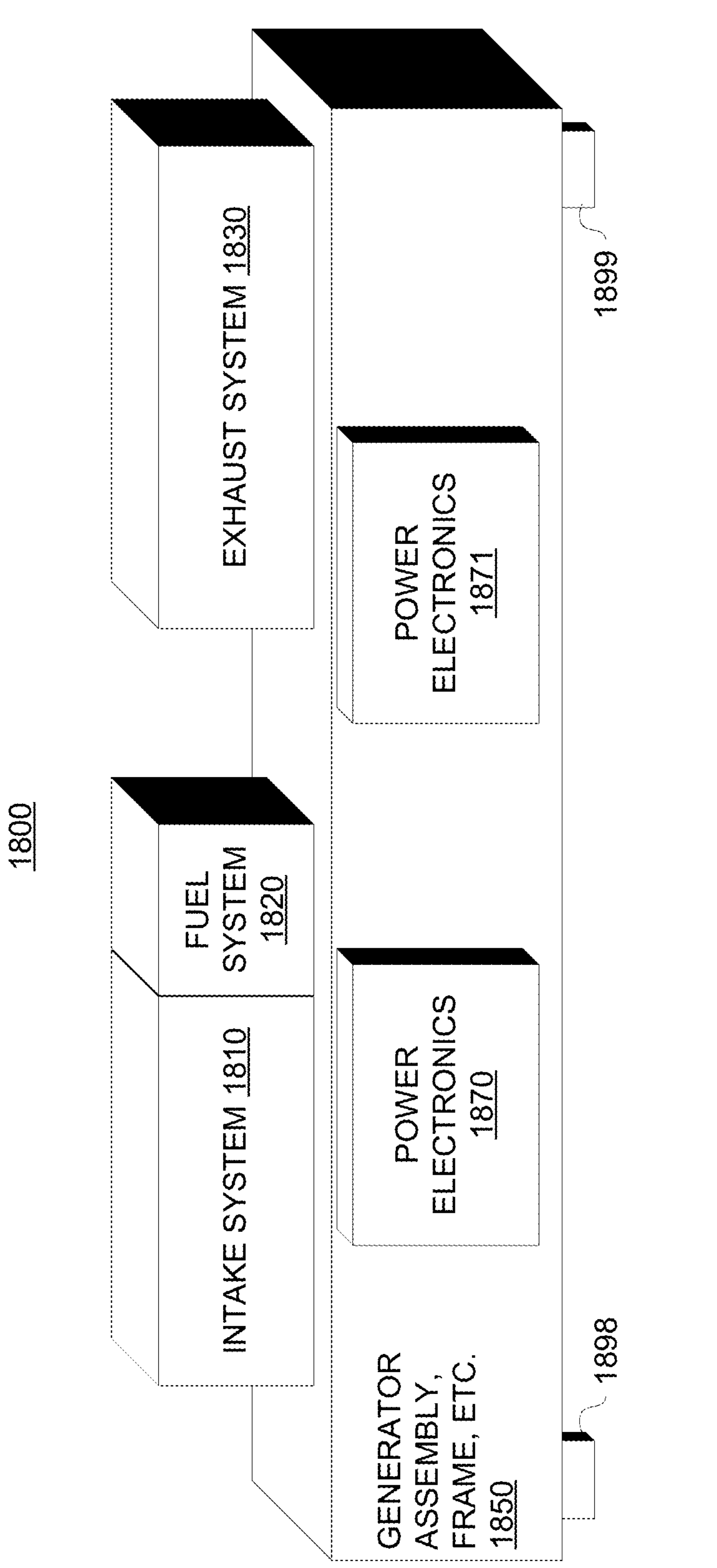
FIG. 18 shows a perspective view of an illustrative core, in accordance with some embodiments of the present disclosure.

FIG. 18 depicts a perspective view of illustrative core 1800, in accordance with some embodiments of the present disclosure. Core 1800, as illustrated, includes generator assembly and frame 1850, intake system 1810, fuel system 1820, exhaust system 1830, power electronics 1870 (e.g., for the intake-side LEM), and power electronics 1871 (e.g., for the exhaust-side LEM). Core 1800 may include any suitable components to allow testing, characterization, or both. Core 1800 and the other cores described herein can be any suitable architecture. Where multiples of core 1800 or other cores of this disclosure are connected or coupled for a cumulative power output, each of the multiple or plurality of cores can either be the same architecture or each may be slightly different. Whichever core architecture is employed in a generator, or device, system or assembly comprised of multiple, or a plurality of, cores can be based on target outputs or can be any suitable design for achieving the performance benefits described herein.

Figure 19:
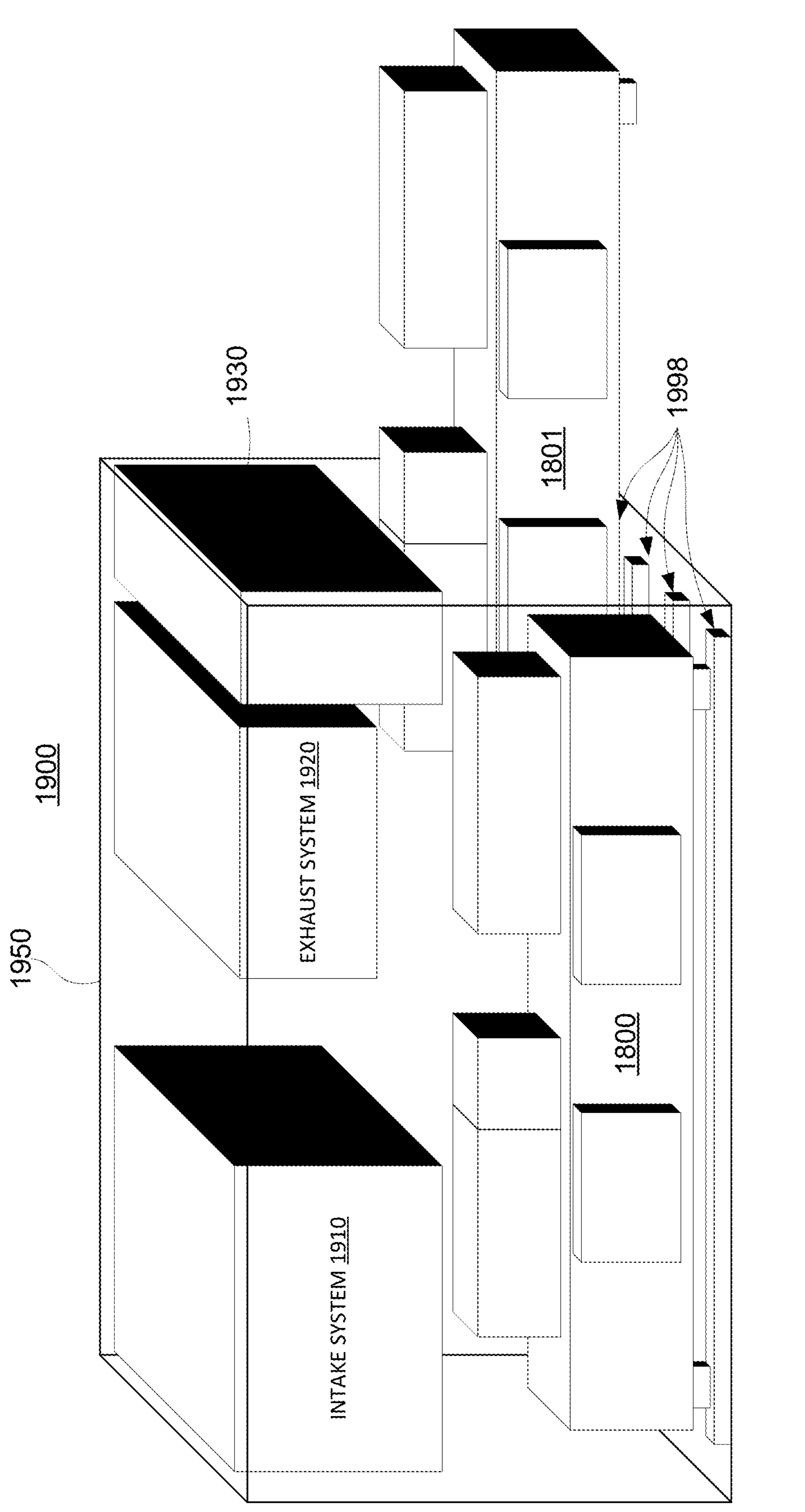
FIG. 19 shows a perspective view of an illustrative system that includes two cores, in accordance with some embodiments of the present disclosure.

In some embodiments, core 1800 may be electrically coupled to a load bank (e.g., a set of resistive elements) for testing (e.g., to dissipate any generated power during testing), an AC grid, a DC grid, or any other electrical load, in advance of installation in a full package assembly (e.g., as illustrated in FIG. 19). In some embodiments, one or more subsystems may include back up components (e.g., batteries) to provide redundancy, resilience and to allow for continued operation or for a controlled shut down in case of one or more component failures during operation.

A core, as that term is used herein, refers to a modular assembly of components in the implementation of the linear generator of the present disclosure. For example, a core can include a number of LEMs, a number of gas springs (e.g., a pair of gas springs located outboard of the LEMs on respective ends when the LEMs are aligned in sequence), and a number of reaction sections (e.g., arranged between adjacent LEMs). For example, a core can include an even or odd number of LEMs. While the present disclosure is generally described using embodiments in which a core includes four LEMs (e.g., where two of the LEMs are sized larger than the other two LEMs to provide larger respective power output than the smaller LEMs), it will be understood that any suitable number of LEMs arranged in any suitable manner to form a core may be used. A core is also referred to herein as a generator core. In some embodiments, a linear generator core is provided in which certain constituent components are arranged linearly.

FIG. 19 shows core 1800 installed in enclosure 1950, with core 1801 partially installed/removed. Enclosure 1950 includes rail system 1998, which may engage with a structural frame of either core, for installing and removing each of cores 1800 and 1801. By including distinct cores (e.g., cores 1800 and 1801), integrated linear generator system 1900 exhibits modularity and allows replacement or repair of a core rather than the entire system. An enclosure may be configured to accommodate any suitable number of cores of any suitable core architecture, in accordance with the present disclosure. In some embodiments, enclosure 1950 includes intake equipment 1810 (e.g., for providing intake gas to core 1800 and 1801), exhaust equipment 1920 (e.g., for receiving exhaust gas from core 1800 and 1801), and electronics 1930 (e.g., which may include a control system for controlling core 1800 and core 1801). For example, in some embodiments, intake equipment 1810 couples to intake system 1810 of core 1800. In a further example, in some embodiments, exhaust system 1920 couples to exhaust system 1830 of core 1800. In a further example, in some embodiments, electronics 1930 couples to power electronics 1870 and 1871 of core 1800.

In some embodiments, one or more components, systems, or auxiliaries may be shared among cores. For example, exhaust tuned pipes may be shared among more than one core (e.g., each core need not have a dedicated exhaust system, or dedicated tuned pipes thereof). In some embodiments, two or more packages (e.g., similar to integrated linear generator system 1900 of FIG. 19) may be in communication with each other. For example, packages may be linked to each other communications-wise via a communications network (e.g., any suitable wired or wireless network). In a further example, packages may be linked by a shared fuel system, shared cooling system, shared intake system, shared exhaust system, shared control system, shared power electronics system, any other suitable shared system, or any combination thereof. In some embodiments, one or more cores may be synchronized to the other cores to achieve operating requirements, including efficiency, power, or noise.

Figures 20A, 20B:
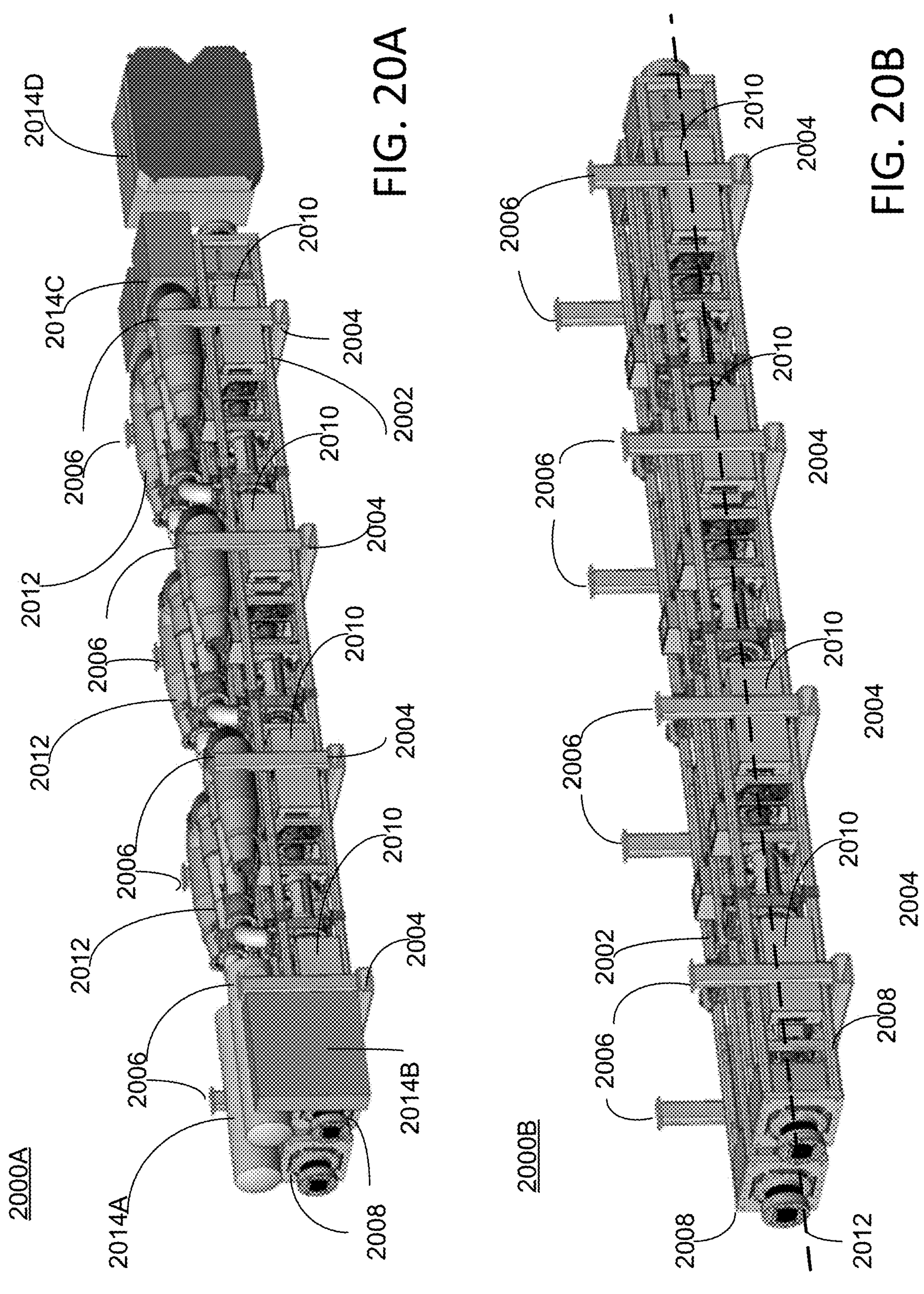
FIG. 20A shows a two core LGEN assembly with accessories mounted to the frame, in accordance with some embodiments of the present disclosure.
FIG. 20B shows the two core LGEN assembly of FIG. 20A without accessories mounted to the frame, in accordance with some embodiments of the present disclosure.

FIG. 20A shows two core LGEN assembly 2000A with accessories mounted to frame 2002. A core corresponds to each row of LGEN components secured to frame 2002. Frame 2002 is comprised of cross beams 2004 with pillars 2006 extending vertically from opposite ends of cross beams 2004. Frame 2002 is also fixedly attached to core frames 2008 to create a rigid and stackable structure. Two core LGEN assembly 2000A may be configured to generate at least 350 kW of power output, up to 900 kW, depending on the efficiency and size of the overall system and the sizes of various LEMs that make up each of the two cores. The accessories mounted to frame 2002 directly or indirectly include LEM inverter cabinets 2010 (e.g., where there is one LEM inverter cabinet per respective LEM of each core), exhaust pipes 2012, and accessory boxes 2014A-D. Each of accessory boxes A-D may include one or more of a fuel source, power or control electronics, air supplies, filters, or other accessories necessary for maintaining consistent operation of two core LGEN assembly 2000A.

FIG. 20B shows two core LGEN assemblies including generator core mounting assembly 2000B which includes the two cores of FIG. 20A mounted to a structural frame without accessories, except for LEM inverter cabinets 2020. Generator core mounting assembly 2000B includes a plurality of cross beams 2004 spaced along longitudinal axis 2012. Each of cross beams 2004 extend laterally from one side of the structural frame to an opposite side of the structural frame. A plurality of pillars 2006 spaced along the longitudinal axis, wherein respective pairs of the plurality of pillars 2006 are coupled to a respective one of the plurality of cross beams 2004. As shown in FIG. 20B the plurality of pillars 2006 are orthogonal to the plurality of cross beams 2004 along the longitudinal axis. Each of pillars 2006 extend at least vertically. In some embodiments, pillars 2006 may be angled relative to respective mounting points on each of cross beams 2004. For example, the angle may be somewhere between pillars 2006 being horizontal along top sides of cross beams 2004 and pillars 2006 being perpendicular to top sides of cross beams 2004 (e.g., where angling pillars 2006 provides additional structural rigidity in order to support a stacked structure of cores). As shown in FIG. 20B, each of the cores have respective housings (e.g., as shown and described in reference to FIG. 12A) and there is both a first and a second housing. In some embodiments, generator core mounting assembly 2000B can accommodate a plurality of other housings. Each housing is arranged transverse along a side (e.g., a top side) of the plurality of cross beams 2004 and between each respective sequential pair of the plurality of pillars 2006. The second, or other, housing is arranged adjacent to the first housing transverse to the plurality of cross beams 2004 along the same side of cross beams 2004 as the first housing between each respective pair of the plurality of pillars 2006.

Pillars 2006 may be affixed to one or more of a top side or outer surface, or edge, of a respective cross beam of cross beams 2004. The affixing may be achieved by, for example, one or more of a weld seam or a fastener. In some embodiments, a top side of each of cross beams 2004 includes a component, apparatus, or mechanism for isolation of motion such that each core does not transfer momentum, force, or noise to components of generator core mounting assembly 2000B or other cores. For example, the top side of each of cross beams 2004 may include a damping system, a damper, a polyurethane layer, a foam layer, a spring, a spring system, or any suitable combination thereof or any suitable apparatus, or system, for preventing transfer of loads, noise, momentum, or other undesirable operational condition from a first core to a second core or from any core to one or more components of the frame. In some embodiments, one or more of these isolation strategies may be incorporated onto inward facing surfaces of each of pillars 2006 (e.g., specifically where housings of cores may contact a surface or side of the pillars).

Figure 21:
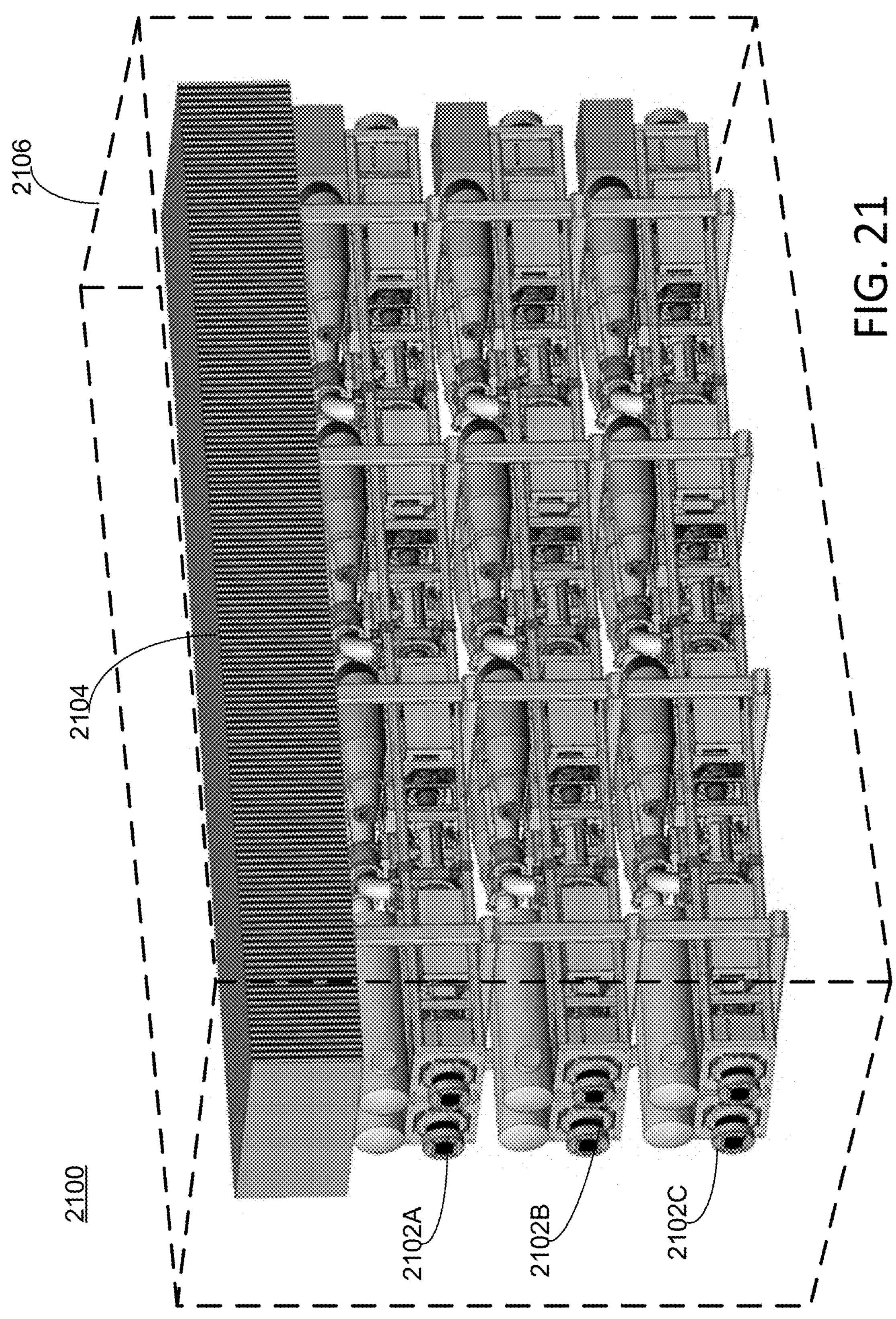
FIG. 21 shows a stacked set of two core LGEN assemblies, in accordance with some embodiments of the present disclosure.

FIG. 21 shows stacked LGEN assembly 2100. LGEN assembly 2100 is comprised of dual cores 2102A-C. As shown in FIG. 21, LGEN assembly 2100 may be configured to generate 2 or more MW of power output based on the arrangement and interfacing of each of dual cores 2102A-C. Arranged along the top of stacked LGEN assembly 2100 is auxiliary box 2104. Auxiliary box 2104 may be configured to encompass, or house, one or more of intake components, exhaust components, or cooling subsystems as well as related plumbing. Auxiliary box 2104 may be configured for transport with stacked LGEN assembly 2100 to avoid risk of damage during transport of stacked LGEN assembly 2100. Stacked LGEN assembly 2100 incorporates three of the generator core mounting assemblies of FIG. 20B for accommodating each of dual cores 2102A-C on different levels of stacked LGEN assembly 2100. A bottom side of the raised generator core mounting assemblies is affixed to a top side of the plurality of pillars of the generator core mounting assemblies that are arranged below the raised generator core mounting assemblies.

When servicing stacked LGEN assembly 2100 for maintenance purposes, operators must service replaceable elements such as sealing rings in each of the LEMs of the cores of stacked LGEN assembly 2100. For each of the depicted rows, each translator is to be articulated into a different position in order to access each sealing ring assembly of each LEM. One service strategy may include moving all translators of each LEM in one direction (e.g., all the way left or right) to replace half of the rings, then moving all translators in an opposite direction to replace the other half of the rings. In some embodiments, an overall height of LGEN assembly 2100 may exceed 10 feet, resulting in the incorporation of stairs or other catwalk related assemblies to access different levels of LGEN assembly 2100.

As shown in FIG. 21, stacked LGEN assembly 2100 can be housed within housing 2106 to create a power generation module. Housing 2106 defines an internal volume for accommodating a plurality of cores arranged in a matrix. An example of a matrix of cores is shown in FIG. 21 as a plurality of rows of cores and a plurality of columns of cores (e.g., three rows with two columns within each row corresponding to dual cores 2102A-C). Housing 2106 can be any suitable geometry to accommodate any of the assemblies of this disclosure. A power generation module as described herein can comprise any suitable combination of components for generating a desired cumulative power output (e.g., including stacked LGEN assembly 2200 of FIG. 22).

Figure 22:
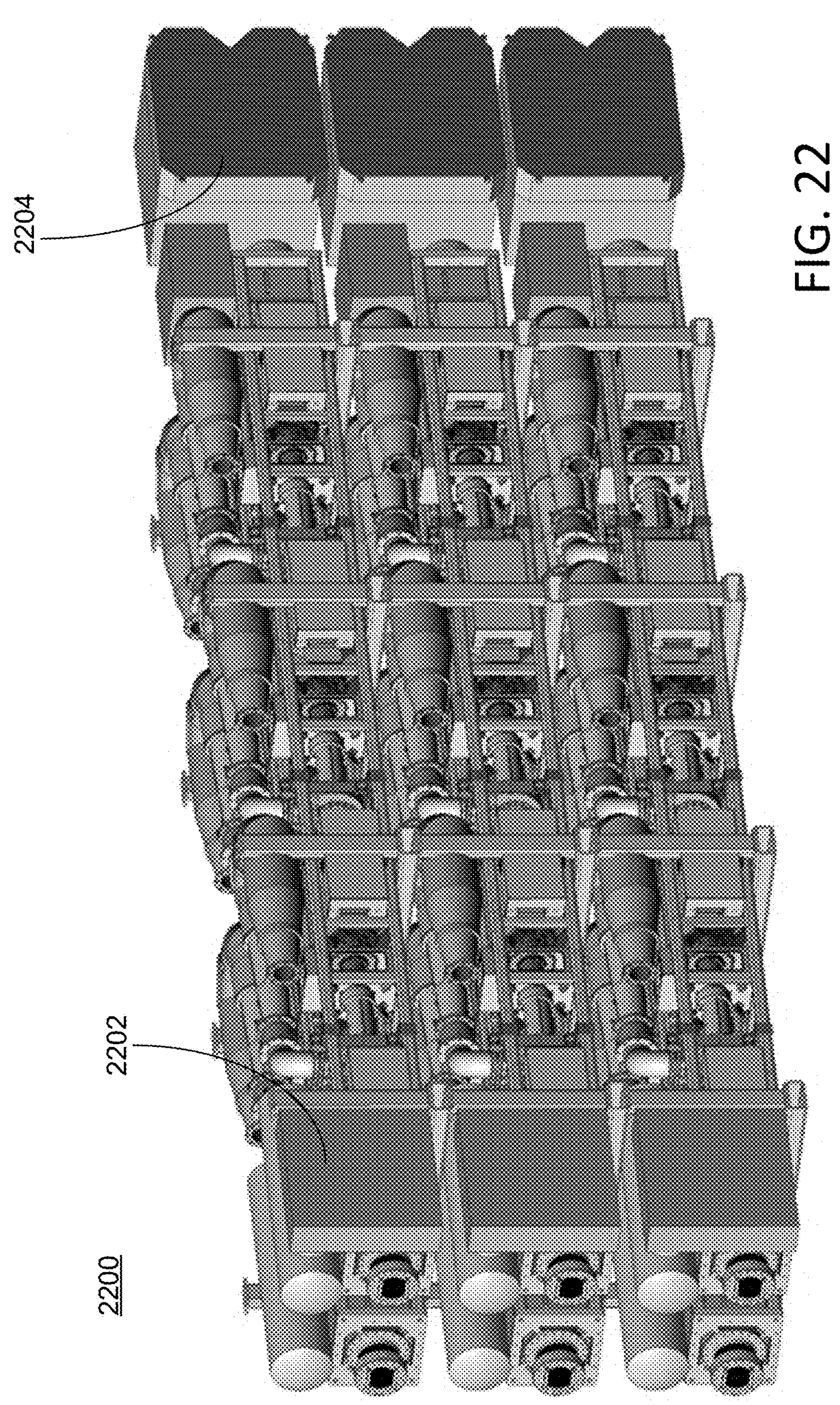
FIG. 22 shows a stacked set of two core LGEN assemblies with accessories mounted to the frame, in accordance with some embodiments of the present disclosure.

FIG. 22 shows stacked LGEN assembly 2200 with accessories 2202 mounted towards a first end of LGEN assembly 2200 and auxiliary accessories 2204 mounted towards a second end of LGEN assembly 2200. Stacked LGEN assembly 2200 may be considered an alternative mounting strategy for accessories to stacked LGEN assembly 2100 or may be utilized in combination with stacked LGEN assembly 2100. For example, any or all of intake, exhaust, or cooling components may be attached prior to shipment of LGEN assembly 2200 or may be attached when a facility configured to receive stacked LGEN assembly 2200 is prepared to have stacked LGEN assembly 2200 installed. The implementation of one or both of stacked LGEN assembly 2100 or stacked LGEN assembly 2200 may be based on one or more of shipping constraints, installation constraints, or service constraints.

FIG. 23 is a block diagram of method 2300 for controlling a LGEN system (e.g., one or more of the LGEN systems or assemblies of this disclosure). At process block 2302, processing circuitry is used to track respective positions of respective translators of a first, a second, a third, and a fourth LEM, wherein the second and third LEMs comprise respective translators with respective reaction sections configured to generate more power output as respective reaction sections of respective translators of the first and fourth LEMs. At process block 2304, the processing circuitry is used to determine respective target apexes of each of the respective translators of the first, the second, the third, and the fourth LEM. A target apex of the second LEM mirrors a target apex of the third LEM. A target apex of the first LEM mirrors a target apex of the fourth LEM (e.g., as shown and described in reference to FIG. 16). At process block 2306, the processing circuitry is used to modify a trajectory of the respective translators of each of the first, the second, the third, and the fourth LEMs to achieve the respective target apexes.

Figure 24:
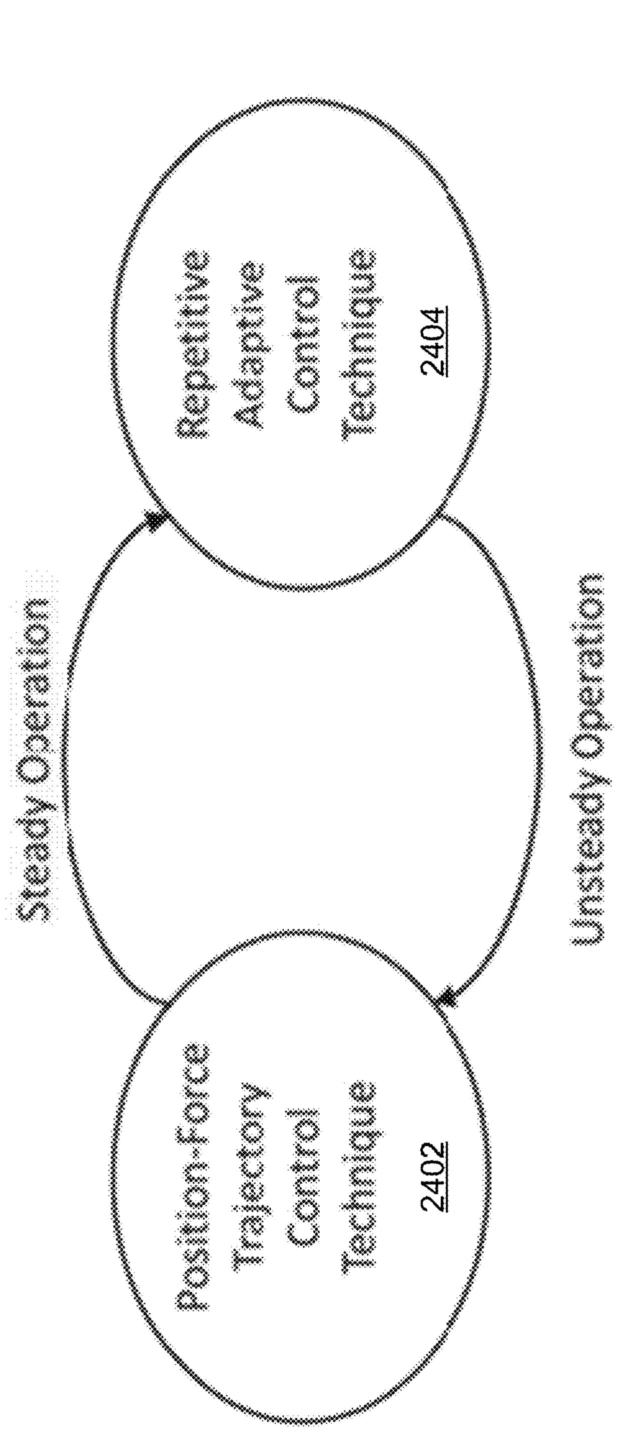
FIG. 24 shows an illustrative state diagram for a hybrid control technique in accordance with some embodiments of the present disclosure.

FIG. 24 illustrates one implementation of a hybrid control technique. Control system 310 uses a position-force trajectory control technique at 2402. If control system 310 determines that conditions become sufficiently steady based on any suitable criteria (e.g., absence of misfires, stable power output, stable efficiencies, thermal equilibrium, or other suitable conditions), control system 310 switches to a repetitive adaptive control technique at 2404. If control system 310 determines that operating conditions have or will become sufficiently unsteady based on any suitable criteria, control system 310 switches back to a position-force trajectory control technique at 2402.

It will be understood that the present disclosure is not limited to the embodiments described herein and can be implemented in the context of any suitable system. In some suitable embodiments, the present disclosure is applicable to reciprocating generators and compressors. In some embodiments, the present disclosure is applicable to generators and compressors. In some embodiments, the present disclosure is applicable to reaction devices such as a reciprocating generator and a generator. A reaction device is inclusive of combustion related devices. A reaction, as used herein, is inclusive of both non-combustion reactions and combustion reactions. In some embodiments, the present disclosure is applicable to non-combustion and non-reaction devices such as reciprocating compressors and compressors. In some embodiments, the present disclosure is applicable to gas springs. In some embodiments, the present disclosure is applicable to oil-free reciprocating and generators and compressors. In some embodiments, the present disclosure is applicable to oil-free generators with internal or external reactions. In some embodiments, the present disclosure is applicable to oil-free generators that operate with compression ignition (e.g., homogeneous charge compression ignition, stratified charge compression ignition, or other compression ignition), spark ignition, or both. In some embodiments, the present disclosure is applicable to oil-free generators that operate with gaseous fuels, liquid fuels, or both. As used herein, the term "fuel" refers to matter that reacts (e.g., with an oxidizer). Suitable fuels for use with any or all of the systems, assemblies, or components of this disclosure include hydrocarbon fuels (e.g., one or more of natural gas, biogas, gasoline, diesel, biodiesel, propane, or ethane), non-hydrocarbon fuels (e.g., one or more of hydrogen or ammonia), alcohol fuels (e.g., one or more of ethanol, methanol, or butanol) or any mixtures of any of the aforementioned fuels. The generators described herein are suitable for both stationary power generation and portable power generation (e.g., for one or more of power grid powering or vehicle propulsion). In some embodiments, the present disclosure is applicable to linear generators. In some embodiments, the present disclosure is applicable to generators that can be reaction generators with internal reaction or any type of heat generator with external heat addition (e.g., from a heat source or external reaction such as combustion).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A linear generator comprising:

a plurality of linear electromagnetic machines (LEMs) coaxially arranged in sequence along a longitudinal axis, wherein:

each LEM comprises:

a respective translator, and a respective stator;

the plurality of LEMs comprises a pair of outboard LEMs, each on a respective opposing end of the sequence;

a pair of gas springs, each respectively arranged outboard of the pair of outboard LEMs in contact with the respective translators of the outboard LEMs; and a plurality of chemical reaction sections arranged between adjacent LEMs of the plurality of LEMs, wherein each of the plurality of chemical reaction sections is in contact with respective translators of the respective adjacent LEMs.

2. The linear generator of claim 1, wherein:

each translator comprises a respective piston; and each of the plurality of chemical reaction sections is in contact with a respective piston of the translators.

3. The linear generator of claim 1, wherein the plurality of LEMs comprises at least four LEMs.

4. The linear generator of claim 1, wherein:

the plurality of LEMs consists of four LEMs; and an inboard pair of LEMs of the plurality of LEMs are sized to generate more power than the outboard pair of LEMs.

5. The linear generator of claim 4, wherein each of the inboard pair of LEMs is larger than each of the outboard pair of LEMs.

6. The linear generator of claim 5, wherein a respective diameter of each of the inboard pair of LEMs is larger than a respective diameter of each of the outboard pair of LEMs.

7. The linear generator of claim 4, wherein:

each stator of the plurality of LEMs comprises a respective number of stator teeth; and the respective number of stator teeth of each of the stators of the inboard LEMs is greater than the respective number of stator teeth of each of the stators of the outboard LEMs.

8. The linear generator of claim 4, further comprising a plurality of power cylinders, wherein:

each of the plurality of chemical reaction sections is within a bore of a respective one of the plurality of power cylinders;

each power cylinder of the plurality of power cylinders comprises a respective intake port and a respective exhaust port;

the plurality of power cylinders comprise a pair of outboard power cylinders, each arranged inboard of a respective one of the pair of outboard LEMs;

the respective intake port of a first outboard power cylinder of the pair of outboard power cylinders is located on an opposing longitudinal side of the first outboard power cylinder relative to the respective intake port of a second outboard power cylinder of the pair of power cylinders; and the respective exhaust port of the first outboard power cylinder of the pair of outboard power cylinders is located on the opposing longitudinal side of the first outboard power cylinder relative to the respective exhaust port of the second outboard power cylinder of the pair of power cylinders.

9. The linear generator of claim 8, wherein:

the respective intake port of the first outboard power cylinder is located on an inboard side of the first outboard power cylinder that is longitudinally adjacent to a first gas spring of the pair of gas springs;

the respective exhaust port of the first outboard power cylinder is located longitudinally outboard of the respective intake port of the first outboard power cylinder;

the respective intake port of the second outboard power cylinder is located on an inboard side of the second outboard power cylinder that is longitudinally adjacent to a second gas spring of the pair of gas springs; and the respective exhaust port of the second outboard power cylinder is located longitudinally outboard of the respective intake port of the second outboard power cylinder.

10. The linear generator of claim 1, wherein the plurality of LEMs, the pair of gas springs, and the plurality of chemical reaction sections form a core, the linear generator further comprising a plurality of cores, comprising the core and a plurality of additional cores, wherein each of the plurality of additional cores comprises:

a respective additional plurality of LEMs coaxially arranged in sequence along a respective longitudinal axis, wherein:

each LEM of the respective additional plurality of LEMs comprises:

a respective additional translator, and a respective additional stator;

the additional plurality of LEMs comprises an additional pair of outboard LEMs, each on a respective opposing end of the additional plurality of LEMs;

an additional respective pair of gas springs, each respectively arranged outboard of the additional pair of outboard LEMs in contact with the respective additional translators of the additional pair of outboard LEMs; and a respective additional plurality of chemical reaction sections arranged between adjacent LEMs of the additional plurality of LEMs, wherein each of the additional plurality of chemical reaction sections is in contact with respective translators of the respective adjacent LEMs of the additional plurality of LEMs.

11. The linear generator of claim 10, wherein each of the plurality of cores comprises a respective power output, and wherein each of the respective power outputs are coupled to generate a cumulative power output.

12. The linear generator of claim 10, wherein at least two cores of the plurality of cores are arranged side by side with matching orientations.

13. The linear generator of claim 12, wherein the at least two cores of the plurality of cores are stacked on top of at least two other cores of the plurality of cores that are arranged side by side with matching orientations.

14. The linear generator of claim 10, wherein:

at least a first set of the plurality of cores are stacked on top of a second set of the plurality of cores; and all orientations of the at least first set of the plurality of cores and the second set of the plurality of cores match.

15. The linear generator of claim 1, wherein each gas spring of the pair of gas springs comprises:

a gas spring housing volume defined at least in part by an end-cap of the respective translator of the respective outboard LEM of the pair of outboard LEMs; and at least one port within the gas spring housing volume that communicates pressure from the gas spring to at least one gas bearings along which respective translators of the plurality of LEMs translate.

16. The linear generator of claim 1, wherein at least one gas spring of the pair of gas springs comprises a chemical reaction section.

17. The linear generator of claim 1, wherein each of the plurality of chemical reaction sections comprises a respective fuel reaction section.

18. The linear generator of claim 1, wherein each of the plurality of chemical reaction sections is configured to:

receive an air-fuel mixture;

propagate a reaction based at least in part on contents of the air-fuel mixture.

19. The linear generator of claim 1, further comprising a plurality of power cylinders, wherein:

each of the plurality of chemical reaction sections is arranged within a respective bore of a respective one of the plurality of power cylinders;

each power cylinder of the plurality of power cylinders comprises a respective intake port and a respective exhaust port; and each respective exhaust port is configured to remove exhaust products from a respective chemical reaction section of the plurality of chemical reaction sections.

20. A device comprising:

a plurality of electromagnetic machines (EMs) coaxially arranged in sequence along a longitudinal axis, wherein:

each EM converts kinetic energy of a respective assembly to electrical energy using a respective stator, and the plurality of EMs comprises a pair of outboard EMs, each on a respective opposing end of the sequence;

a pair of driver sections, each respectively arranged outboard of the pair of outboard EMs in contact with the respective translators of the outboard EMs; and a plurality of compression sections arranged between adjacent EMs of the plurality of EMs, wherein:

each of the plurality of compression sections are in contact with respective translators of the respective adjacent EMs; and each of the plurality of compression sections is configured to propagate at least one respective reaction based at least in part on contents of a respective air-fuel mixture received by each respective compression section.

21. A structural frame comprising:

features for positioning and aligning a linear generator comprising:

a plurality of linear electromagnetic machines (LEMs) coaxially arranged in sequence along a longitudinal axis, wherein:

each LEM comprises:

a respective translator, and a respective stator;

the plurality of LEMs comprises a pair of outboard LEMs, each on a respective opposing end of the sequence;

a pair of driver sections, each respectively arranged outboard of the pair of outboard LEMs in contact with the respective translators of the outboard LEMs; and a plurality of chemical reaction sections arranged between adjacent LEMs of the plurality of LEMs, wherein each of the plurality of chemical reaction sections is in contact with respective translators of the respective adjacent LEMs.

22. The structural frame of claim 21, wherein the features define a housing with a plurality of openings, wherein the linear generator is arranged within the housing.

23. The structural frame of claim 22, wherein the housing comprises a cuboid-shaped volume.

24. The structural frame of claim 22, wherein the plurality of openings accommodate insertion of at least one component of the linear generator into the housing.

25. The structural frame of claim 22, further comprising:

a generator core mounting assembly comprising:

a plurality of cross beams spaced along the longitudinal axis, each extending laterally from one side of the structural frame to an opposite side of the structural frame; and a plurality of pillars spaced along the longitudinal axis, wherein respective pairs of the plurality of pillars are coupled to a respective one of the plurality of cross beams.

26. The structural frame of claim 25, wherein the plurality of pillars are orthogonal to the plurality of cross beams along the longitudinal axis.

27. The structural frame of claim 25, wherein the plurality of pillars each extend at least vertically.

28. The structural frame of claim 25, wherein:

the housing is a first housing;

the structural frame comprises a plurality of other housings;

the first housing is arranged transverse along a side of the plurality of cross beams and between each respective pair of the plurality of pillars; and at least one other housing of the plurality of other housings is arranged adjacent to the first housing and transverse to the plurality of cross beams along the side of the plurality of cross beams between each respective pair of the plurality of pillars.

29. The structural frame of claim 28, wherein:

the generator core mounting assembly is a first generator core mounting assembly;

the structural frame comprises at least one other generator core mounting assembly; and a bottom side of the at least one other generator core mounting assembly is affixed to a top side of the plurality of pillars of the first generator core mounting assembly.

30. The structural frame of claim 29, wherein bottom sides of the plurality of cross beams of the at least one other generator core mounting assembly are affixed to top sides of the plurality of pillars of the first generator core mounting assembly.

* * * * *